US011767600B2

(12) United States Patent
Dawson et al.

(10) Patent No.: US 11,767,600 B2
(45) Date of Patent: *Sep. 26, 2023

(54) HYDROGEN PRODUCTION SYSTEM

(71) Applicant: Utility Global, Inc., Houston, TX (US)

(72) Inventors: Matthew Dawson, Katy, TX (US); Nicholas Farandos, Bray (IE); Jin Dawson, Katy, TX (US)

(73) Assignee: Utility Global, Inc., Houston, TX (US)

( * ) Notice: Subject to any disclaimer, the term of this patent is extended or adjusted under 35 U.S.C. 154(b) by 576 days.

This patent is subject to a terminal disclaimer.

(21) Appl. No.: 16/739,748

(22) Filed: Jan. 10, 2020

(65) Prior Publication Data
US 2020/0255962 A1 Aug. 13, 2020

Related U.S. Application Data

(63) Continuation-in-part of application No. 16/707,066, filed on Dec. 9, 2019, now abandoned, and a continuation-in-part of application No. 16/707,084, filed on Dec. 9, 2019, now abandoned, and a continuation-in-part of application No. 16/707,046, filed on Dec. 9, 2019, now abandoned, and a continuation-in-part of application No. 16/693,271, filed on Nov. 23, 2019, now abandoned, and a
(Continued)

(51) Int. Cl.
| C25B 1/02 | (2006.01) |
| C25B 9/23 | (2021.01) |
| C25B 1/04 | (2021.01) |
| C25B 9/73 | (2021.01) |
| C25B 11/061 | (2021.01) |

(52) U.S. Cl.
CPC ............... *C25B 9/23* (2021.01); *C25B 1/04* (2013.01); *C25B 9/73* (2021.01); *C25B 11/061* (2021.01)

(58) Field of Classification Search
None
See application file for complete search history.

(56) References Cited

U.S. PATENT DOCUMENTS

| 3,635,812 A | 1/1972 | Spacil |
| 3,974,108 A | 8/1976 | Staut et al. |

(Continued)

FOREIGN PATENT DOCUMENTS

| GB | 2418672 | 4/2006 |
| JP | 2004284875 | 10/2004 |

(Continued)

OTHER PUBLICATIONS

Ruiz-Morales et al., Symmetric and reversible solid oxide fuel cells, RSC Advances, 2011, 1, 1403-1414 (Year: 2011).*

(Continued)

*Primary Examiner* — Lucas J. O'Donnell
(74) *Attorney, Agent, or Firm* — Foley & Lardner LLP

(57) ABSTRACT

A hydrogen production system comprising: a fuel source; a water source; and a hydrogen producer; where the fuel source and the water source are in fluid communication with the hydrogen producer; and where fuel enters the hydrogen producer from the fuel source and water enters the hydrogen producer from the water source and the fuel and the water do not come in contact with each other in the hydrogen producer.

17 Claims, 32 Drawing Sheets

Related U.S. Application Data continuation-in-part of application No. 16/693,268, filed on Nov. 23, 2019, now abandoned, and a continuation-in-part of application No. 16/693,269, filed on Nov. 23, 2019, now abandoned, and a continuation-in-part of application No. 16/693,270, filed on Nov. 23, 2019, now Pat. No. 11,603,324, and a continuation-in-part of application No. 16/684,838, filed on Nov. 15, 2019, now abandoned, and a continuation-in-part of application No. 16/684,864, filed on Nov. 15, 2019, now Pat. No. 11,611,097, and a continuation-in-part of application No. 16/680,770, filed on Nov. 12, 2019, and a continuation-in-part of application No. 16/674,629, filed on Nov. 5, 2019, now Pat. No. 11,557,784, and a continuation-in-part of application No. 16/674,695, filed on Nov. 5, 2019, and a continuation-in-part of application No. 16/674,580, filed on Nov. 5, 2019, now abandoned, and a continuation-in-part of application No. 16/674,657, filed on Nov. 5, 2019, now Pat. No. 11,575,142.

(60) Provisional application No. 62/955,443, filed on Dec. 31, 2019, provisional application No. 62/948,759, filed on Dec. 16, 2019, provisional application No. 62/944,756, filed on Dec. 6, 2019, provisional application No. 62/944,259, filed on Dec. 5, 2019, provisional application No. 62/941,358, filed on Nov. 27, 2019, provisional application No. 62/939,531, filed on Nov. 22, 2019, provisional application No. 62/934,808, filed on Nov. 13, 2019, provisional application No. 62/928,326, filed on Oct. 30, 2019, provisional application No. 62/927,627, filed on Oct. 29, 2019, provisional application No. 62/925,210, filed on Oct. 23, 2019, provisional application No. 62/912,626, filed on Oct. 8, 2019, provisional application No. 62/904,683, filed on Sep. 24, 2019, provisional application No. 62/899,087, filed on Sep. 11, 2019, provisional application No. 62/896,466, filed on Sep. 5, 2019, provisional application No. 62/895,416, filed on Sep. 3, 2019, provisional application No. 62/888,319, filed on Aug. 16, 2019, provisional application No. 62/877,699, filed on Jul. 23, 2019, provisional application No. 62/875,437, filed on Jul. 17, 2019, provisional application No. 62/869,322, filed on Jul. 1, 2019, provisional application No. 62/866,758, filed on Jun. 26, 2019, provisional application No. 62/864,492, filed on Jun. 20, 2019, provisional application No. 62/863,390, filed on Jun. 19, 2019, provisional application No. 62/856,736, filed on Jun. 3, 2019, provisional application No. 62/852,045, filed on May 23, 2019, provisional application No. 62/849,269, filed on May 17, 2019, provisional application No. 62/847,472, filed on May 14, 2019, provisional application No. 62/844,126, filed on May 7, 2019, provisional application No. 62/844,127, filed on May 7, 2019, provisional application No. 62/840,381, filed on Apr. 29, 2019, provisional application No. 62/839,587, filed on Apr. 29, 2019, provisional application No. 62/837,089, filed on Apr. 22, 2019, provisional application No. 62/834,531, filed on Apr. 16, 2019, provisional application No. 62/827,800, filed on Apr. 1, 2019, provisional application No. 62/825,576, filed on Mar. 28, 2019, provisional application No. 62/824,229, filed on Mar. 26, 2019, provisional application No. 62/819,374, filed on Mar. 15, 2019, provisional application No. 62/819,289, filed on Mar. 15, 2019, provisional application No. 62/814,695, filed on Mar. 6, 2019, provisional application No. 62/809,602, filed on Feb. 23, 2019, provisional application No. 62/808,644, filed on Feb. 21, 2019, provisional application No. 62/805,250, filed on Feb. 13, 2019, provisional application No. 62/804,115, filed on Feb. 11, 2019, provisional application No. 62/798,344, filed on Jan. 29, 2019, provisional application No. 62/797,572, filed on Jan. 28, 2019, provisional application No. 62/791,629, filed on Jan. 11, 2019, provisional application No. 62/786,341, filed on Dec. 29, 2018, provisional application No. 62/784,472, filed on Dec. 23, 2018, provisional application No. 62/783,192, filed on Dec. 20, 2018, provisional application No. 62/780,211, filed on Dec. 15, 2018, provisional application No. 62/779,005, filed on Dec. 13, 2018, provisional application No. 62/777,338, filed on Dec. 10, 2018, provisional application No. 62/777,273, filed on Dec. 10, 2018, provisional application No. 62/773,912, filed on Nov. 30, 2018, provisional application No. 62/773,071, filed on Nov. 29, 2018, provisional application No. 62/771,045, filed on Nov. 24, 2018, provisional application No. 62/768,864, filed on Nov. 17, 2018, provisional application No. 62/767,413, filed on Nov. 14, 2018, provisional application No. 62/758,778, filed on Nov. 12, 2018, provisional application No. 62/757,751, filed on Nov. 8, 2018, provisional application No. 62/756,257, filed on Nov. 6, 2018, provisional application No. 62/756,264, filed on Nov. 6, 2018.

(56) References Cited

U.S. PATENT DOCUMENTS

| | | |
|---|---|---|
| 5,290,642 A | 3/1994 | Minh et al. |
| 6,051,125 A | 4/2000 | Pham et al. |
| 6,146,549 A * | 11/2000 | Mackay .............. B01D 69/141 |
| | | 502/4 |
| 6,287,432 B1 * | 9/2001 | Mazanec ............ C01G 49/0072 |
| | | 204/266 |
| 7,537,623 B2 | 5/2009 | Etievant et al. |
| 2002/0132156 A1 | 9/2002 | Ruhl et al. |
| 2004/0001994 A1 | 1/2004 | Marina et al. |
| 2005/0003247 A1 | 1/2005 | Pham |
| 2006/0280998 A1 | 12/2006 | Ying et al. |
| 2007/0163889 A1 | 7/2007 | Kato et al. |
| 2007/0217995 A1 | 9/2007 | Matsumura et al. |
| 2009/0235587 A1 | 9/2009 | Hawkes et al. |
| 2010/0062312 A1 * | 3/2010 | Larsen ................ B01D 67/0041 |
| | | 429/500 |
| 2010/0086824 A1 | 4/2010 | Homel et al. |
| 2013/0082421 A1 | 4/2013 | Allemand et al. |
| 2015/0167186 A1 | 6/2015 | Hirata et al. |

(56) References Cited

U.S. PATENT DOCUMENTS

2017/0067169 A1* 3/2017 Ingram .................. C25B 9/19
2018/0202055 A1 7/2018 Reytier et al.

FOREIGN PATENT DOCUMENTS

| RU | 364563 A1 | 12/1972 | |
|---|---|---|---|
| WO | WO-9921649 A1 * | 5/1999 | ........... B01D 53/228 |
| WO | WO2006035210 | 4/2006 | |

OTHER PUBLICATIONS

D.P. Serrano, H2 Production from Methane Pyrolisis Over Commercial Carbon Catalysts: Kinetic and Deactivation Study, International Journal of Hydrogen Energy, 2009, p. 4488-4494.

Guillaume Fau et al., Hydrocarbon Pyrolysis with a Methane Focus: A Review on the Catalytic Effect and the Coke Production, Journal of Analytical and Applied Pyrolysis, 2014.

J.M. Frias et al., A Natural Gas-Assisted Steam Electrolyzer for High-Efficiency Production of Hydrogen, International Journal of Hydrogen Energy, 2003, p. 483-490, vol. 28.

Wensheng Wang et al., Hydrogen Production Via CH4 and CO Assisted Steam Electrolysis, Topics in Catalysis, 2007, p. 380-385, vol. 46, Springer, Philadelphia, PA, USA.

Martinez-Frias J et al: "A natural gas-assisted steam electrolyzer for high-efficiency production of hydrogen", International Journal of Hydrogen Energy, Elsevier, Amsterdam, NL, vol. 28, No. 5, May 1, 2003 (May 1, 2003), pp. 483-490, XP004411258, ISSN: 0360-3199, DOI: 10.1016/S0360-3199(02)00135-0, 8 pgs.

* cited by examiner

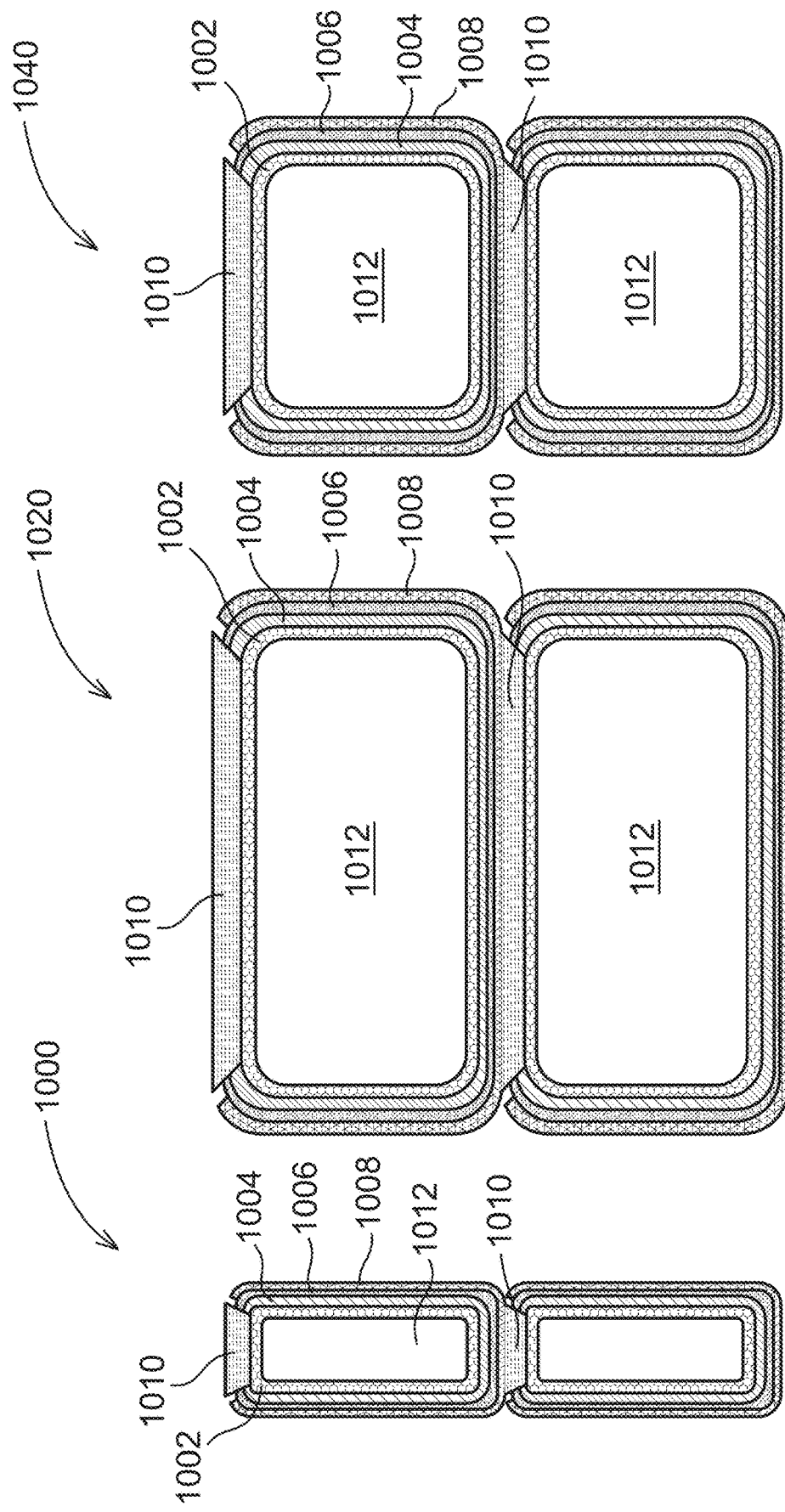

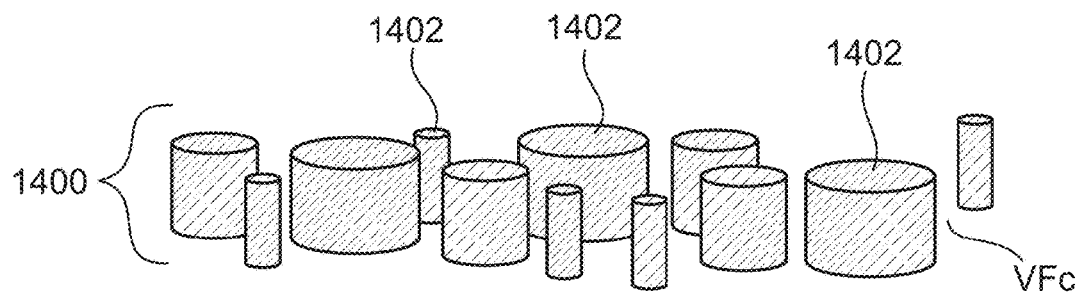
FIG. 14A
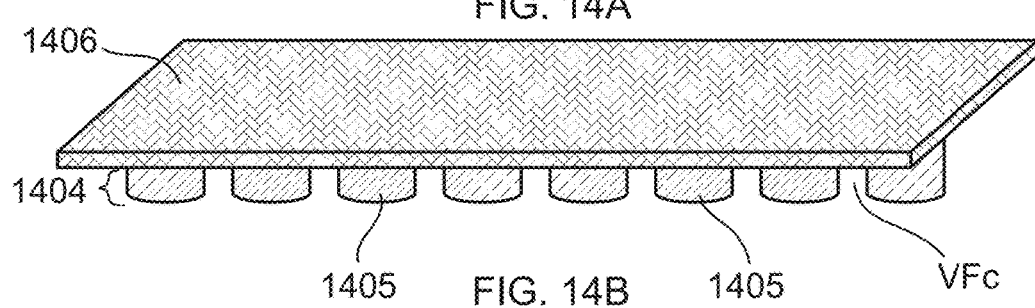
FIG. 14B
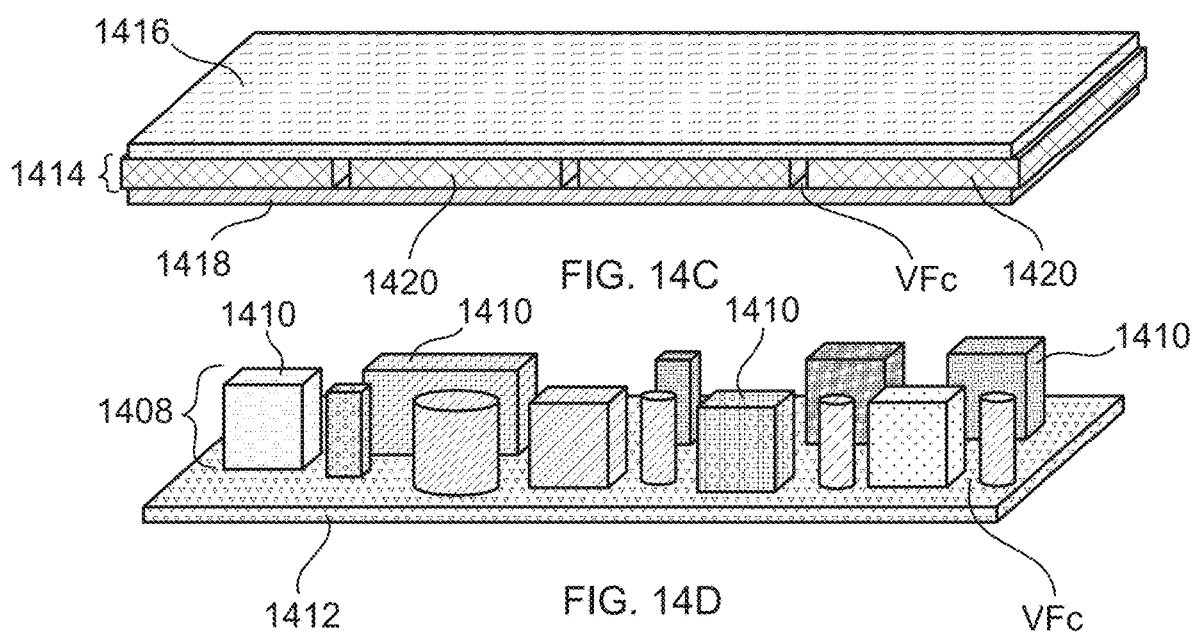
FIG. 14C
FIG. 14D

HYDROGEN PRODUCTION SYSTEM

CROSS-REFERENCE TO RELATED APPLICATIONS

This application is a continuation-in-part application of U.S. patent application Ser. Nos. 16/707,046, 16/707,066 and 16/707,084, filed Dec. 9, 2019, which are continuation-in-part applications of U.S. patent application Ser. Nos. 16/699,453 and 16/699,461 filed Nov. 29, 2019, which are continuation-in-part applications of U.S. patent application Ser. Nos. 16/693,268, 16/693,269, 16/693,270, and 16/693,271, filed Nov. 23, 2019, which are continuation-in-part applications of U.S. patent application Ser. Nos. 16/684,838 and 16/684,864 filed Nov. 15, 2019, which are continuation-in-part applications of U.S. patent application Ser. No. 16/680,770 filed Nov. 12, 2019, which is a continuation-in-part application of U.S. patent application Ser. Nos. 16/674,580, 16/674,629, 16/674,657, 16/674,695 all filed Nov. 5, 2019, each of which claims the benefit under 35 U.S.C. 119(e) of U.S. Provisional Patent Application No. 62/756,257 filed Nov. 6, 2018, U.S. Provisional Patent Application No. 62/756,264 filed Nov. 6, 2018, U.S. Provisional Patent Application No. 62/757,751 filed Nov. 8, 2018, U.S. Provisional Patent Application No. 62/758,778 filed Nov. 12, 2018, U.S. Provisional Patent Application No. 62/767,413 filed Nov. 14, 2018, U.S. Provisional Patent Application No. 62/768,864 filed Nov. 17, 2018, U.S. Provisional Patent Application No. 62/771,045 filed Nov. 24, 2018, U.S. Provisional Patent Application No. 62/773,071 filed Nov. 29, 2018, U.S. Provisional Patent Application No. 62/773,912 filed Nov. 30, 2018, U.S. Provisional Patent Application No. 62/777,273 filed Dec. 10, 2018, U.S. Provisional Patent Application No. 62/777,338 filed Dec. 10, 2018, U.S. Provisional Patent Application No. 62/779,005 filed Dec. 13, 2018, U.S. Provisional Patent Application No. 62/780,211 filed Dec. 15, 2018, U.S. Provisional Patent Application No. 62/783,192 filed Dec. 20, 2018, U.S. Provisional Patent Application No. 62/784,472 filed Dec. 23, 2018, U.S. Provisional Patent Application No. 62/786,341 filed Dec. 29, 2018, U.S. Provisional Patent Application No. 62/791,629 filed Jan. 11, 2019, U.S. Provisional Patent Application No. 62/797,572 filed Jan. 28, 2019, U.S. Provisional Patent Application No. 62/798,344 filed Jan. 29, 2019, U.S. Provisional Patent Application No. 62/804,115 filed Feb. 11, 2019, U.S. Provisional Patent Application No. 62/805,250 filed Feb. 13, 2019, U.S. Provisional Patent Application No. 62/808,644 filed Feb. 21, 2019, U.S. Provisional Patent Application No. 62/809,602 filed Feb. 23, 2019, U.S. Provisional Patent Application No. 62/814,695 filed Mar. 6, 2019, U.S. Provisional Patent Application No. 62/819,374 filed Mar. 15, 2019, U.S. Provisional Patent Application No. 62/819,289 filed Mar. 15, 2019, U.S. Provisional Patent Application No. 62/824,229 filed Mar. 26, 2019, U.S. Provisional Patent Application No. 62/825,576 filed Mar. 28, 2019, U.S. Provisional Patent Application No. 62/827,800 filed Apr. 1, 2019, U.S. Provisional Patent Application No. 62/834,531 filed Apr. 16, 2019, U.S. Provisional Patent Application No. 62/837,089 filed Apr. 22, 2019, U.S. Provisional Patent Application No. 62/840,381 filed Apr. 29, 2019, U.S. Provisional Patent Application No. 62/844,125 filed May 7, 2019, U.S. Provisional Patent Application No. 62/844,127 filed May 7, 2019, U.S. Provisional Patent Application No. 62/847,472 filed May 14, 2019, U.S. Provisional Patent Application No. 62/849,269 filed May 17, 2019, U.S. Provisional Patent Application No. 62/852,045 filed May 23, 2019, U.S. Provisional Patent Application No. 62/856,736 filed Jun. 3, 2019, U.S. Provisional Patent Application No. 62/863,390 filed Jun. 19, 2019, U.S. Provisional Patent Application No. 62/864,492 filed Jun. 20, 2019, U.S. Provisional Patent Application No. 62/866,758 filed Jun. 26, 2019, U.S. Provisional Patent Application No. 62/869,322 filed Jul. 1, 2019, U.S. Provisional Patent Application No. 62/875,437 filed Jul. 17, 2019, U.S. Provisional Patent Application No. 62/877,699 filed Jul. 23, 2019, U.S. Provisional Patent Application No. 62/888,319 filed Aug. 16, 2019, U.S. Provisional Patent Application No. 62/895,416 filed Sep. 3, 2019, U.S. Provisional Patent Application No. 62/896,466 filed Sep. 5, 2019, U.S. Provisional Patent Application No. 62/899,087 filed Sep. 11, 2019, U.S. Provisional Patent Application No. 62/904,683 filed Sep. 24, 2019, U.S. Provisional Patent Application No. 62/912,626 filed Oct. 8, 2019, U.S. Provisional Patent Application No. 62/925,210 filed Oct. 23, 2019, U.S. Provisional Patent Application No. 62/927,627 filed Oct. 29, 2019, U.S. Provisional Patent Application No. 62/928,326 filed Oct. 30, 2019, U.S. Provisional Patent Application No. 62/934,808 filed Nov. 13, 2019, U.S. Provisional Patent Application No. 62/939,531 filed Nov. 22, 2019, U.S. Provisional Patent Application No. 62/941,358 filed Nov. 27, 2019, U.S. Provisional Patent Application No. 62/944,259 filed Dec. 5, 2019, U.S. Provisional Patent Application No. 62/944,756 filed Dec. 6, 2019, U.S. Provisional Patent Application No. 62/948,759 filed Dec. 16, 2019, and U.S. Provisional Patent Application No. 62/955,443 filed Dec. 31, 2019. The entire disclosures of each of these listed applications are hereby incorporated herein by reference.

TECHNICAL FIELD

This invention generally relates to electrochemical reactors. More specifically, this invention relates to electrochemical reactors to produce syngas and hydrogen.

BACKGROUND

Syngas (i.e., synthesis gas) is a mixture consisting primarily of hydrogen, carbon monoxide, and often carbon dioxide. It is used as intermediates to produce various products, such as synthetic natural gas, ammonia, methanol, hydrogen, synthetic fuels, synthetic lubricants. Syngas may be produced from almost any hydrocarbon feedstock, such as natural gas, coal, biomass, via steam reforming, dry reforming, partial oxidation, or gasification. Syngas is combustible and is often used in internal combustion engines or for electricity generation although its energy density is less than half of natural gas.

Hydrogen in large quantities is needed in the petroleum and chemical industries. For example, large amounts of hydrogen are used in upgrading fossil fuels and in the production of ammonia or methanol or hydrochloric acid. Petrochemical plants need hydrogen for hydrocracking, hydrodesulfurization, hydrodealkylation. Hydrogenation processes to increase the level of saturation of unsaturated fats and oils also need hydrogen. Hydrogen is also a reducing agent of metallic ores. Hydrogen may be produced from electrolysis of water, steam reforming, lab-scale metal-acid process, thermochemical methods, or anaerobic corrosion. Many countries are aiming at a hydrogen economy.

Clearly, there is continuing need and interest to develop methods and systems to produce these important gases.

SUMMARY

Further aspects and embodiments are provided in the following drawings, detailed description and claims. Unless specified otherwise, the features as described herein are combinable and all such combinations are within the scope of this disclosure.

One aspect of the present invention is a hydrogen production system that includes a fuel source, a water source, and a hydrogen producer. The fuel source and the water source are in fluid communication with the hydrogen producer. The fuel enters the hydrogen producer from the fuel source and water enters the hydrogen producer from the water source. The fuel and the water do not come in contact with each other in the hydrogen producer.

In another aspect, the hydrogen producer includes a first electrode, a second electrode, and an electrolyte between the first and second electrodes. The fuel source is in fluid communication with the first electrode and the water source is in fluid communication with the second electrode.

In still another aspect, the electrolyte includes doped ceria or where the electrolyte includes lanthanum chromite or a conductive metal or combination thereof and a material selected from the group consisting of doped ceria, YSZ, LSGM, SSZ, and combinations thereof. The lanthanum chromite can include undoped lanthanum chromite, strontium doped lanthanum chromite, iron doped lanthanum chromite, lanthanum calcium chromite, or combinations thereof. The conductive metal comprises Ni, Cu, Ag, Au, or combinations thereof.

In a still further aspect, the first electrode and the second electrode include Ni or NiO and a material selected from the group consisting of YSZ, CGO, SDC, SSZ, LSGM, and combinations thereof.

In a yet still further aspect, the first electrode includes doped or undoped ceria and a material selected from the group consisting of Cu, CuO, $Cu_2O$, Ag, $Ag_2O$, Au, $Au_2O$, $Au_2O_3$, Pt, Pd, Ru, Rh, stainless steel, and combinations thereof. The second electrode includes Ni or NiO and a material selected from the group consisting of YSZ, CGO, SDC, SSZ, LSGM, and combinations thereof.

In still yet another aspect of the invention, the fuel from the fuel source provides heat for the hydrogen producer and the hydrogen producer has no additional heat source.

In another aspect of the present invention, the hydrogen production system further includes an oxidant source and a boiler, where the boiler is in fluid communication with the oxidant source, the water source, and the hydrogen producer.

In still another aspect, the boiler is in thermal communication with the hydrogen producer, the fuel entering into the hydrogen producer, the oxidant, the water, or combinations thereof.

In a still further aspect, the boiler is configured to receive exhaust from the first electrode of the hydrogen producer and to feed steam into the second electrode of the hydrogen producer.

In a yet still further aspect, the fuel is partially oxidized in the hydrogen producer and further oxidized in the boiler.

In still yet another aspect of the invention, the hydrogen production system further includes a steam turbine disposed between the boiler and the hydrogen producer and in fluid communication with the boiler and the hydrogen producer.

In another aspect of the present invention, the hydrogen production system further includes a steam reformer or an autothermal reformer disposed between the fuel source and the hydrogen producer and in fluid communication with the fuel source and the hydrogen producer.

In still another aspect of the present invention, the hydrogen production system further includes a condenser configured to receive exhaust from the second electrode of the hydrogen producer and to recycle water to the boiler and to output hydrogen.

In a still further aspect, the condenser is in thermal communication with the fuel.

In a yet still further aspect of the present invention, the hydrogen production system further includes a desulfurization unit disposed between the fuel source and the hydrogen producer and in fluid communication with the fuel source and the hydrogen producer.

In still yet another aspect, the hydrogen producer is configured to have a fuel inlet temperature no greater than 1000° C.

In another aspect of the present invention, the hydrogen producer is configured to have a fuel outlet temperature no less than 600° C.

In still another aspect, the hydrogen producer comprises no interconnect.

In still yet another aspect of the present invention, a hydrogen production system is in fluid communication with a downstream unit configured to use hydrogen produced by the hydrogen producer in one or more of process selected from the group consisting of: a Fischer-Tropsch (FT) reaction; a dry reforming reaction; a Sabatier reaction catalyzed by nickel; a Bosch reaction; a reverse water gas shift reaction; an electrochemical reaction to produce electricity; production of ammonia; production of fertilizer; electrochemical compression of hydrogen for storage or fueling a hydrogen vehicle; or a hydrogenation reaction.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 10A illustrates a cross-sectional view of a TFC, according to an embodiment of the disclosure;

FIG. 10B illustrates a cross-sectional view of a TFC, according to an embodiment of the disclosure;

FIG. 10C illustrates a cross-sectional view of a TFC, according to an embodiment of the disclosure;

FIG. 14A schematically illustrates segments of fluid dispersing components in a first layer, according to an embodiment of the disclosure;

FIG. 14B schematically illustrates fluid dispersing components in a first layer along with a second layer, according to an embodiment of the disclosure;

FIG. 14C schematically illustrates fluid dispersing components in a first layer along with a second and third layer, according to an embodiment of the disclosure;

FIG. 14D schematically illustrates fluid dispersing components in a first layer along with a second layer, according to an embodiment of the disclosure;

DETAILED DESCRIPTION

Overview

Figure 1A:
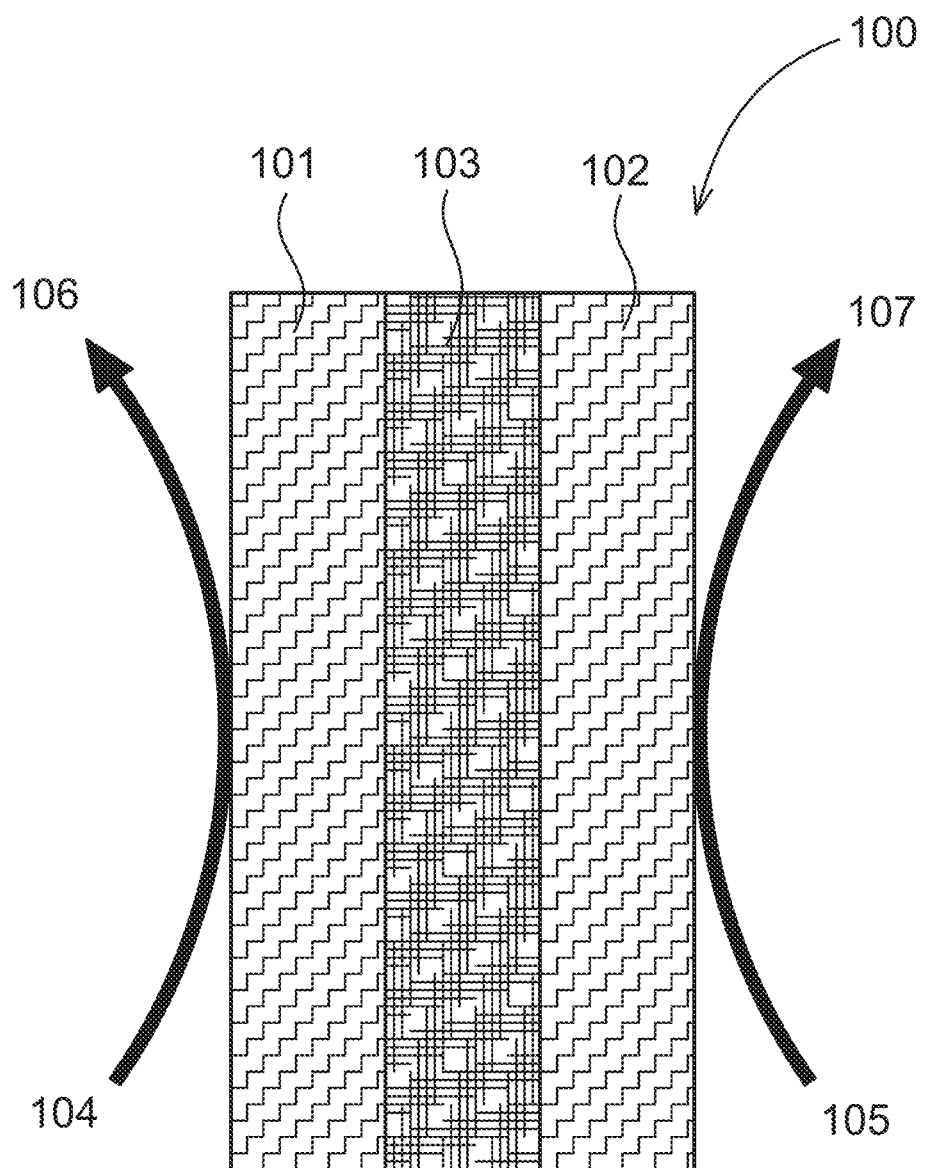
FIG. 1A illustrates an electrochemical (EC) gas producer, according to an embodiment of this disclosure.

Embodiments of methods, materials and processes described herein are directed towards electrochemical reactors. Electrochemical reactors include solid oxide fuel cells, solid oxide fuel cell stacks, electrochemical gas producers, electrochemical compressors, solid state batteries, or solid oxide flow batteries.

Electrochemical gas producers can be used to produce syngas, hydrogen or other gasses for use as a fuel or feedstock for fuel cells, ammonia production, fertilizer production, hydrogenation reactions, Bosch reactions or other applications. The disclosure herein describes a hydrogen production system. Various components of the system are described such as electrodes and electrolytes along with materials of construction of the components. Other components described include condensers, desulphurization units and boilers.

Definitions

The following description recites various aspects and embodiments of the inventions disclosed herein. No particular embodiment is intended to define the scope of the invention. Rather, the embodiments provide non-limiting examples of various compositions and methods that are included within the scope of the claimed inventions. The description is to be read from the perspective of one of ordinary skill in the art. Therefore, information that is well-known to the ordinarily skilled artisan is not necessarily included.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like. As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, compositions and materials are used interchangeably unless otherwise specified. Each composition/material may have multiple elements, phases, and components. Heating as used herein refers to actively adding energy to the compositions or materials.

The term "in situ" in this disclosure refers to the treatment (e.g., heating) process being performed either at the same location or in the same device of the forming process of the compositions or materials. For example, the deposition process and the heating process are performed in the same device and at the same location, in other words, without changing the device and without changing the location within the device. For example, the deposition process and the heating process are performed in the same device at different locations, which is also considered in situ.

In this disclosure, a major face of an object is the face of the object that has a surface area larger than the average surface area of the object, wherein the average surface area of the object is the total surface area of the object divided by the number of faces of the object. In some cases, a major face refers to a face of an item or object that has a larger surface area than a minor face. In the case of planar fuel cells or non-SIS type fuel cells, a major face is the face or surface in the lateral direction.

As used herein, lateral refers to the direction that is perpendicular to the stacking direction of the layers in a non-SIS type fuel cell. Thus, lateral direction refers to the direction that is perpendicular to the stacking direction of the layers in a fuel cell or the stacking direction of the slices to form an object during deposition. Lateral also refers to the direction that is the spread of deposition process.

In this disclosure, a liquid precursor of a substance refers to a dissolved form containing the substance, such as a salt in an aqueous solution. For example, a copper salt dissolved in an aqueous solution is considered a liquid precursor of copper. Copper particles suspended/dispersed (not dissolved) in a liquid are not considered liquid precursors of copper.

As used herein, CGO refers to Gadolinium-Doped Ceria, also known alternatively as gadolinia-doped ceria, gadolinium-doped cerium oxide, cerium(IV) oxide, gadolinium-doped, GDC, or GCO, (formula $Gd:CeO_2$). CGO and GDC are used interchangeably unless otherwise specified.

Syngas (i.e., synthesis gas) in this disclosure refers to a mixture consisting primarily of hydrogen, carbon monoxide and carbon dioxide.

In this disclosure, absorbance is a measure of the capacity of a substance to absorb electromagnetic radiation (EMR) of a wavelength. Absorption of radiation refers to the energy absorbed by a substance when exposed to the radiation.

As used herein, ceria refers to cerium oxide, also known as ceric oxide, ceric dioxide, or cerium dioxide, is an oxide of the rare-earth metal cerium. Doped ceria refers to ceria doped with other elements, such as samaria-doped ceria (SDC), or gadolinium-doped ceria (GDC or CGO).

As used herein, chrom to refers to chromium oxides, which includes all the oxidation states of chromium oxides.

As used herein, "little to no water" refers to a water content no greater than 1 $g/m^3$ or no greater than 200 $mg/m^3$ or no greater than 50 $mg/m^3$.

An interconnect in an electrochemical device (e.g., a fuel cell) is often either metallic or ceramic that is placed between the individual cells or repeat units. Its purpose is to connect each cell or repeat unit so that electricity can be distributed or combined. An interconnect is also referred to as a bipolar plate in an electrochemical device. An interconnect being an impermeable layer as used herein refers to it being a layer that is impermeable to fluid flow. For example, an impermeable layer has a permeability of less than 1 micro darcy, or less than 1 nano darcy.

In this disclosure, an interconnect having no fluid dispersing element refers to an interconnect having no elements (e.g., channels) to disperse a fluid. A fluid may comprise a gas or a liquid or a mixture of a gas and a liquid. Such fluids may include one or more of hydrogen, methane, ethane, propane, butane, oxygen, ambient air or light hydrocarbons (i.e., pentane, hexane, octane). Such an interconnect may have inlets and outlets (i.e., openings) for materials or fluids to pass through.

In this disclosure, the term "microchannels" is used interchangeably with microfluidic channels or microfluidic flow channels.

In this disclosure, sintering refers to a process to form a solid mass of material by heat or pressure, or a combination thereof, without melting the material to the extent of liquefaction. For example, material particles are coalesced into a solid or porous mass by being heated, wherein atoms in the material particles diffuse across the boundaries of the particles, causing the particles to fuse together and form one solid piece. In this disclosure and the appended claims, $T_{sinter}$ refers to the temperature at which this phenomenon begins to take place.

As used herein, the term "pore former" is intended to have a relatively broad meaning. "Pore former" may be referring to any particulate material that is included in a composition during formation, which may partially or completely vacate a space by a process, such as heating, combustion or vaporizing. As used herein, the term "electrically conductive component" is intended to refer to components in a fuel cell, such as electrodes and interconnects, that are electrically conductive.

For illustrative purposes, the production of solid oxide fuel cells (SOFCs) will be used as an example system herein to describe the various embodiments. As one in the art recognizes though, the methodologies and the manufacturing processes described herein are applicable to any electrochemical device, reactor, vessel, catalyst, etc. Examples of electrochemical devices or reactors includes electrochemical (EC) gas producer electrochemical (EC) compressor, solid oxide fuel cells, solid oxide fuel cell stack, solid state battery, or solid oxide flow battery. In an embodiment, an electrochemical reactor comprises solid oxide fuel cell, solid oxide fuel cell stack, electrochemical gas producer, electrochemical compressor, solid state battery, or solid oxide flow battery. Catalysts include Fischer Tropsch (FT) catalysts or reformer catalysts. Reactor/vessel includes FT reactor or heat exchanger.

Electrochemical (EC) Gas Producer

FIG. 1A illustrates an electrochemical (EC) gas producer 100, according to an embodiment of this disclosure. EC gas producer device 100 comprises first electrode 101, electrolyte 103 a second electrode 102. First electrode 101 is configured to receive a fuel and no oxygen 104. Second electrode 102 is configured to receive water or nothing as denoted by arrow 105. Device 100 is configured to simultaneously produce hydrogen 107 from second electrode 102 and syngas 106 from first electrode 101. In an embodiment, 104 represents methane and water or methane and carbon dioxide entering device 100. In other embodiments, 103 represents an oxide ion conducting membrane. In an embodiment, first electrode 101 and second electrode 102 may comprise Ni-YSZ or NiO-YSZ. Arrow 104 represents an influx of hydrocarbon and water or hydrocarbon and carbon dioxide. Arrow 105 represents an influx of water or water and hydrogen. In some embodiments, electrode 101 comprises Cu-CGO further optionally comprising CuO or $Cu_2O$ or combinations thereof. Electrode 102 comprises Ni-YSZ or NiO-YSZ. Arrow 104 represents an influx of hydrocarbon with little to no water, with no carbon dioxide, and with no oxygen, and 105 represents an influx of water or water and hydrogen. Since water provides the oxide ion (which is transported through the electrolyte) needed to oxidize the hydrocarbon/fuel at the opposite electrode, water is considered the oxidant in this scenario.

Figure 1B:
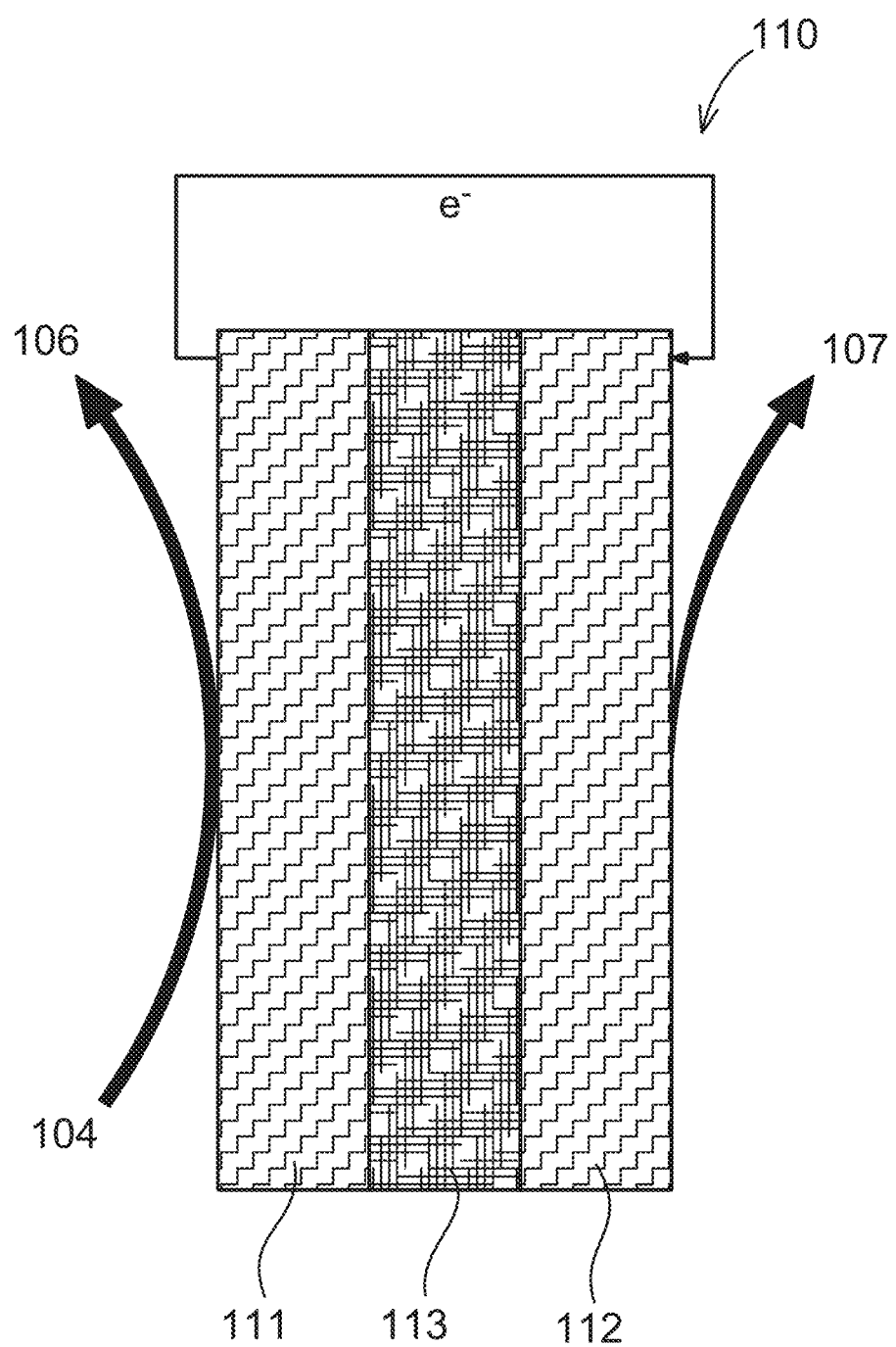
FIG. 1B illustrates an EC gas producer, according to an embodiment of this disclosure.

FIG. 1B illustrates an EC gas producer 110, according to an embodiment of this disclosure. EC gas producer device 110 comprises first electrode 111, second electrode 112, and electrolyte 113 between the electrodes. The first electrode 111 is configured to receive a fuel and no oxygen 104, wherein second electrode 112 is configured to receive water or nothing. In some embodiments, 113 represents a proton conducting membrane, 111 and 112 represent Ni-barium zirconate electrodes. Hydrogen 107 is produced from second electrode 112 and syngas 106 is produced from first electrode 111.

In this disclosure, no oxygen means there is no oxygen present at first electrode 101, 111 or at least not enough oxygen that would interfere with the reaction. Also, in this disclosure, water only means that the intended feedstock is water and does not exclude trace elements or inherent components in water. For example, water containing salts or ions is considered to be within the scope of water only. Water only also does not require 100% pure water but includes this embodiment. In embodiments, the hydrogen produced from second electrode 102, 112 is pure hydrogen, which means that in the produced gas phase from the second electrode, hydrogen is the main component. In some cases, the hydrogen content is no less than 99.5%. In some cases, the hydrogen content is no less than 99.9%. In some cases, the hydrogen produced from the second electrode is the same purity as that produced from electrolysis of water.

In an embodiment, first electrode 101, 111 is configured to receive methane and water or methane and carbon dioxide. In an embodiment, the fuel comprises a hydrocarbon having a carbon number in the range of 1-12, 1-10 or 1-8. Most preferably, the fuel is methane or natural gas, which is predominantly methane. In an embodiment, the device does not generate electricity. In an embodiment, the device comprises a mixer configured to receive at least a portion of the first electrode product and at least a portion of the second electrode product. The mixer may be configured to generate a gas stream in which the hydrogen to carbon oxides ratio is no less than 2, or no less than 3 or between 2 and 3.

In an embodiment, first electrode 101, 111 or second electrode 102, 112, or both the first electrode 101, 111 and second electrode 102, 112 comprise a catalyst and a substrate, wherein the mass ratio between the catalyst and the substrate is no less than 1/100, or no less than 1/10, or no less than 1/5, or no less than 1/3, or no less than 1/1. In an embodiment, the catalyst comprises nickel oxide, silver, cobalt, cesium, nickel, iron, manganese, nitrogen, tetranitrogen, molybdenum, copper, chromium, rhodium, ruthenium, palladium, osmium, iridium, or platinum, or combinations thereof. In an embodiment, the substrate comprises gadolinium, $CeO_2$, $ZrO_7$, $SiO_2$, $TiO_2$, steel, cordierite ($2MgO-2Al_2O_3-5SiO_2$), aluminum titanate ($Al_2TiO_5$), silicon carbide (SEC), all phases of aluminum oxide, yttria or scandia-stabilized zirconia (YSZ), gadolinia or samaria-doped ceria, or combinations thereof. In some embodiments, first electrode 101, 111 or second electrode 102, 112, or both the first electrode 101, 111 and second electrode 102, 112, comprise a promoter wherein the promoter is selected from the group consisting of Mo, W, Ba, K, Mg, Fe, and combinations thereof. In an embodiment, an anode (e.g., the first electrode or the second electrode) comprises a catalyst, wherein the catalyst is selected from the group consisting of nickel, iron, palladium, platinum, ruthenium, rhodium, cobalt, and combinations thereof.

In some embodiments, the electrodes and electrolyte form a repeat unit. A device may comprise two or more repeat units separated by interconnects. In a preferred embodiment, the interconnects comprise no fluid dispersing element. In an embodiment, first electrode 101, 111 or second electrode 102, 112, or both the first electrode 101, 111 and second electrode 102, 112, comprise fluid channels. Alternatively, the first electrode 101, 111 or second electrode 102, 112, or both the first electrode 101, 111 and second electrode 102, 112, comprise fluid dispersing components.

Also discussed herein is an assembly method comprising forming a first electrode 101, 111, forming a second electrode 102, 112, and forming an electrolyte 103, 113 between the electrodes, wherein the electrodes and electrolyte are assembled as they are formed. Forming may comprise material jetting, binder jetting, inkjet printing, aerosol jetting, or aerosol jet printing, vat photopolymerization, powder bed fusion, material extrusion, directed energy deposition, sheet lamination, ultrasonic inkjet printing, or combinations thereof. The electrodes and electrolyte may form a repeat unit. The method may further comprise forming two or more repeat units and forming interconnects between the two or more repeat units. The assembly method may further comprise forming fluid channels or fluid dispersing components in the first electrode 101, 111 or the second electrode 102, 112, or both the first electrode 101, 111 and second electrode 102, 112. The forming method may comprise heating in situ. In a preferred embodiment, the heating comprises EMR. EMR may comprise one or more of UV light, near ultraviolet light, near infrared light, infrared light, visible light, laser or electron beam.

The first electrode 101, 111 is configured to receive a fuel and no oxygen, wherein the second electrode 102, 112 is configured to receive water only or nothing, wherein the device is configured to simultaneously produce hydrogen from the second electrode 102, 112 and syngas from the first electrode 101, 111.

Further discussed herein is a method comprising providing a device comprising a first 101, 111 electrode, a second electrode 102, 112, and an electrolyte 103, 113 between the electrodes, introducing a fuel without oxygen to the first electrode 101, 111, introducing water only or nothing to the second electrode 102, 112 to generate hydrogen, extracting hydrogen from the second electrode 102, 112, and extracting syngas from the first electrode 101, 111. In preferred embodiments, the fuel comprises methane and water or methane and carbon dioxide. In preferred embodiments, the fuel comprises a hydrocarbon having a carbon number in the range of 1-12 or 1-10 or 1-8.

In an embodiment, the method comprises feeding at least a portion of the extracted syngas to a Fischer-Tropsch reactor. In an embodiment, the method comprises feeding at least a portion of the extracted hydrogen to the Fischer-Tropsch reactor. In an embodiment, the at least portion of the extracted syngas and the at least portion of the extracted hydrogen are adjusted such that the hydrogen to carbon oxides ratio is no less than 2, or no less than 3, or between 2 and 3.

In an embodiment, the fuel is directly introduced into the first electrode 101, 111 or water is directly introduced into the second electrode 102, 112, or both the first electrode 101, 111 and second electrode 102, 112. In an embodiment, the first electrode 101, 111 or second electrode 102, 112, or both the first electrode 101, 111 and second electrode 102, 112, comprise a catalyst and a substrate, wherein the mass ratio between the catalyst and the substrate is in no less than 1/100, or no less than 1/10, or no less than 1/5, or no less than 1/3, or no less than 1/1. In preferred embodiments, the catalyst comprises nickel oxide, silver, cobalt, cesium, nickel, iron, manganese, nitrogen, tetra-nitrogen, molybdenum, copper, chromium, rhodium, ruthenium, palladium, osmium, iridium, platinum, or combinations thereof. In preferred embodiments, the substrate comprises gadolinium, $CeO_2$, $ZrO_2$, $SiO_2$, $TiO_2$, steel, cordierite ($2MgO$-$2Al_2O_3$-$5SiO_2$), aluminum titanate ($Al_2TiO_5$), silicon carbide (SEC), all phases of aluminum oxide, yttria or scandia-stabilized zirconia (YSZ), gadolinia or samaria-doped coria, or combinations thereof.

In an embodiment, the method comprises applying a potential difference between the first electrode 101, 111 and the second electrode 102, 112. In an embodiment, the method comprises using the extracted hydrogen in one of the following reactions, or combinations thereof: Fischer-Tropsch (FT) reaction, dry reforming reactions, Sabatier reaction catalyzed by nickel, Bosch reaction, reverse water gas shift reaction, electrochemical reaction to produce electricity, production of ammonia and/or fertilizer, electrochemical compressor for hydrogen storage or fueling hydrogen vehicles, or hydrogenation reactions.

The gas producer is not a fuel cell and does not generate electricity, in various embodiments. Electricity may be applied to the gas producer at the anode and cathode in some cases. In other cases, electricity is not needed.

Herein disclosed is a device comprising a first electrode, a second electrode, and an electrolyte between the electrodes, wherein the first electrode and the second electrode comprise a metallic phase that does not contain a platinum group metal when the device is in use, and wherein the electrolyte is oxide ion conducting. In an embodiment, wherein the first electrode comprises Ni or NiO and a material selected from the group consisting of YSZ, CGO, samaria-doped ceria (SDC), scandia-stabilized zirconia (SSZ), LSGM, and combinations thereof. In an embodiment, the first electrode is configured to receive a fuel and water or a fuel and carbon dioxide. In an embodiment, said fuel comprises a hydrocarbon or hydrogen or carbon monoxide or combinations thereof.

In an embodiment, the first electrode comprises doped or undoped ceria and a material selected from the group consisting of Cu, CuO, Cu2O, Ag, $Ag_2O$, Au, $Au_2O$, $Au_2O_3$, stainless steel, and combinations thereof. In an embodiment, the first electrode is configured to receive a fuel with little to no water. In an embodiment, said fuel comprises a hydrocarbon or hydrogen or carbon monoxide or combinations thereof. In an embodiment, the second electrode comprises Ni or NiO and a material selected from the group consisting of yttria-stabilized zirconia (YSZ), ceria gadolinium oxide (CGO), samaria-doped ceria (SDC), scandia-stabilized zirconia (SSZ), lanthanum strontium gallate magnesite (LSGM), and combinations thereof. In an embodiment, the second electrode is configured to receive water and hydrogen and configured to reduce the water to hydrogen. In an embodiment, the electrolyte comprises doped ceria or wherein the electrolyte comprises lanthanum chromite or a conductive metal or combination thereof and a material selected from the group consisting of doped ceria, YSZ, LSGM, SSZ, and combinations thereof. In an embodiment, the lanthanum chromite comprises undoped lanthanum chromite, strontium doped lanthanum chromite, iron doped lanthanum chromite, lanthanum calcium chromite, or combinations thereof. In an embodiment, the conductive metal comprises Ni, Cu, Ag, Au, or combinations thereof.

In an embodiment, the first electrode 101, 111 or second electrode 102, 112 or both the first electrode 101, 111 and second electrode 102, 112 comprise fluid channels. Alternatively, the first electrode 101, 111 or second electrode 102, 112 or both the first electrode 101, 111 and second electrode 102, 112 comprise fluid dispersing components. In an embodiment, the electrodes and electrolyte 103, 113 form a repeat unit and wherein a device comprises multiple repeat units separated by interconnects. In an embodiment, the interconnects comprise no fluid dispersing elements. In an embodiment, the electrodes 101, 102, 111, 112 and electrolyte 103, 113 may be planar. Fluid dispersing components or fluid channels in the electrodes function to distribute fluids, e.g., reactive gases (such as methane, hydrogen, carbon monoxide, air, oxygen, steam etc.), in an electrochemical reactor. As such, traditional interconnects with channels are no longer needed. The design and manufacturing of such traditional interconnects with channels is complex and expensive. According to this disclosure, the interconnects are simply impermeable layers that conduct or collect electrons, having no fluid dispersing elements.

In an embodiment, the device comprises no interconnect. In an embodiment, the electrolyte 103, 113 conducts oxide ions and electrons. In an embodiment, the electrodes 101, 102, 111, 112 and the electrolyte 103, 113 are tubular. In some embodiments, the electrochemical reactions at the anode and the cathode are spontaneous without the need to apply potential/electricity to the reactor. In such cases, the interconnect is no longer needed, which significantly simplifies the device. In such cases, the electrolyte in the device conducts both oxide ions and electrons.

In an embodiment, the device comprises a reformer upstream of the first electrode 101, 111, wherein the first electrode 101, 111 comprises Ni or NiO or a combination thereof. In an embodiment, the reformer is a steam reformer or an autothermal reformer. In an embodiment, the device is configured to operate at a temperature no less than 500° C., or no less than 600° C., or no less than 700° C.

In an embodiment, the electrodes and the electrolyte are tubular with the first electrode being outermost and the second electrode being innermost, wherein the first electrode comprises doped or undoped ceria and a material selected from the group consisting of Cu, CuO, $Cu_2O$, Ag, $Ag_2O$, Au, $Au_2O$, $Au_2O_3$, stainless steel, and combinations thereof. In an embodiment, the electrodes and the electrolyte are tubular with the first electrode being outermost and the second electrode being innermost, wherein the second electrode is configured to receive water and hydrogen.

Herein also disclosed is a device comprising a first electrode, a second electrode, and an electrolyte between the electrodes, wherein the first electrode comprises doped lanthanum chromium oxide and doped or undoped ceria, wherein the second electrode comprises Ni or NiO and a material selected from the group consisting of YSZ, CGO, Samaria-doped ceria (SDC), Scandia-stabilized zirconia (SSZ), LSGM, ceria, and combinations thereof, and wherein the electrolyte is oxide ion conducting. In an embodiment, the electrolyte comprises YSZ, CGO, LSGM, SSZ, SDC, ceria, or combinations thereof. In an embodiment, the device is planar. In an embodiment, the device is tubular.

Further discussed herein is a method of making a device, comprising forming a first electrode, forming a second electrode, and forming an electrolyte between the electrodes, wherein the first electrode comprises doped lanthanum chromium oxide and doped or undoped ceria, wherein the second electrode comprises Ni or NiO and a material selected from the group consisting of YSZ, CGO, Samaria-doped ceria (SDC), Scandia-stabilized zirconia (SSZ), LSGM, ceria, and combinations thereof, and wherein the electrolyte is oxide ion conducting. In an embodiment, the electrolyte comprises YSZ, CGO, LSGM, SSZ, SDC, ceria, or combinations thereof. In an embodiment, said forming comprises material jetting, binder jetting, inkjet printing, aerosol jetting, or aerosol jet printing, vat photopolymerization, powder bed fusion, material extrusion, directed energy deposition, sheet lamination, or ultrasonic inkjet printing, or combinations thereof. In an embodiment, the forming comprises extrusion, dip coating, spraying, spin coating, brush coating, pasting, or combinations thereof. In an embodiment, the forming comprises heating using an electromagnetic radiation source or a furnace.

Discussed herein is a method of making a device, comprising forming a first electrode, forming a second electrode, and forming an electrolyte between the electrodes, wherein the first electrode and the second electrode comprise a metallic phase that does not contain a platinum group metal when the device is in use, and wherein the electrolyte is oxide ion conducting. In an embodiment, the electrodes and electrolyte are assembled as they are formed. In an embodiment, said electrodes and electrolyte form a repeat unit and said method comprises forming said multiple repeat units and forming interconnects between the repeat units. In an embodiment, the interconnects comprise no fluid dispersing element. In an embodiment, the method comprises forming fluid channels or fluid dispersing components in the first electrode or the second electrode or both the first electrode and the second electrode.

In an embodiment, the first electrode comprises Ni or NiO and a material selected from the group consisting of YSZ, CGO, samaria-doped ceria (SDC), scandia-stabilized zirconia (SSZ), LSGM, and combinations thereof. In an embodiment, the first electrode comprises doped or undoped ceria and a material selected from the group consisting of Cu, CuO, $Cu_2O$, Ag, $Ag_2O$, Au, $Au_2O$, $Au_2O_3$, stainless steel, and combinations thereof. In an embodiment, the second electrode comprises Ni or NiO and a material selected from the group consisting of YSZ, CGO, samaria-doped ceria (SDC), scandia-stabilized zirconia (SSZ), LSGM, cerin, and combinations thereof. In an embodiment, the electrolyte comprises YSZ, CGO, LSGM, SSZ, SDC, ceria, or combinations thereof.

In an embodiment, the forming comprises material jetting, binder jetting, inkjet printing, aerosol jetting, aerosol jet printing, vat photopolymerization, powder bed fusion, material extrusion, directed energy deposition, sheet lamination, ultrasonic inkjet printing, or combinations thereof. In an embodiment, the method comprises heating in situ. In an embodiment, the heating comprises electromagnetic radiation (EMR). In an embodiment, EMR comprises UV light, near ultraviolet light, near infrared light, infrared light, visible light, laser, electron beam, or combinations thereof. In an embodiment, EMR is provided by a xenon lamp. In an embodiment, the electrodes and the electrolyte are planar. In an embodiment, the device comprises no interconnect. In an embodiment, the electrolyte conducts oxide ions and electrons.

In an embodiment, the forming comprises a) depositing a composition on a substrate to form a slice; b) drying the slice using a non-contact dryer; c) heating the slice using electromagnetic radiation (EMR) or conduction or both. In an embodiment, the method comprises repeating steps a)-c) to produce the device slice by slice. In an embodiment, the method comprises comprising d) measuring the slice temperature T within time t after the last exposure of the EMR without contacting the slice, wherein t is no greater than 5 seconds, or no greater than 4 seconds, or no greater than 3 seconds, no greater than 2 seconds, or no greater than 1 second. In an embodiment, the method comprises e) comparing T with $T_{sinter}$, wherein $T_{sinter}$ is no less than 45% of the melting point of the composition if the composition is non-metallic; or wherein $T_{sinter}$ is no less than 60% of the melting point of the composition if the composition is metallic. In an embodiment, the method comprises e) comparing T with $T_{sinter}$, wherein $T_{sinter}$ is previously determined by correlating the measured temperature with microstructure images of the slice, scratch test of the slice, electrochemical performance test of the slice, dilatometry measurements of the slice, conductivity measurements of the slice, or combinations thereof. In an embodiment, the method comprises heating the slice using EMR or conduction or both in a second stage if T is less than 90% of $T_{sinter}$.

In an embodiment, drying takes place for a period in the range of no greater than 5 minutes, or no greater than 3 minutes, or no greater than 1 minute, or from 1 s to 30 s, or from 3 s to 10 s. In an embodiment, the non-contact dryer comprises infrared heater, hot air blower, ultraviolet light source, or combinations thereof.

As an example, all the layers of an EC gas producer are formed and assembled via printing. The materials for making the anode, cathode, electrolyte, and the interconnect, respectively, are made into an ink form comprising a solvent and particles (e.g., nanoparticles). The ink optionally comprises a dispersant, binder, plasticizer, surfactant, co-solvent, or combinations thereof. For the anode and the cathode of a gas producer, NiO and YSZ particles are mixed with a solvent, wherein the solvent is water (e.g., de-ionized water) or an alcohol (e.g., butanol) or a mixture of alcohols. Organic solvents other than alcohols may also be used. For the electrolyte, YSZ particles are mixed with a solvent, wherein the solvent is water (e.g., de-ionized water) or an alcohol (e.g., butanol) or a mixture of alcohols. Organic solvents other than alcohols may also be used. For the interconnect, metallic particles (such as, silver nanoparticles) are dispersed or suspended in a solvent, wherein the solvent may include water (e.g., de-ionized water), organic solvents (e.g., mono-, di-, or tri-ethylene glycols or higher ethylene glycols, propylene glycol, 1,4-butanediol or ethers of such glycols, thiodiglycol, glycerol and ethers and esters thereof, polyglycerol, mono-, di-, and tri-ethanolamine, propanolamine, N,N-dimethylformamide, dimethyl sulfoxide, dimethylacetamide, N-methylpyrrolidone, 1,3-dimethylimidazolidone, methanol, ethanol, isopropanol, n-propanol, diacetone alcohol, acetone, methyl ethyl ketone, propylene carbonate), and combinations thereof. For a barrier layer, CGO particles may be dissolved, dispersed or suspended in a solvent, wherein the solvent is water (e.g., de-ionized water) or an alcohol (e.g., butanol) or a mixture of alcohols. Organic solvents other than alcohols may also be used. CGO is used as barrier layer for LSCF. YSZ may also be used as a barrier layer for LSM.

Tubular and Multi-Tubular EC Gas Producers

Figure 2A:
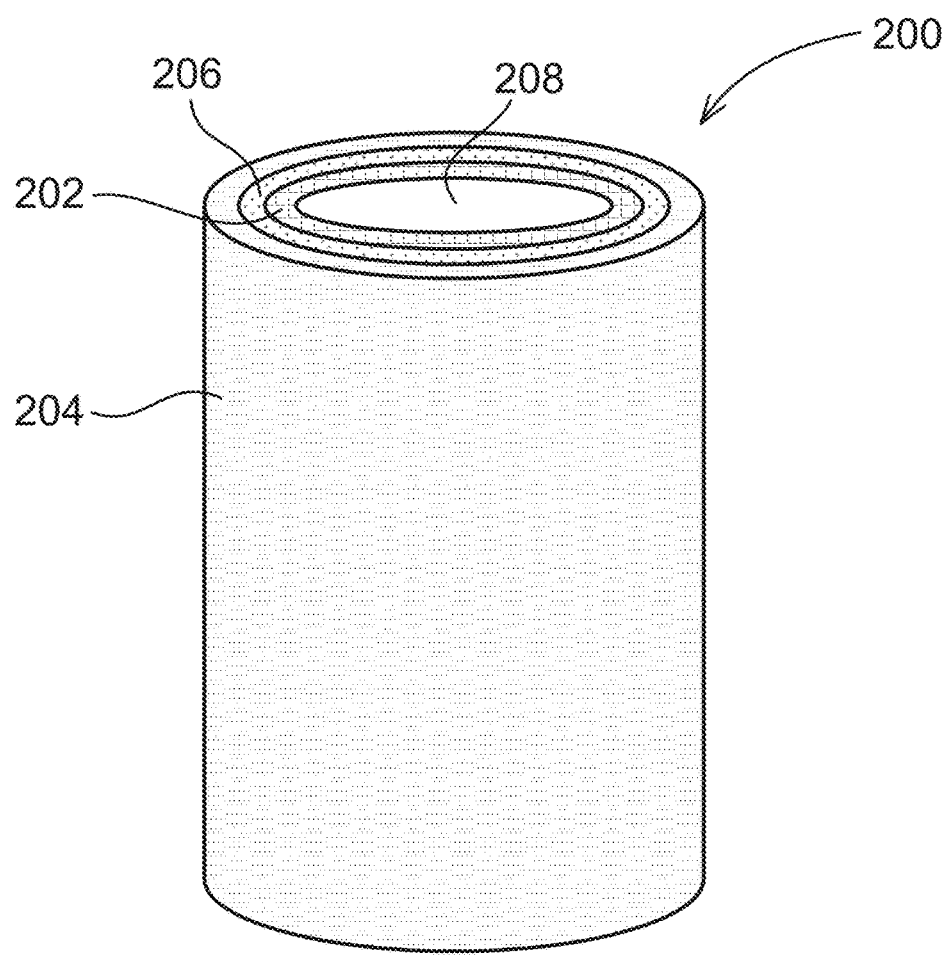
FIG. 2A illustrates a tubular EC gas producer, according to an embodiment of this disclosure.

FIG. 2A illustrates (not to scale) a tubular EC gas producer 200, according to an embodiment of this disclosure. Tubular EC gas producer 200 includes an inner tubular structure 202, an outer tubular structure 204, and an electrolyte 206 disposed between the inner and outer tubular structures 202, 204, respectively. In some embodiments, electrolyte 206 may instead comprise a membrane. Tubular gas producer 200 further includes a void space 208 for fluid passage.

Figure 2B:
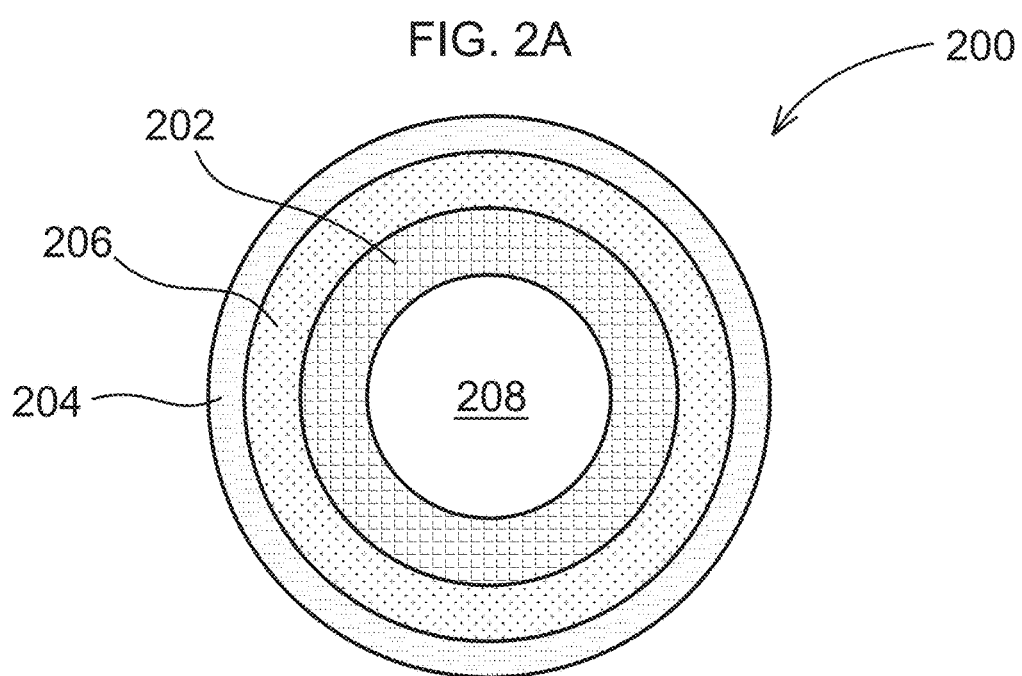
FIG. 2B illustrates a cross section of a tubular EC gas producer, according to an embodiment of this disclosure.

FIG. 2B illustrates (not to scale) a cross section of a tubular EC gas producer 200, according to an embodiment of this disclosure. Tubular EC gas producer 200 includes a first inner tubular structure 202, a second outer tubular structure 204, and an electrolyte 206 between the inner and outer tubular structures 202, 204. In some embodiments, electrolyte 206 may be referred to as a membrane. Tubular gas producer 200 further includes a void space 208 for fluid passage.

In an embodiment, inner tubular structure 202 comprises an electrode. Inner tubular structure 202 may be an anode or a cathode. In an embodiment, inner tubular structure 202 may be porous. Inner tubular structure 202 may comprise Ni or NiO and a material selected from the group consisting of YSZ, CGO, samaria-doped ceria (SDC), scandia-stabilized zirconia (SSZ), LSGM, and combinations thereof. Inner tubular structure 202 may comprise doped or undoped ceria and a material selected from the group consisting of Cu, CuO, $Cu_2O$, Ag, $Ag_2O$, Au, $Au_2O$, $Au_2O_3$, stainless steel, and combinations thereof. In an embodiment, outer tubular structure 204 comprises an electrode. Outer tubular structure 204 may be an anode or a cathode. Outer tubular structure 204 may comprise Ni or NiO and a material selected from the group consisting of YSZ, CGO, samaria-doped ceria (SDC), scandia-stabilized zirconia (SSZ), LSGM, and combinations thereof. Outer tubular structure 204 may comprise doped or undoped ceria and a material selected from the group consisting of Cu, CuO, $Cu_2O$, Ag, $Ag_2O$, Au, $Au_2O$, $Au_2O_3$, stainless steel, and combinations thereof. It should be noted that the listing of materials above is not limiting.

In embodiments, electrolyte 206 comprises doped ceria or wherein the electrolyte comprises lanthanum chromite or a conductive metal or combination thereof and a material selected from the group consisting of doped ceria, YSZ, LSGM, SSZ, and combinations thereof. In an embodiment, the lanthanum chromite comprises undoped lanthanum chromite, strontium doped lanthanum chromite, iron doped lanthanum chromite, lanthanum calcium chromite, or combinations thereof. In an embodiment, the conductive metal comprises Ni, Cu, Ag, Au, or combinations thereof. Electrolyte 206 is be oxide ion conducting. In some cases, electrolyte 206 is both oxide ion and electronically conducting. In some embodiments, the producer 200 further comprises one or more interconnects.

Figure 3A:
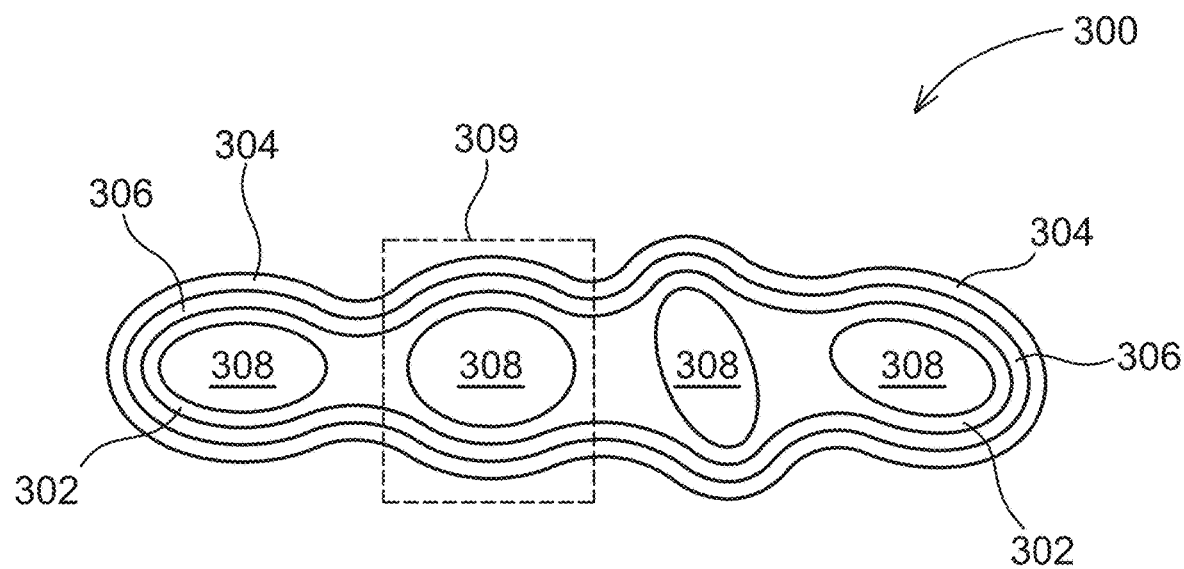
FIG. 3A illustrates a cross section of a multi-tubular EC gas producer, according to an embodiment of the disclosure.

FIG. 3A illustrates a cross section of a multi-tubular EC gas producer 300, according to an embodiment of the disclosure. EC gas producer 300 comprises an inner electrode 302, an outer electrode 304, and an electrolyte 306 between the electrodes 302, 304. In some embodiments, electrolyte 306 is referred to as a membrane. The inner electrode 302 comprises multiple tubular-like void spaces 308 joined in the radial direction. Void spaces 308 allow for fluid passage. Void spaces 308 may also be referred to as fluid passages. The multi-tubular structure 300 comprises multiple fluid passages 308 in the axial direction of the tubular structure 300. The cross-section of void spaces 308 may be circular-like, oval-like or other similar shapes. The cross-sections of spaces 308 may be irregular shaped as illustrated in FIG. 3A. Producer 300 has a cross section having a length and a width, wherein the length is at least 2 times the width and the cross section is orthogonal to the axial direction of the tubular. Multi-tubular structure 300 is comprised of multiple individual tubular structures 309 (denoted by a dotted line).

Inner electrode 302 in producer 300 may be of unitary construction and has no brazed or soldered part. In an embodiment, the producer 300 is of unitary construction and has no brazed or soldered part. In an embodiment, the electrolyte 306 is oxide ion conducting and is solid state. In an embodiment, the electrolyte comprises a material previously listed herein for electrolyte 206 in tubular reactor 200. In embodiments, the electrodes 302, 304 may comprise one or more materials previously listed herein for tubular structures 202, 204 in tubular reactor 200. In some embodiments, the producer 300 further comprises one or more interconnects.

Figure 3B:
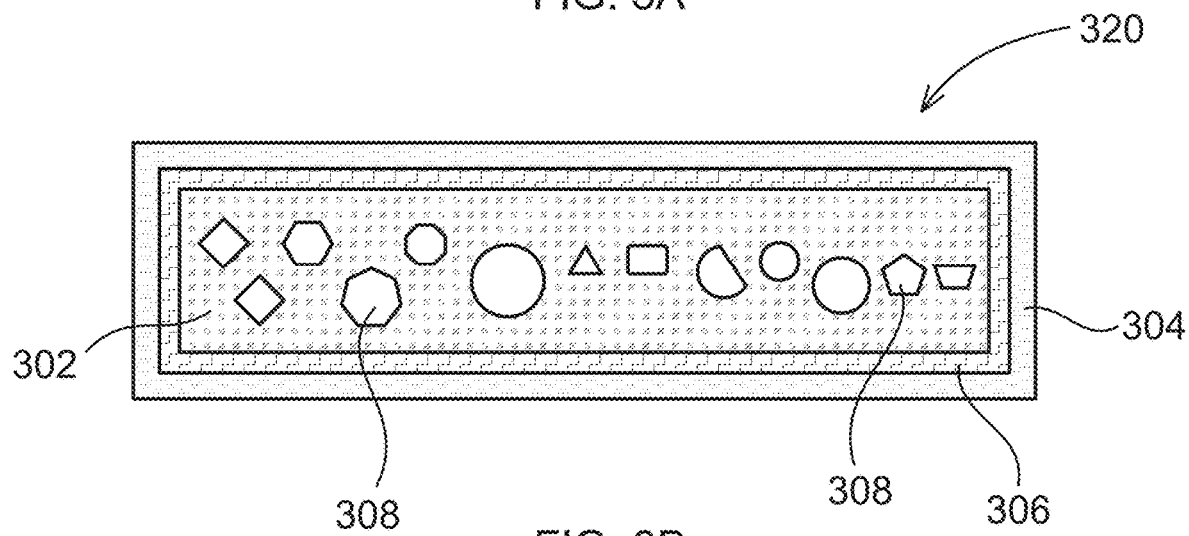
FIG. 3B illustrates a cross section of a multi-tubular EC gas producer, according to an embodiment of the disclosure.

FIG. 3B illustrates a cross section of a multi-tubular EC gas producer 320, according to an embodiment of the disclosure. Gas producer has a rectangular-like shape cross-section. EC gas producer 320 comprises an inner electrode 302, an outer electrode 304, and an electrolyte 306 between the electrodes 302, 304. In some embodiments, a membrane may be used in place of electrolyte 306. The inner electrode 302 comprises multiple void spaces 308 joined in the radial direction of the tubular-like void spaces 308. Void spaces 308 allow for fluid passage. The multiple tubular structure 320 comprises multiple fluid passages 308 in the axial direction of the tubular structure 320. The cross-section of void spaces 308 may be circular-like, oval-like, square-like, hexagonal-like, triangular-like or other similar shapes in a random or regular fashion. Producer 320 has a cross section having a length and a width, wherein the length is at least 2 times the width and the cross section is orthogonal to the axial direction of the tubular.

Inner electrode 302 in producer 320 may be of unitary construction and have no brazed or soldered part. Producer 320 may be of unitary construction and have no brazed or soldered part. In an embodiment, the electrolyte 306 is oxide ion conducting. In embodiments, the electrolyte may comprise one or more materials previously listed herein for electrolyte 206 in tubular reactor 200. In embodiments, the electrodes 302, 304 may comprise one or more materials previously listed herein for tubular structures 202, 204 in tubular reactor 200. In some embodiments, the producer 320 further comprises one or more interconnects.

Figure 3C:
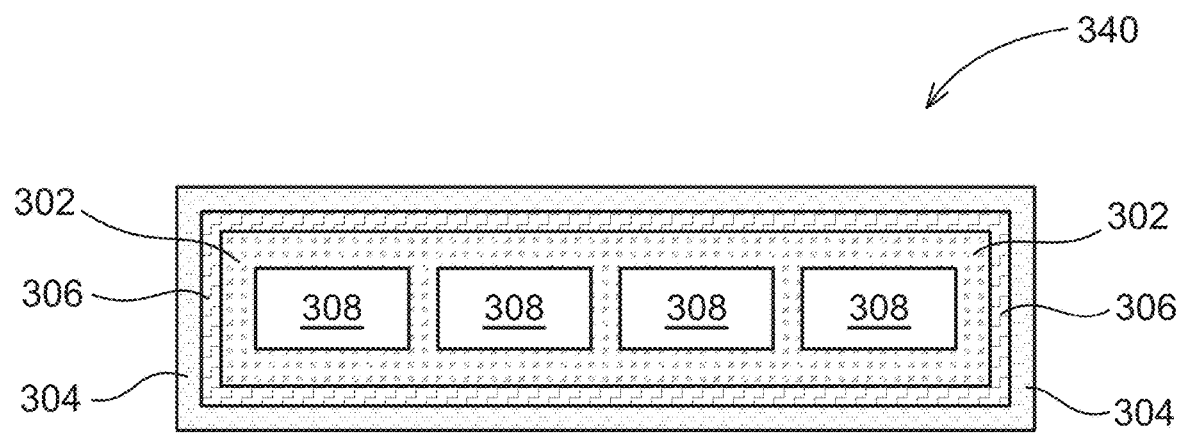
FIG. 3C illustrates a cross section of a multi-tubular EC gas producer, according to an embodiment of the disclosure.

FIG. 3C illustrates a cross section of a multi-tubular EC gas producer 340, according to an embodiment of the disclosure. Gas producer 340 has a rectangular-like shape cross-section. EC gas producer 340 comprises an inner electrode 302, an outer electrode 304, and an electrolyte 306 between the electrodes 302, 304. In some embodiments, electrolyte 306 is referred to as a membrane. The inner electrode 302 comprises multiple void spaces 308 joined in the axial direction of the tubular. Void spaces 308 allow for fluid passage. The multiple tubular structure 340 comprises multiple fluid passages 308 in the axial direction of the tubular structure 340. The cross-section of void spaces 308 may be square-like or rectangular-like as shown in FIG. 3C or other similar shapes in a regular fashion wherein the cross-sectional area of each void space is substantially identical. Producer 340 has a cross section having a length and a width, wherein the length is at least 2 times the width and the cross section is orthogonal to the axial direction of tubular.

Inner electrode 302 in producer 340 may be of unitary construction and have no brazed or soldered part. Producer 340 may be of unitary construction and have no brazed or soldered part. In an embodiment, the electrolyte 306 is oxide ion conducting. In embodiments, the electrolyte may comprise one or more materials previously listed herein for electrolyte 206 in tubular reactor 200. In embodiments, the electrodes 302, 304 may comprise one or more materials previously listed herein for tubular structures 202, 204 in tubular reactor 200. In some embodiments, the producer 340 further comprises one or more interconnects.

Figure 3D:
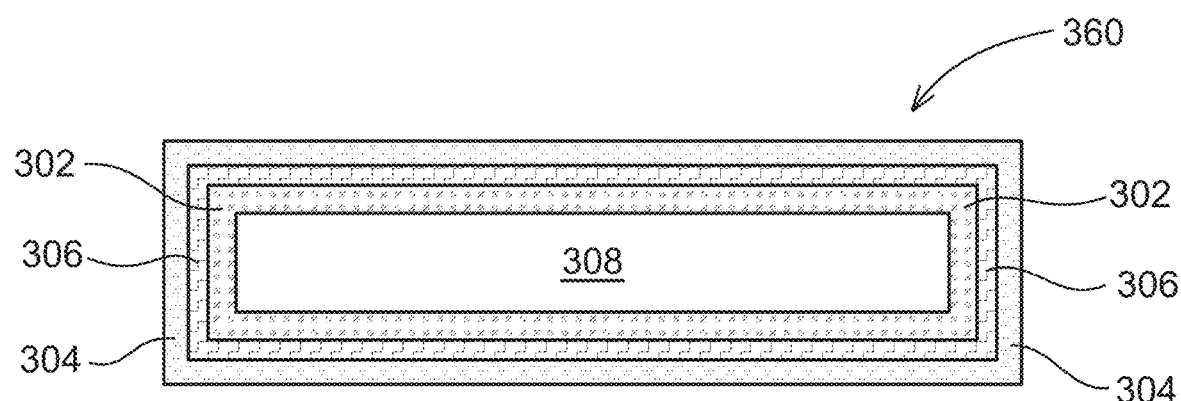
FIG. 3D illustrates a cross section of an EC gas producer, according to an embodiment of the disclosure.

FIG. 3D illustrates a cross section of an EC gas producer 360, according to an embodiment of the disclosure. Gas producer 360 has a rectangular-like shape cross-section. EC gas producer 360 is similar to gas producer 340 in FIG. 3C, except that the fluid passage 380 is single as shown in FIG. 3D.

Manufacture of Tubular and Multi-Tubular EC Gas Producers

Figure 5A:
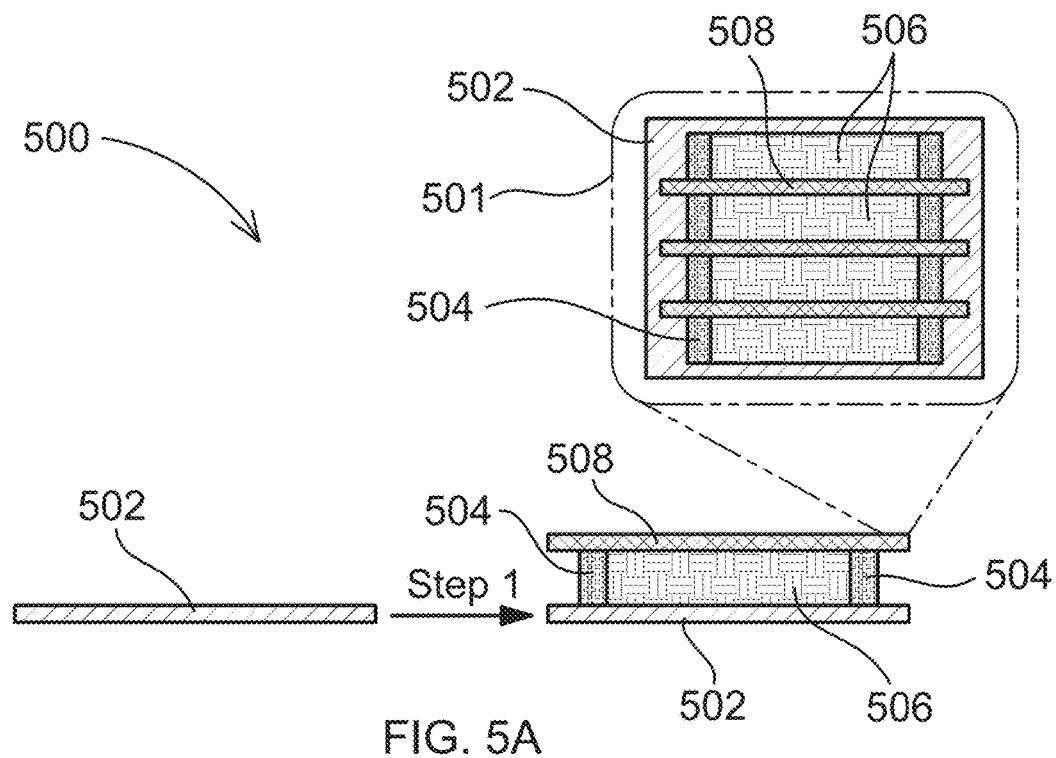
FIG. 5A illustrates a first step in a tape casting method to form a tubular or multi-tubular EC gas producer, according to an embodiment of the disclosure.
Figure 5B:
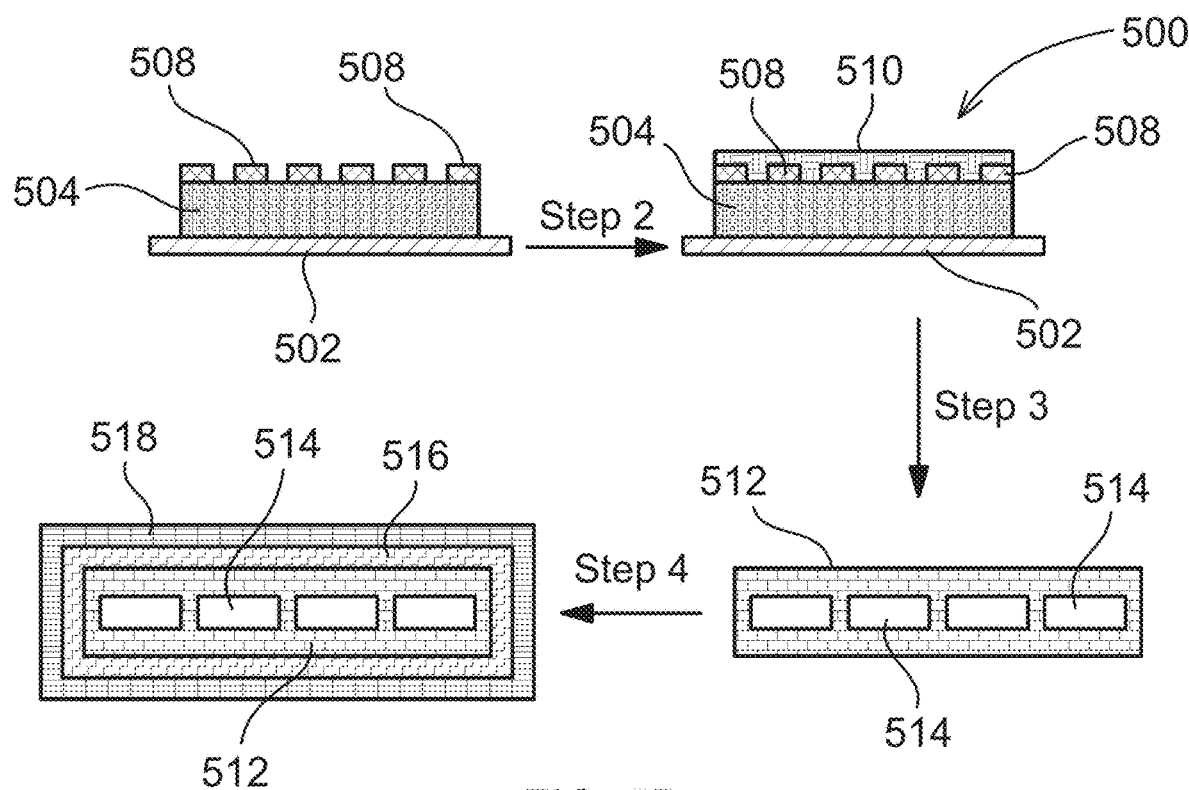
FIG. 5B illustrates steps 2-4 in a tape casting method to form a tubular or multi-tubular EC gas producer, according to an embodiment of the disclosure.

Further discussed herein is a method of making a tubular EC gas producer as illustrated by device 200, 300, 320, 340, and 360, which are mere examples of some tubular designs. At least three methods are discussed herein regarding how to make the first tubular: extrusion method, substrate method, and the process as shown in FIG. 5A-5B.

In an embodiment, a method of making a tubular EC gas producer comprises forming a first tubular structure by extrusion. In some embodiments, the first tubular structure is an inner electrode 202. The method further comprises depositing a layer on the outer cylindrical surface of the first tubular structure 202, wherein the layer comprises an electrolyte 206, and depositing a second tubular structure 204 over the electrolyte 206, wherein the electrolyte 206 is oxide ion conducting. In an embodiment, the first tubular structure 202 and the second tubular structure 204 comprise a metallic phase that does not contain a platinum group metal when the device is in use. In an embodiment, the device comprises no interconnect and wherein the electrolyte is electronically conducting.

In another manufacturing method embodiment, a method comprises extruding an inner tubular structure 202; sintering the inner tubular structure 202 in a furnace or with EMR to form a first electrode; coating the outer surface of the inner tubular structure 202 with an electrolyte material; sintering the electrolyte material in a furnace or EMR to form an electrolyte 206; coating the electrolyte 206 with an electrode material; sintering the electrode material in a furnace or using electromagnetic radiation (EMR) to form an outer tubular structure 204 wherein the outer tubular structure 204 is a second electrode. In an embodiment, outer tubular structure 204 comprises doped or undoped ceria and a material selected from the group consisting of Cu, CuO, $Cu_2O$, Ag, $Ag_2O$, Au, $Au_2O$, $Au_2O_3$, stainless steel, and combinations thereof; and is sintered using EMR. In an embodiment, the method further comprises reducing the outer tubular structure 204 or reducing the inner tubular structure 202 or both tubular structures 202, 204. These methods describe an "inside out" method wherein the first extruded layer is the inner electrode layer.

The following method describes an "outside in" method wherein the first layer formed is the outer tubular structure 204 or outer electrode layer. The method comprises extruding an outer tubular structure 204; sintering the outer tubular structure 204 in a furnace or with EMR to form a first electrode; coating the inner surface of the outer tubular structure 204 with an electrolyte material; sintering the electrolyte material in a furnace or EMR to form an electrolyte 206; coating the inner surface of electrolyte 206 with an electrode material; sintering the electrode material in a furnace or using electromagnetic radiation (EMR) to form an inner tubular structure 202 wherein the inner tubular structure 202 is a second electrode. In an embodiment, inner tubular structure 202 comprises doped or undoped ceria and a material selected from the group consisting of Cu, CuO, $Cu_2O$, Ag, $Ag_2O$, Au, $Au_2O$, $Au_2O_3$, stainless steel, and combinations thereof; and is sintered using EMR. In an embodiment, the method further comprises reducing the outer tubular structure 204 or reducing the inner tubular structure 202 or both tubular structures 202, 204.

In an embodiment, the coating steps for use in the "inside out" and "outside in" methods comprise dip coating, spraying, ultrasonic spraying, spin coating, brush coating, pasting, or combinations thereof. The electromagnetic radiation comprises UV light, near ultraviolet light, near infrared light, infrared light, visible light, laser, electron beam, microwave or combinations thereof. In an embodiment, electromagnetic radiation is provided by a xenon lamp. In some embodiments, the device may comprise one or more interconnects. In an embodiment, the inner tubular structure 202 and the outer tubular structure 204 comprise one or more fluid channels or one or more fluid dispersing components or both fluid channels and fluid dispersing components.

In another embodiment, the inner tubular structure 202 or the outer tubular structure 204 may be formed from particulates and not from liquid precursors, especially when the inner tubular structure 202 or the outer tubular structure 204 comprises doped or undoped ceria and a material selected from the group consisting of Cu, CuO, $Cu_2O$, Ag, $Ag_2O$, Au, Au$_2$O, Au$_2$O$_3$, stainless steel, and combinations thereof. The particulates are suspended in a liquid before being deposited or coated, such as dip coating, spraying, spin coating, brush coating, pasting, or combinations thereof. In such cases, the inner tubular structure 202 or the outer tubular structure 204 is sintered using electromagnetic radiation (EMR).

In other embodiments, a first tubular-like substrate is provided. The tubular substrate is substantially in a desired shape of an EC gas producer. In a first embodiment, a first electrode material is deposited on the outside of the tubular substrate. The first electrode material is sintered to form an inner electrode 202. An electrolyte material is then deposited on the inner electrode layer 202 surface. The electrolyte material is the sintered to form an electrolyte 206. A second electrode material is then deposited on the electrolyte 206. The second electrode material is then sintered to form an outer electrode 204. This method may be described as an "inside out substrate method" wherein the first layer formed on the substrate is the inner electrode layer 202 followed by the electrolyte 206 layer then the outer electrode layer 204. The first and second electrodes may be an anode or cathode. Sintering may comprise thermal or EMR sintering.

In another similar method, a tubular-like substrate is provided. A first electrode material is deposited on the inside of the tubular substrate. The first electrode material is sintered to form an outer electrode 204. An electrolyte material is then deposited on the outer electrode layer 204 surface. The electrolyte material is the sintered to form an electrolyte 206. A second electrode material is then deposited on the electrolyte 206. The second electrode material is then sintered to form an inner electrode 202. This method may be described as an "outside in substrate method" wherein the first layer formed on the substrate is the inner electrode layer 202 followed by the electrolyte 206 layer then the outer electrode layer 204. The first and second electrodes may be an anode or cathode. Sintering may comprise thermal or EMR sintering.

In some embodiments, the substrate may then be removed once the final electrode is formed. The substrate may be removed by physical means. The substrate may be dissolved and removed by means of a solvent. In some methods, the substrate may be comprised of a low melting material such as a polymer, wherein the substrate may be melted or gasified and removed during any one of a thermal sintering step. For example, the substrate may comprise a combustible material such that during one of the thermal sintering steps the substrate is burned away.

In an embodiment, the first tubular (inner or outer) and the electrolyte are sintered in an oven separately. In an embodiment, the first tubular (inner or outer) and the electrolyte are co-sintered in an oven, which means that the first tubular is coated with the electrolyte material before being sintered. The second tubular (outer or inner) is deposited on the electrolyte and then sintered using EMR, wherein the second tubular comprises doped or undoped ceria and a material selected from the group consisting of Cu, CuO, Cu$_2$O, Ag, Ag$_2$O, Au, Au$_2$O, Au$_2$O$_3$, stainless steel, and combinations thereof. FIGS. 4A-4D illustrate various arrangements to sinter a tubular using an EMR source. The EMR source and the tubular may move relative to one another, e.g., in the axial direction or in a spiraling trajectory, to ensure the entire surface of the tubular (inner or outer) is sintered by sufficiently exposing it to the EMR source. In an embodiment, the EMR source is a xenon lamp, such as a circular xenon lamp, a long tubular xenon lamp, a point tubular xenon lamp.

Figure 4A:
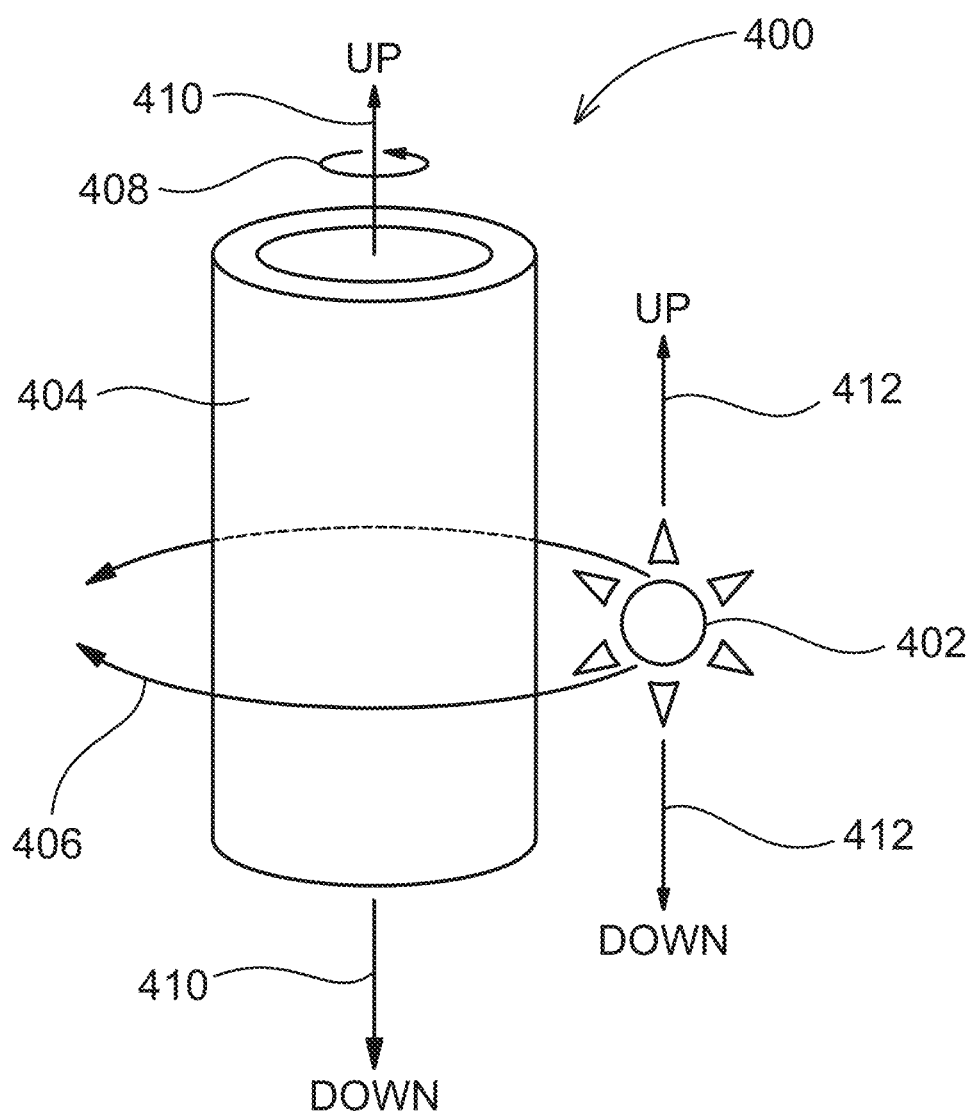
FIG. 4A illustrates a portion of a method of manufacturing an EC gas producer using a single point EMR source, according to an embodiment of the disclosure.

FIGS. 4A-4D illustrate sintering methods and systems for manufacturing tubular EC gas producers using EMR. FIG. 4A illustrates a portion of a method of manufacture 400 of an EC gas producer using a single point EMR source, according to an embodiment of the disclosure. The EMR source (e.g., a xenon lamp) 402 and the tubular structure 404 can move relative to one another. As shown in FIG. 4A, the single point EMR 402 may rotate around the tubular structure 404 (e.g., in a spiral-like trajectory) in either direction as denoted by arrow 406. Alternatively, the tubular structure 404 may rotate around the single point EMR 402. In another embodiment, the tubular structure 404 may rotate around its own axis 408 or move in an up or down direction 410 along its own long axis or a combination thereof. The single point EMR source 402 may also move in an up or down direction 412.

Figure 4B:
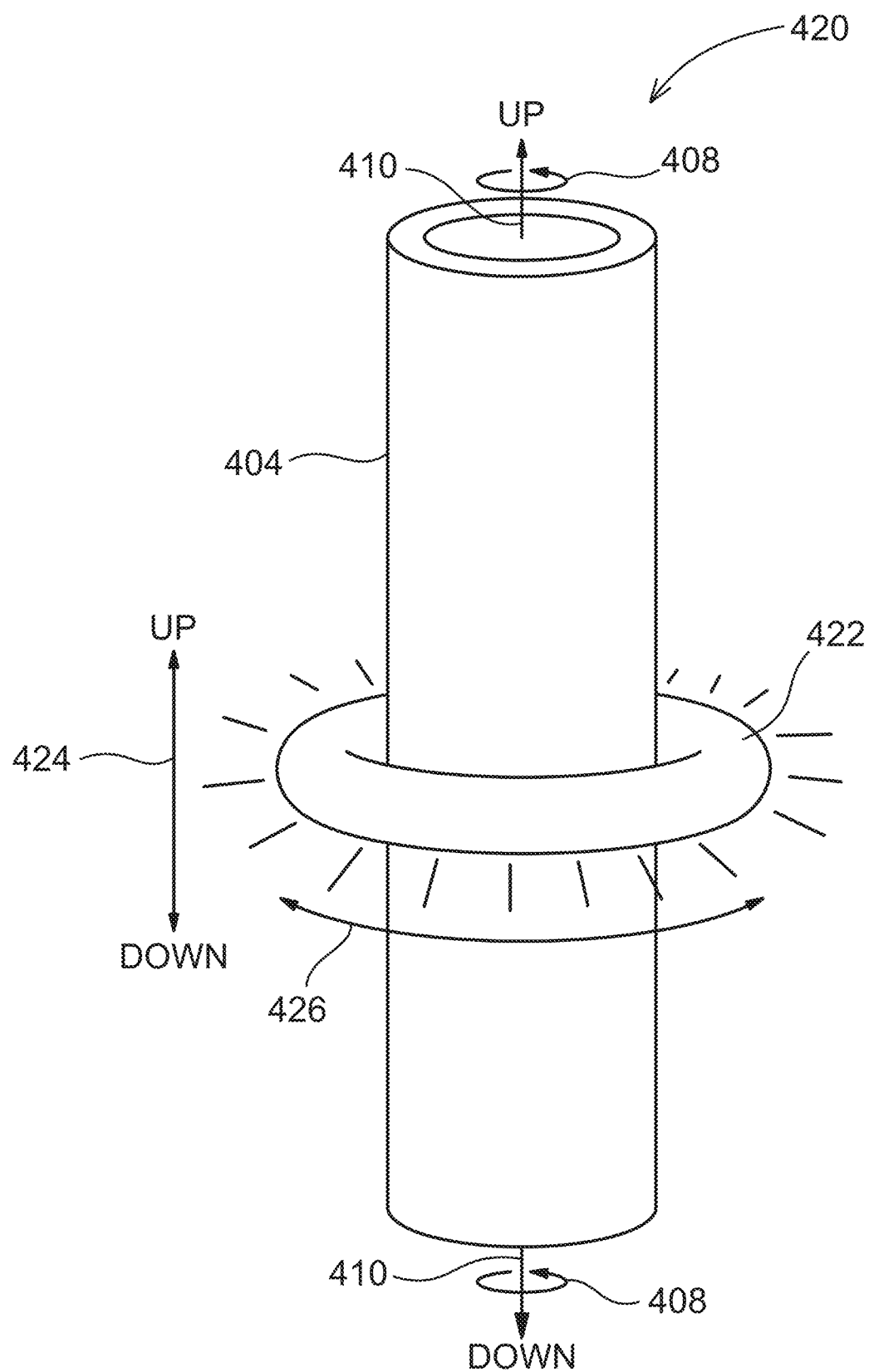
FIG. 4B illustrates a portion of a method of manufacturing an EC gas producer using a ring-lamp EMR source, according to an embodiment of the disclosure.

FIG. 4B illustrates a portion of a method of manufacture 420 of an EC gas producer using a ring-lamp EMR source, according to an embodiment of the disclosure. As shown in FIG. 4B, a circular ring-like lamp (e.g., xenon lamp) 422 is shown as the EMR source with a hollow circle in the center. The tubular structure 404 is placed in the center of the circular ring lamp 422. In some embodiments, the tubular structure 404 may move up or down 410 or rotate 408 around its own axis while the ring lamp is 422 held in a stationary manner. In other embodiments, tubular structure 404 may be held in a stationary manner while ring lamp 422 may move along the length of tubular structure 404. Ring lamp 422 may move in an up or down 424 manner or in a manner which it rotates (426) on its own axis to assure complete and thorough sintering. In other embodiments, both the tubular structure 402 and the ring lamp 422 may both be able to move relative to each other to ensure the entire tubular structure 404 is thoroughly and completely sintered. FIG. 4A-4B illustrate embodiments where the outer surface of the tubular structure 404 is sintered via EMR. These methods may be used to sinter anodes, cathodes, electrolytes and other components of tubular EC gas producers.

Figure 4C:
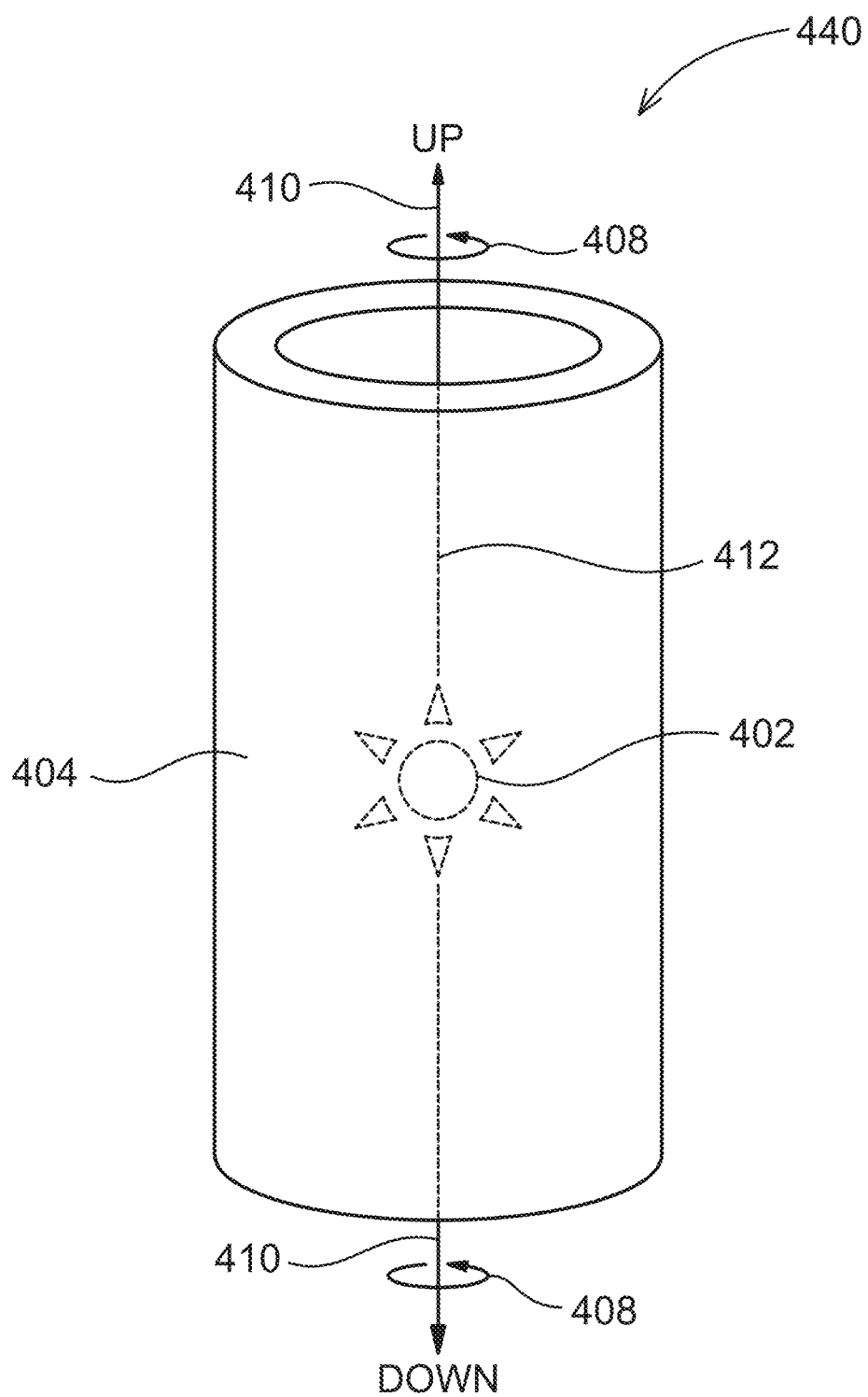
FIG. 4C illustrates a portion of a method of manufacturing an EC gas producer using a single point EMR source, according to an embodiment of the disclosure.
Figure 4D:
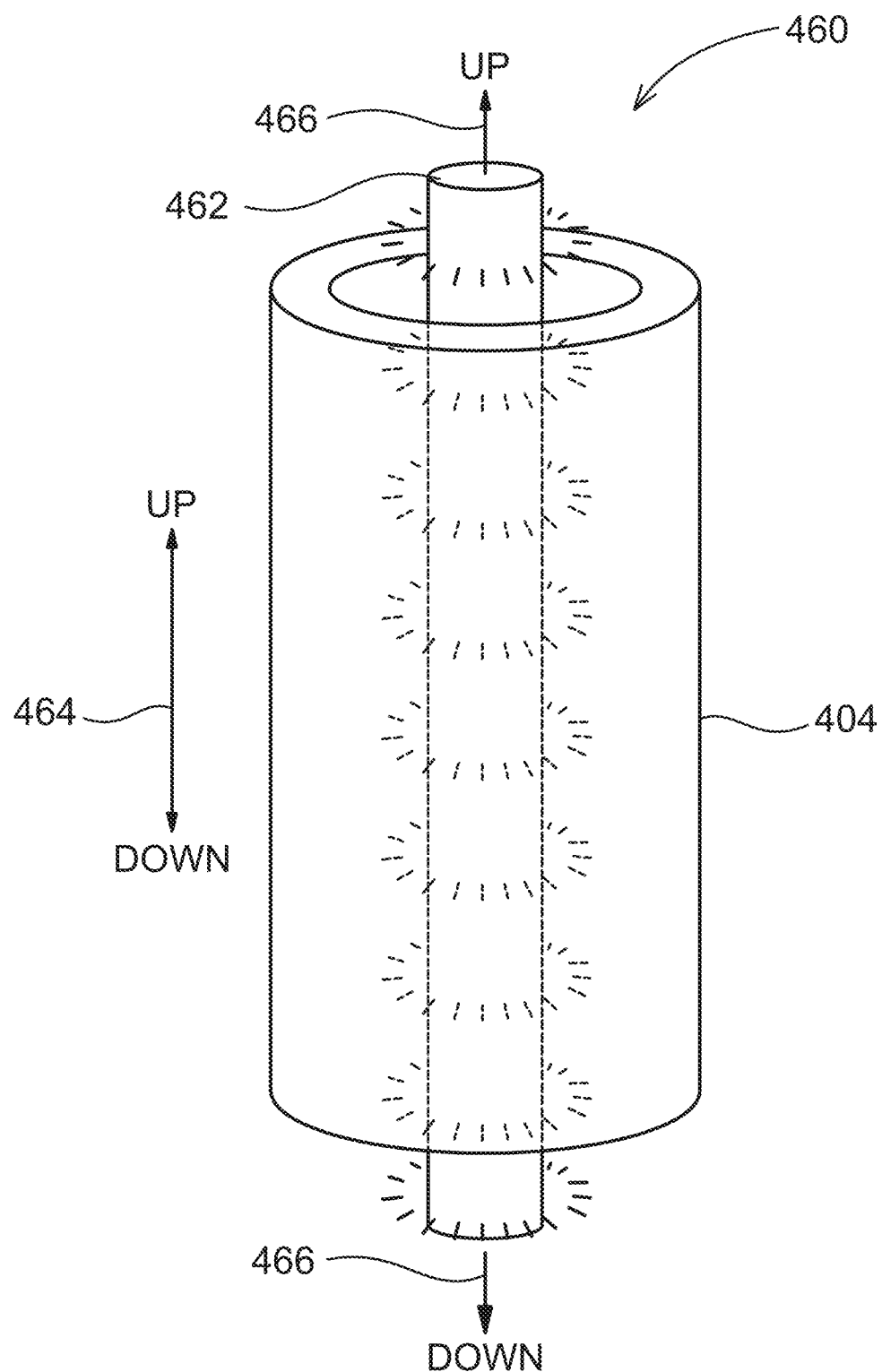
FIG. 4D illustrates a portion of a method of manufacturing an EC gas producer using a tubular EMR source, according to an embodiment of the disclosure.

FIGS. 4C-4D illustrate the embodiment wherein the inner surface of the tubular structure 404 is sintered via EMR. FIG. 4C illustrates a portion of a method of manufacturing 440 of an EC gas producer using a single point EMR source, according to an embodiment of the disclosure. FIG. 4C illustrates a single point EMR source (e.g., a xenon lamp) 402 that is placed inside a tubular structure 404. In a first embodiment, the tubular structure 404 may be held in a stationary manner while the single point EMR source may be moved in an up or down 412 manner. In a preferred embodiment, single point EMR source 402 may irradiate substantially equally in all directions. In another embodiment, single point EMR source may be held in a stationary manner while tubular structure 404 may be moved in an up or down direction 410 or rotated 408 about its own axis. In another embodiment, the tubular structure 404 and the single point EMR source 402 both move relative to one another such that the entire inner surface of the tubular structure 404 is thoroughly and substantially sintered.

FIG. 4D illustrates a portion of a method of manufacturing 460 of an EC gas producer using a tubular EMR source, according to an embodiment of the disclosure. FIG. 3E4D illustrates a cylindrical lamp as the EMR source (e.g., a tubular xenon lamp) 462 that is placed inside the tubular structure 404 to be sintered. The length of the lamp in this case is such that the entire inner surface of the tubular structure 404 may be sintered without the tubular lamp 462 and the tubular structure 404 needing to move relative to one another. In one embodiment, tubular lamp 462 may be held in a stationary manner while tubular structure 404 may be moved over the lamp 462. Tubular structure 404 may be moved in an up or down manner 464. For example, unsintered tubular structure 404 may be moved over tubular lamp 462 into a specified position, remain in this position until sufficient radiation is carried out and tubular structure 404 is substantially sintered, then moved in an up or down direction as denoted by arrow 464 off of the tubular lamp 462 for the next manufacturing step. In another embodiment, unsintered tubular structure 404 may be held in a stationary position while tubular lamp EMR source 462 is moved into the tubular structure 404. Tubular lamp 462 may be moved in an up or down fashion as denoted by arrows 464. The tubular structure 404 may be formed using any suitable method, such as the methods discussed herein. For the embodiments of FIG. 4C-4D, coating and sintering take place on the inner surface of the tubular structure 404.

Many variations are possible for sintering as illustrated in FIGS. 4A-4D. For example, an outer tubular structure 204 may be formed and thermally sintered in a furnace to form an anode or a cathode. An electrolyte material may then be coated on the inner surface of the outer tubular structure 204 and then sintered in a furnace or using a single point EMR 402 or tubular lamp EMR 462 inside of the tubular structure to form an electrolyte 206. Another electrode material may then be coated on the inner surface of the electrolyte 206 and then sintered in a furnace or using EMR source 402, 462 to form an inner tubular structure 202 such as an anode or cathode. For example, for a copper, gold, or silver-containing anode, the inner electrode is sintered using an EMR source. For example, for Ni or NiO-containing anode, the inner electrode is sintered in a furnace or by an EMR source.

In some embodiments, a combination of an EMR source inside of a tubular electrode 202, 204 or electrolyte 206 and an EMR source on the outside of a tubular electrode 202, 204 or electrolyte 206 may be used simultaneously to sinter. For example, a tubular EMR source 462 and a ring-like EMR source 422 may be used in the same sintering device to sinter sequentially or simultaneously.

FIGS. 5A-5B Illustrates another method to form the first tubular or multi-tubular in EC gas producers. FIG. 5A illustrates a first step in a tape casting method 500 to form a tubular or multi-tubular EC gas producer, according to an embodiment of the disclosure. In a first step, supports 504 are placed onto a substrate 502, wherein the height of the supports 504 is preconfigured to ensure a desirable thickness of the tubular electrode 506 on the bottom side. The substrate 502 and the supports 504 may be made of metal, glass, plastic, wood, or any suitable material as known in the art. An electrode material 506 in a dispersion or slurry form is deposited on the substrate 502 between the supports 504. The term slurry will be used in the description, but a dispersion may also be used interchangeably. One or more spacers 508 are then placed on top of the slurry 506 and rested on supports 504. View 501 is an overhead view or top view further illustrating and showing an example of how the substrate 502, supports 504, electrode material 506 and spacers 508 may be arranged.

FIG. 5B illustrates steps 2-4 in a tape casting method 500 to form a first tubular or a first multi-tubular in an EC gas producer, according to an embodiment of the disclosure. In step 2 additional slurry 510 is deposited to cover the spacer(s) 508 and the previously deposited slurry 506. A blade, such as a doctor blade, may be used to scrape across the top of the additional slurry 510 to ensure a suitable thickness of the tubular electrode on the top side. In a preferred embodiment, the slurry contains mainly organic solvent.

Step 3 illustrated in FIG. 5B includes immersing the substrate 502, supports 504, spacer(s) 508, the first slurry 506 and second slurry 510 are immersed in deionized water to allow phase inversion of the slurry to take place. Phase inversion is a form of precipitation when the slurry comprising a lower polarity organic solvent is placed into higher polarity deionized water. The components of the slurry precipitate out as a result since the components are not compatible with water.

The substrate 502 and supports 504 are then removed from the slurry 506, 510 as a whole after the phase inversion. The slurry 506, 510 is allowed to dry (e.g., in ambient air) to remove excess deionized water. Then the spacers 508 are removed, being pulled out from either end. The electrode material 506, 510 is sintered to form the first tubular electrode 512 with fluid passages 514. The spacers 508 may have any regular or irregular shape as desired, such as circular, oval-like, square-like, diamond-like, trapezoidal, rectangular, triangular, pentagonal, hexagonal, octagonal or other various cross-sectional shapes or combinations thereof. If the spacers 508 have a rectangular cross section, the multiple joined tubular fluid passages 514 will have a rectangular cross section as fluid passage 514 in the inner electrode 512 as illustrated in FIG. 3C. As also can be seen in FIGS. 3C-3D, the inner electrode 302 has a cross section having a length and a width, wherein the length is at least 2 times the width and the cross section is orthogonal to the axial direction of the tubular. Similarly, the reactor has a cross section having a length and a width, wherein the length is at least 2 times the width and the cross section is orthogonal to the axial direction of the tubular.

In an embodiment, the method illustrated in step 4 in FIG. 5B further comprises coating the outer surface of the first tubular electrode 512 with an electrolyte material. The electrolyte material may then be sintered to form an electrolyte 516 in a furnace or by using electromagnetic radiation. Step 4 further comprises coating the electrolyte 516 with a second electrode material. The second electrode material may be sintered in a furnace or using electromagnetic radiation to form a second outer tubular electrode 518. In an embodiment, the second electrode material comprises doped or undoped ceria and a material selected from the group consisting of Cu, CuO, $Cu_2O$, Ag, $Ag_2O$, Au, $Au_2O$, $Au_2O_3$, stainless steel, and combinations thereof; and it is sintered using EMR to form the second outer tubular electrode 518. In an embodiment, the method comprises reducing the second outer tubular electrode 518 or reducing the first inner tubular electrode 512 or both.

In an embodiment, the coating step comprises dip coating, spraying, ultrasonic spraying, spin coating, brush coating, pasting, or combinations thereof. In an embodiment, electromagnetic radiation comprises UV light, near ultraviolet light, near infrared light, infrared light, visible light, laser, electron beam, microwave, or combinations thereof. In an embodiment, electromagnetic radiation is provided by a xenon lamp. In an embodiment, the first tubular electrode 512 has a cross section having a length and a width, wherein the length is at least 2 times the width and the cross section is orthogonal to the axial direction of the tubular fluid passage 514. In an embodiment, the EC gas producer comprises no interconnect.

Operation of EC Gas Producer

Disclosed herein is a method comprising providing a device comprising a first electrode, a second electrode, and an electrolyte between the electrodes, introducing a first stream to the first electrode, introducing a second stream to the second electrode, extracting hydrogen from the second electrode, wherein the first electrode and the second electrode comprise a metallic phase that does not contain a platinum group metal when the device is in use. In an embodiment, the electrolyte is oxide ion conducting. In an embodiment, the device is operated at a temperature no less than 500° C., or no less than 600° C., or no less than 700° C. In an embodiment, the first stream comprises a fuel and water or a fuel and carbon dioxide. In an embodiment, said fuel comprises a hydrocarbon or hydrogen or carbon monoxide or combinations thereof. In an embodiment, the first stream is directly introduced into the first electrode or the second stream is directly introduced into second electrode or both.

In an embodiment, the first stream comprises a fuel with little to no water. In an embodiment, the fuel comprises a hydrocarbon or hydrogen or carbon monoxide or combinations thereof. In an embodiment, the second stream consists of water and hydrogen.

In an embodiment, the method comprises providing a reformer upstream of the first electrode, wherein the first stream passes through the reformer before being introduced to the first electrode, wherein the first electrode comprises Ni or NiO. In an embodiment, the reformer is a steam reformer or an autothermal reformer.

In an embodiment, the method comprises using the extracted hydrogen in one of Fischer-Tropsch (FT) reactions, dry reforming reactions, Sabatier reaction catalyzed by nickel, Bosch reaction, reverse water gas shift reaction, electrochemical reaction to produce electricity, production of ammonia, production of fertilizer, electrochemical compressor for hydrogen storage, fueling hydrogen vehicles or hydrogenation reactions or combinations thereof.

Herein disclosed is a method of producing hydrogen comprising providing a EC gas producer device, introducing a first stream comprising a fuel to the device, introducing a second stream comprising water to the device, reducing the water in the second stream to hydrogen, and extracting hydrogen from the device, wherein the first stream and the second stream do not come in contact with each other in the device. In an embodiment, the first stream does not come in contact with the hydrogen. In an embodiment, the first stream and the second stream are separated by a membrane in the device. In an embodiment, the fuel comprises a hydrocarbon or hydrogen or carbon monoxide or combinations thereof. In an embodiment, the second stream comprises hydrogen. In an embodiment, the first stream comprises the fuel and water or the fuel and carbon dioxide. In an embodiment, the first stream comprises the fuel with little to no water.

Hydrogen Production System

Further discussed herein is a hydrogen production system comprising a fuel source; a water source; a hydrogen producer; wherein the fuel source and the water source are in fluid communication with the producer and wherein the fuel and the water do not come in contact with each other in the producer. The system may not include an external heat source. In an embodiment, the fuel and the water do not come in contact with each other in the system. In an embodiment, the producer comprises a first electrode, a second electrode, and an electrolyte between the first and second electrodes; wherein the fuel source is in fluid communication with the first electrode and the water source is in fluid communication with the second electrode. In an embodiment, the fuel source provides heat for the hydrogen producer and the hydrogen producer has no additional heat source.

In an embodiment, the electrolyte comprises YSZ, CGO, LSGM, SSZ, SDC, ceria, lanthanum chromite, or combinations thereof or wherein the electrolyte comprises doped or undoped ceria and optionally a material selected from the group consisting of YSZ, LSGM, SSZ, and combinations thereof. In an embodiment, the lanthanum chromite comprises undoped lanthanum chromite, strontium doped lanthanum chromite, iron doped lanthanum chromite, lanthanum calcium chromite, or combinations thereof. The electrolyte may further comprise any material listed for electrolyte 206 in the "Tubular and Multi-Tubular EC Gas Producers" section herein. In an embodiment, the electrolyte comprises doped ceria or wherein the electrolyte comprises lanthanum chromite or a conductive metal or combination thereof and a material selected from the group consisting of doped ceria, YSZ, LSGM, SSZ, and combinations thereof. In an embodiment, the lanthanum chromite comprises undoped lanthanum chromite, strontium doped lanthanum chromite, iron doped lanthanum chromite, lanthanum calcium chromite, or combinations thereof. In an embodiment, the conductive metal comprises Ni, Cu, Ag, Au, or combinations thereof.

In an embodiment, the first electrode and the second electrode comprise Ni or NiO and a material selected from the group consisting of YSZ, CGO, samaria-doped ceria (SDC), scandia-stabilized zirconia (SSZ), LSGM, and combinations thereof. In an embodiment, the first electrode comprises doped or undoped ceria and a material selected from the group consisting of Cu, CuO, $Cu_2O$, Ag, $Ag_2O$, Au, $Au_2O$, $Au_2O_3$, stainless steel, and combinations thereof; wherein the second electrode comprises Ni or NiO and a material selected from the group consisting of YSZ, CGO, samaria-doped ceria (SDC), scandia-stabilized zirconia (SSZ), LSGM, and combinations thereof. The first electrode and second electrode may comprise any material listed for the inner tubular structure 202 or outer tubular structure 204 in the "Tubular and Multi-Tubular EC Gas Producers" section herein.

In an embodiment, the system comprises an oxidant source and a boiler, wherein the boiler is in fluid communication with the oxidant source, the water source, and the producer. In an embodiment, the boiler is in thermal communication with the producer, fuel input into the producer, the oxidant, the water, or combinations thereof. In an embodiment, the boiler is configured to receive exhaust from the first electrode of the producer and to feed steam into the second electrode of the producer. In an embodiment, the fuel is partially oxidized in the producer and further oxidized in the boiler. In an embodiment, the system comprises a steam turbine between the boiler and the producer and in fluid communication with the boiler and the producer.

In an embodiment, water is reduced in the producer to generate hydrogen. In an embodiment, the system comprises a condenser configured to receive exhaust from the second electrode of the producer and to recycle water to the boiler and to output hydrogen. In an embodiment, the condenser is in thermal communication with the fuel. In an embodiment, the system comprises a desulfurization unit between the fuel source and the producer and in fluid communication with the fuel source and the producer. In an embodiment, the producer is configured to have a fuel inlet temperature no greater than 1000° C. or no greater than 900° C. or from 800° C. to 850° C. In an embodiment, the producer is configured to have a fuel outlet temperature no less than 600° C.

Figure 6A:
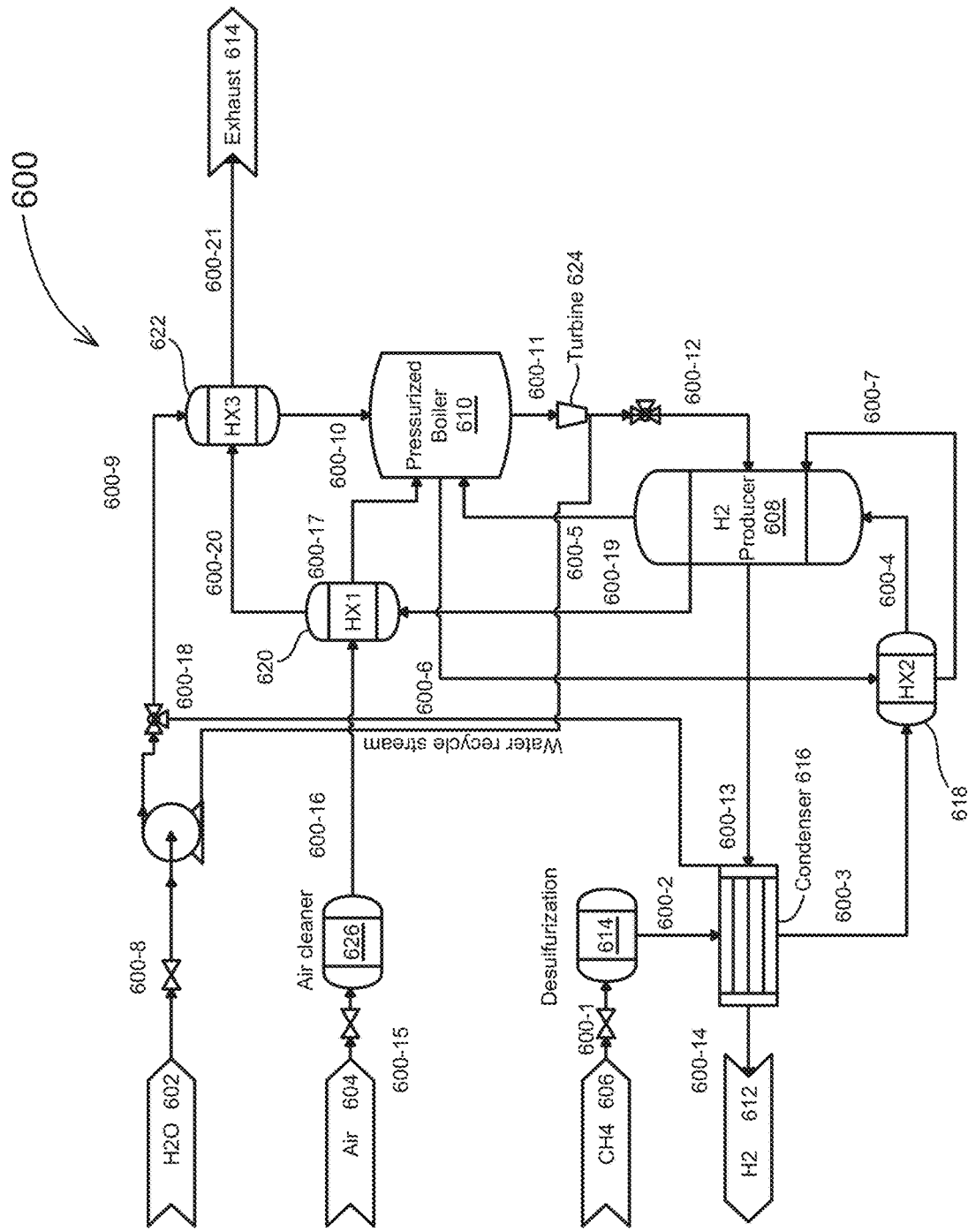
FIG. 6A, illustrates an example of a hydrogen production system 600 with no external heat source, according to an embodiment of the disclosure.

FIG. 6A, illustrates an example of a hydrogen production system 600 with no external heat source, according to an embodiment of the disclosure. The system 600 comprises a water source 602, an air/oxidant source 604, a fuel (e.g., methane) source 606, a hydrogen producer 608, and a boiler 610. The system 600 generates hydrogen 612 and exhaust. The hydrogen producer 608 comprises an anode and a cathode separated by an electrolyte. The anode and cathode receive fuel and water respectively and the fuel and water do not come in contact with each other in the producer 608. In various cases, the fuel and water do not come in contact with each other in the entire system 600. The heating burden is fully met by the system itself with no need for any external heat source. For example, the boiler 610 heats the fuel input stream into the producer 608, the producer 608, the oxidant 604, and the water 602. The producer 608 in operation has a fuel inlet temperature of no greater than 1000° C. or no greater than 900° C. or from 800° C. to 850° C. and has a fuel outlet temperature no less than 600° C.

The fuel exits the fuel source 606 as stream 600-1, passes through a desulfurization unit 614 and becomes stream 600-2. Stream 600-2 enters the condenser 616 and functions as the coolant for the condenser 616 and exits as stream 600-3, which is pre-heated fuel. Stream 600-3 enters a heat exchanger (HX2) 618 and is further heated by the exhaust stream 600-6 from the boiler 610 to a proper temperature and enters the producer 608 as stream 600-4. Stream 600-4 is received by the anode in the producer 608 and is partially oxidized and then exits the producer 608 as stream 600-5. Stream 600-5 is introduced into the boiler 610 and further oxidized by an oxidant in the boiler 610, generating heat as a result. The exhaust from the boiler 610 exits as stream 600-6, passes through heat exchanger HX2 618 to heat the fuel input into the producer 608 and becomes stream 600-7. Stream 600-7 heats the producer 608 to ensure proper operation temperatures for the producer 608 and becomes stream 600-19. Stream 600-19 passes through heat exchanger HX1 620 to heat the oxidant and exits as stream 600-20. Stream 600-20 passes through heat exchanger HX3 622 to heat the water and exits as stream 600-21.

Water exits the water source as stream 600-8, passes through a pump and becomes stream 600-9. Stream 600-9 is heated in heat exchanger HX3 622 by stream 600-20 and becomes stream 600-10. Stream 600-10 enters the boiler 610 and becomes steam (stream 600-11) by the heat generated from the oxidation reactions in the boiler 610. Stream 600-11 passes through a turbine 624 and becomes stream 600-12. The turbine 624 is utilized to power the pump. Stream 600-12 enters the hydrogen producer 608 and is received by the cathode of the producer 608. Water/steam is reduced to hydrogen at the cathode. A mixture of steam and hydrogen exits the producer 608 as stream 600-13. Stream 600-13 enters the condenser 616 and is cooled by the unheated fuel (stream 600-2). Water drops out of the mixture and is recycled from the condenser as stream 600-18. Stream 600-18 joins stream 600-9 and reenters the boiler 610 after passing through heat exchangers HX3 622. Hydrogen exits the condenser as 616 stream 600-14.

Air exits the oxidant source as stream 600-15 and passes through an air cleaner 626, where particulates and/or oxides are removed, and becomes stream 600-16. Stream 600-16 is heated in heat exchanger HX1 620 by stream 600-19 and becomes stream 600-17. Stream 600-17 enters the boiler 610 and reacts with stream 600-5 to further oxidize the fuel and generate heat. The reaction products exit the boiler 610 as stream 600-6.

Figure 6B:
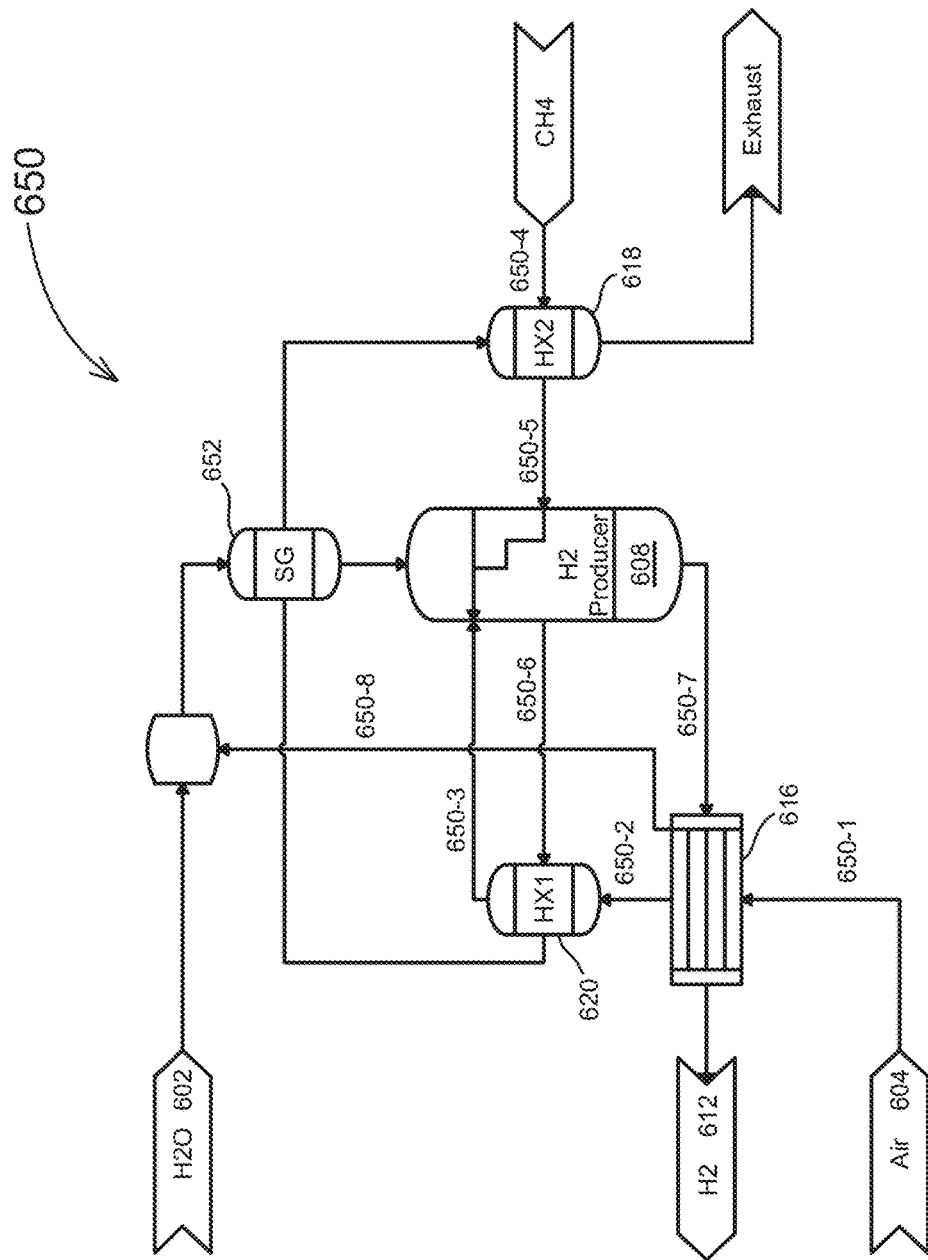
FIG. 6B illustrates an alternative hydrogen production system with no external heat source, according to an embodiment of the disclosure.

FIG. 6B illustrates an alternative hydrogen production system 650 with no external heat source, according to an embodiment of the disclosure. Steam generator (SG) 652 serves similar functions as the boiler 610 in system 600 in FIG. 6A. Air enters the condenser as stream 650-1 and is used as coolant in the condenser 616. Air stream 650-2 is then heated in heat exchanger HX1 620 before entering the hydrogen producer 608 as stream 650-3 and mixing with the anode output stream. The fuel enters as stream 650-4 and is heated in heat exchanger HX2 618 by the exhaust before entering the hydrogen producer 608 as stream 650-5. The fuel is oxidized in the anode of the hydrogen producer 608, becomes anode output stream, and is further oxidized by air to become exhaust 650-6. The exhaust provides thermal energy to the heat exchangers (HX1 620 and HX2 618) and to SG 652 to produce steam from water. Steam enters the hydrogen producer 608 and is reduced to hydrogen at the cathode. The cathode output stream 650-7 is introduced to the condenser 616. Water from the condenser 616 is recycled as stream 650-8 and hydrogen is extracted from the condenser 616.

Fuel Cell

A fuel cell is an electrochemical apparatus that converts the chemical energy from a fuel into electricity through an electrochemical reaction. As mentioned above, there are many types of fuel cells, e.g., proton-exchange membrane fuel cells (PEMFCs), solid oxide fuel cells (SOFCs). A fuel cell typically comprises an anode, a cathode, an electrolyte, an interconnect, optionally a barrier layer and/or optionally a catalyst. Both the anode and the cathode are electrodes. The listings of material for the electrodes, the electrolyte, and the interconnect in a fuel cell are applicable in some cases to the EC gas producer and the EC compressor. These listings are only examples and not limiting. Furthermore, the designations of anode material and cathode material are also not limiting because the function of the material during operation (e.g., whether it is oxidizing or reducing) determines whether the material is used as an anode or a cathode.

Figure 7:
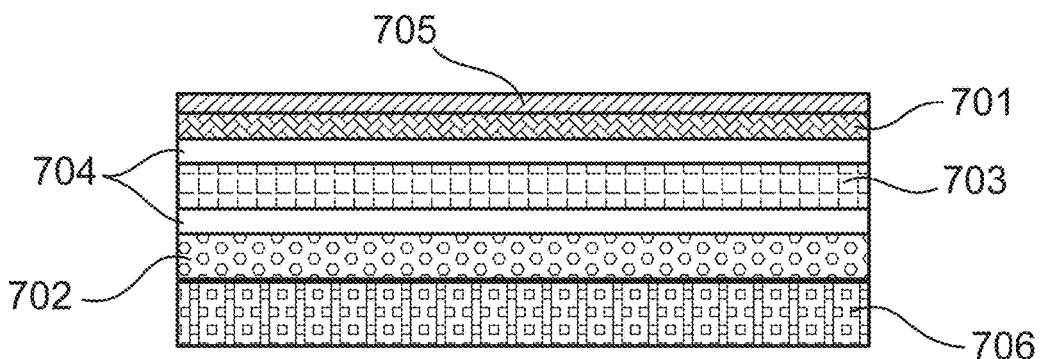
FIG. 7 illustrates a fuel cell component, according to an embodiment of the disclosure.
Figure 8:
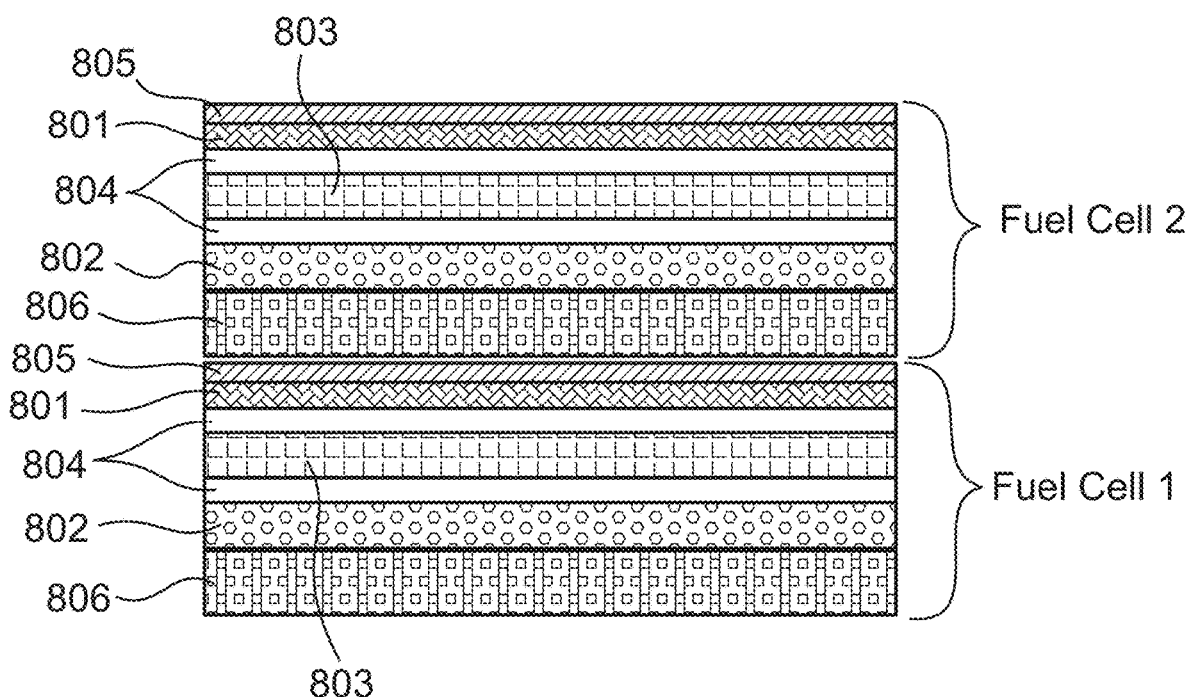
FIG. 8 schematically illustrates two fuel cells in a fuel cell stack, according to an embodiment of the disclosure.

FIGS. 7-8 illustrate various embodiments of the components in a fuel cell or a fuel cell stack. In these embodiments, the anode, cathode, electrolyte, and interconnect are cuboids or rectangular prisms.

FIG. 7 illustrates a fuel cell component, according to an embodiment of the disclosure. Layer 701 schematically illustrates an anode, layer 702 represents a cathode, layer 703 represents an electrolyte, layers 704 represents barrier layers, layer 705 represents a catalyst and layer 706 represents an interconnect.

FIG. 8 schematically illustrates two fuel cells in a fuel cell stack, according to an embodiment of the disclosure. The two fuel cells are denoted "Fuel Cell 1" and "Fuel Cell 2". Each fuel cell in FIG. 8 comprises an anode layer 801, cathode layer 802, electrolyte layer 803, barrier layers 804, catalyst layer 805 and interconnect layer 806. Two fuel cell repeat units or two fuel cells form a stack as illustrated. As is seen, on one side interconnect 806 is in contact with the largest surface of cathode 802 of fuel cell 2 (or fuel cell repeat unit) and on the opposite side interconnect 806 is in contact with the largest surface of catalyst 805 (optional) or the anode 801 of bottom fuel cell 2 (or fuel cell repeat unit). These repeat units or fuel cells are connected in parallel by being stacked atop one another and sharing an interconnect in between via direct contact with the interconnect rather than via electrical wiring. This kind of configuration illustrated in FIG. 8 contrasts with segmented-in-series (SIS) type fuel cells.

Cathode

In some embodiments, the cathode comprises perovskites, such as LSC, LSCF or LSM. In some embodiments, the cathode comprises one or more of lanthanum, cobalt, strontium or manganite. In an embodiment, the cathode is porous. In some embodiments, the cathode comprises one or more of YSZ, nitrogen, nitrogen boron doped graphene, La0.6Sr0.4Co0.2Fe0.8O3, SrCo0.5Sc0.5O3, BaFe0.75Ta0.25O3, BaFe0.875Re0.125O3, Ba0.5La0.125Zn0.375NiO3, Ba0.75Sr0.25Fe0.875Ga0.125O3, BaFe0.125Co0.125, Zr0.75O3. In some embodiments, the cathode comprises LSCo, LCo, LSF, LSCoF, or a combination thereof. In some embodiments, the cathode comprises perovskites LaCoO3, LaFeO3, LaMnO3, (La,Sr)MnO3, LSM-GDC, LSCF-GDC, LSC-GDC. Cathodes containing LSCF are suitable for intermediate-temperature fuel cell operation.

In some embodiments, the cathode comprises a material selected from the group consisting of lanthanum strontium manganite, lanthanum strontium ferrite, and lanthanum strontium cobalt ferrite. In preferred embodiments, the cathode comprises lanthanum strontium manganite.

Anode

In some embodiments, the anode comprises copper, nickel-oxide, nickel-oxide-YSZ, NiO-GDC, NiO-SDC, aluminum doped zinc oxide, molybdenum oxide, lanthanum, strontium, chromite, ceria, perovskites (such as, LSCF [La$\{1-x\}$Sr$\{x\}$Co$\{1-y\}$Fe$\{y\}$O$_3$] or LSM [La$\{1-x\}$Sr$\{x\}$MnO$_3$], where x is usually in the range of 0.15-0.2 and y is in the range of 0.7 to 0.8). In some embodiments, the anode comprises SDC or BZCYYb coating or barrier layer to reduce coking and sulfur poisoning. In an embodiment, the anode is porous. In some embodiments, the anode comprises a combination of electrolyte material and electrochemically active material or a combination of electrolyte material and electrically conductive material.

In a preferred embodiment, the anode comprises nickel and yttria stabilized zirconia. In a preferred embodiment, the anode is formed by reduction of a material comprising nickel oxide and yttria stabilized zirconia. In a preferred embodiment, the anode comprises nickel and gadolinium stabilized ceria. In a preferred embodiment, the anode is formed by reduction of a material comprising nickel oxide and gadolinium stabilized ceria.

Electrolyte

In an embodiment, the electrolyte in a fuel cell comprises stabilized zirconia (e.g., YSZ, YSZ-8, $Y_{0.16}Zr_{0.84}O_2$). In an embodiment, the electrolyte comprises doped LaGaO3, (e.g., LSGM, $La_{0.9}Sr_{0.1}Ga_{0.8}Mg0.2O_3$). In an embodiment, the electrolyte comprises doped ceria, (e.g., GDC, $Gd_{0.2}Ce_{0.8}O_2$). In an embodiment, the electrolyte comprises stabilized bismuth oxide (e.g., BVCO, $Bi2V_{0.9}Cu_{0.1}O_{5.35}$).

In some embodiments, the electrolyte comprises zirconium oxide, yttria stabilized zirconium oxide (also known as YSZ, YSZ8 (8 mole % YSZ)), ceria, gadolinia, scandia, magnesia or calcia or a combination thereof. In an embodiment, the electrolyte is sufficiently impermeable to prevent significant gas transport and prevent significant electrical conduction; and allow ion conductivity. In some embodiments, the electrolyte comprises doped oxide such as cerium oxide, yttrium oxide, bismuth oxide, lead oxide, lanthanum oxide. In some embodiments, the electrolyte comprises perovskite, such as, $LaCoFeO_3$ or $LaCoO_3$ or $Ce_{0.9}Gd_{0.1}O_2$ (GDC) or $Ce_{0.9}Sm_{0.1}O_2$ (SDC, samaria doped ceria) or scandia stabilized zirconia or a combination thereof.

In some embodiments, the electrolyte comprises a material selected from the group consisting of zirconia, ceria, and gallia. In some embodiments, the material is stabilized with a stabilizing material selected from the group consisting of scandium, samarium, gadolinium, and yttrium. In an embodiment, the material comprises yttria stabilized zirconia.

Interconnect

In some embodiments, the interconnect comprises silver, gold, platinum, AISI441, ferritic stainless steel, stainless steel, lanthanum, chromium, chromium oxide, chromite, cobalt, cesium, $Cr_2O_3$, or a combination thereof. In some embodiments, the anode comprises a $LaCrO_3$ coating on $Cr_2O_3$ or $NiCo_2O_4$ or $MnCo_2O_4$ coatings. In some embodiments, the interconnect surface is coated with Cobalt and/or Cesium. In some embodiments, the interconnect comprises ceramics. In some embodiment, the interconnect comprises lanthanum chromite or doped lanthanum chromite. In an embodiment, the interconnect comprises a material further comprising metal, stainless steel, ferritic steel, crofer, lanthanum chromite, silver, metal alloys, nickel, nickel oxide, ceramics, or lanthanum calcium chromite, or a combination thereof.

Catalyst

In various embodiments, the fuel cell comprises a catalyst, such as, platinum, palladium, scandium, chromium, cobalt, cesium, $CeO_2$, nickel, nickel oxide, zinc, copper, titania, ruthenium, rhodium, $MoS_2$, molybdenum, rhenium, vanadium, manganese, magnesium or iron or a combination thereof. In various embodiments, the catalyst promotes methane reforming reactions to generate hydrogen and carbon monoxide such that they may be oxidized in the fuel cell. Very often, the catalyst is part of the anode, especially nickel anode which has inherent methane reforming properties. In an embodiment, the catalyst is between 1%-5%, or 0.1% to 10% by mass. In an embodiment, the catalyst is used on the anode surface or in the anode. In various embodiments, such anode catalysts reduce harmful coking reactions and carbon deposits. In various embodiments, simple oxide versions of catalysts or perovskite may be used as catalysts. For example, about 2% mass $CeO_2$ catalyst is used for methane-powered fuel cells. In some embodiments, the catalyst may be dipped or coated on the anode. In various embodiments, the catalyst is made by an additive manufacturing machine (AMM) and incorporated into the fuel cell using the AMM.

The unique manufacturing methods discussed herein have described the assembly of ultra-thin fuel cells and fuel cell stacks. Conventionally, to achieve structural integrity, the fuel cell has at least one thick layer per repeat unit. This may be the anode (such as an anode-supported fuel cell) or the interconnect (such as an interconnect-supported fuel cell). As discussed above, pressing or compression steps are typically necessary to assemble the fuel cell components to achieve gas tightness and/or proper electrical contact in traditional manufacturing processes. As such, the thick layers are necessary not only because traditional methods (like tape casting) cannot produce ultra-thin layers but also because the layers must be thick to endure the pressing or compression steps. The preferred manufacturing methods of this disclosure have eliminated the need for pressing or compression. The preferred manufacturing methods of this disclosure have also enabled the making of ultra-thin layers. The multiplicity of the layers in a fuel cell or a fuel cell stack provides sufficient structural integrity for proper operation when they are made according to this disclosure.

Herein disclosed is a fuel cell comprising an anode no greater than 1 mm or 500 microns or 300 microns or 100 microns or 50 microns or no greater than 25 microns in thickness. The cathode no greater than 1 mm or 500 microns or 300 microns or 100 microns or 50 microns or no greater than 25 microns in thickness. The electrolyte no greater than 1 mm or 500 microns or 300 microns or 100 microns or 50 microns or 30 microns in thickness. In an embodiment, the fuel cell comprises an interconnect having a thickness of no less than 50 microns. In some cases, a fuel cell comprises an anode no greater than 25 microns in thickness, a cathode no greater than 25 microns in thickness, and an electrolyte no greater than 10 microns or 5 microns in thickness. In an embodiment, the fuel cell comprises an interconnect having a thickness of no less than 50 microns. In an embodiment, the interconnect has a thickness in the range of 50 microns to 5 cm.

In a preferred embodiment, a fuel cell comprises an anode no greater than 100 microns in thickness, a cathode no greater than 100 microns in thickness, an electrolyte no greater than 20 microns in thickness, and an interconnect no greater than 30 microns in thickness. In a more preferred embodiment, a fuel cell comprises an anode no greater than 50 microns in thickness, a cathode no greater than 50 microns in thickness, an electrolyte no greater than 10 microns in thickness, and an interconnect no greater than 25 microns in thickness. In an embodiment, the interconnect has a thickness in the range of 1 micron to 20 microns.

In a preferred embodiment, the fuel cell comprises a barrier layer between the anode and the electrolyte, or a barrier layer between the cathode and the electrolyte, or both barrier layers. In some cases, the barrier layers are the interconnects. In such cases, the reactants are directly injected into the anode and the cathode.

In an embodiment, the cathode has a thickness of no greater than 15 microns, or no greater than 10 microns, or no greater than 5 microns. In an embodiment, the anode has a thickness no greater than 15 microns, or no greater than 10 microns, or no greater than 5 microns. In an embodiment, the electrolyte has a thickness of no greater than 5 microns, or no greater than 2 microns, or no greater than 1 micron, or no greater than 0.5 micron. In an embodiment, the interconnect is made of a material comprising metal, stainless steel, silver, metal alloys, nickel, nickel oxide, ceramics, lanthanum chromite, doped lanthanum chromite, or lanthanum calcium chromite. In an embodiment, the fuel cell has a total thickness of no less than 1 micron.

Also discussed herein is a fuel cell stack comprising a multiplicity of fuel cells, wherein each fuel cell comprises an anode no greater than 25 microns in thickness, a cathode no greater than 25 microns in thickness, an electrolyte no greater than 10 microns in thickness, and an interconnect having a thickness in the range from 100 nm to 100 microns. In an embodiment, each fuel cell comprises a barrier layer between the anode and the electrolyte, or a barrier layer between the cathode and the electrolyte, or both barrier layers. In an embodiment, the barrier layers are the interconnects. For example, the interconnect is made of silver. For example, the interconnect has a thickness in the range from 500 nm to 1000 nm. In an embodiment, the interconnect is made of a material comprising metal, stainless steel, silver, metal alloys, nickel, nickel oxide, ceramics, or lanthanum calcium chromite.

In an embodiment, the cathode has a thickness of no greater than 15 microns, or no greater than 10 microns, or no greater than 5 microns. In an embodiment, the anode has a thickness of no greater than 15 microns, or no greater than 10 microns, or no greater than 5 microns. In an embodiment, the electrolyte has a thickness of no greater than 5 microns, or no greater than 2 microns, or no greater than 1 micron, or no greater than 0.5 micron. In an embodiment, each fuel cell has a total thickness of no less than 1 micron.

Further discussed herein is a method of making a fuel cell comprising (a) forming an anode no greater than 25 microns in thickness, (b) forming a cathode no greater than 25 microns in thickness, and (c) forming an electrolyte no greater than 10 microns in thickness. In an embodiment, steps (a)-(c) are performed using additive manufacturing. In various embodiments, said additive manufacturing employs one or more of extrusion, photopolymerization, powder bed fusion, material jetting, binder jetting, directed energy deposition or lamination.

In an embodiment, the method comprises assembling the anode, the cathode, and the electrolyte using additive manufacturing. In an embodiment, the method comprises forming an interconnect and assembling the interconnect with the anode, the cathode, and the electrolyte.

In preferred embodiments, the method comprises making at least one barrier layer. In preferred embodiments, the at least one barrier layer is used between the electrolyte and the cathode or between the electrolyte and the anode, or both. In an embodiment, the at least one barrier layer also acts as an interconnect.

In preferred embodiments, the method comprises heating the fuel cell such that shrinkage rates of the anode, the cathode, and the electrolyte are matched. In some embodiments, such heating takes place for no greater than 30 minutes, preferably no greater than 30 seconds, and most preferably no greater than 30 milliseconds. When a fuel cell comprises a first composition and a second composition, wherein the first composition has a first shrinkage rate and the second composition has a second shrinkage rate, the heating described in this disclosure preferably takes place such that the difference between the first shrinkage rate and the second shrinkage rate is no greater than 75% of the first shrinkage rate.

In a preferred embodiment, the heating employs electromagnetic radiation (EMR). In various embodiments, EMR comprises UV light, near ultraviolet light, near infrared light, infrared light, visible light, laser, electron beam. Preferably, heating is performed in situ.

Also disclosed herein is a method of making a fuel cell stack comprising a multiplicity of fuel cells, the method comprising: (a) forming an anode no greater than 25 microns in thickness in each fuel cell, (b) forming a cathode no greater than 25 microns in thickness in each fuel cell, (c) forming an electrolyte no greater than 10 microns in thickness in each fuel cell, and (d) producing an interconnect having a thickness of from 100 nm to 100 microns in each fuel cell.

In an embodiment, steps (a)-(d) are performed using AM. In various embodiments, AM employs one or more of processes of extrusion, photopolymerization, powder bed fusion, material jetting, binder jetting, directed energy deposition or lamination.

In an embodiment, the method of making a fuel cell stack comprises assembling the anode, the cathode, the electrolyte, and the interconnect using AM. In an embodiment, the method comprises making at least one barrier layer in each fuel cell. In an embodiment, the at least one barrier layer is used between the electrolyte and the cathode or between the electrolyte and the anode or both. In an embodiment, the at least one barrier layer also acts as the interconnect.

In an embodiment, the method of making a fuel cell stack comprises heating each fuel cell such that shrinkage rates of the anode, the cathode, and the electrolyte are matched. In an embodiment, such heating takes place for no greater than 30 minutes, or no greater than 30 seconds, or no greater than 30 milliseconds. In a preferred embodiment, said heating comprises one or more of electromagnetic radiation (EMR). In various embodiments, EMR comprises UV light, near ultraviolet light, near infrared light, infrared light, visible light, laser, electron beam. In an embodiment, heating is performed in situ.

In an embodiment, the method comprises heating the entire fuel cell stack such that shrinkage rates of the anode, the cathode, and the electrolyte are matched. In some embodiments, such heating takes place for no greater than 30 minutes, or no greater than 30 seconds, or no greater than 30 milliseconds.

Herein discussed is a method of making an electrolyte comprising (a) formulating a colloidal suspension, wherein the colloidal suspension comprises an additive, particles having a range of diameters and a size distribution, and a solvent; (b) forming an electrolyte comprising the colloidal suspension; and (c) heating at least a portion of the electrolyte; wherein formulating the colloidal suspension is preferably optimized by controlling the pH of the colloidal suspension, or concentration of the binder in the colloidal suspension, or composition of the binder in the colloidal suspension, or the range of diameters of the particles, or maximum diameter of the particles, or median diameter of the particles, or the size distribution of the particles, or boiling point of the solvent, or surface tension of the solvent, or composition of the solvent, or thickness of the minimum dimension of the electrolyte, or the composition of the particles, or combinations thereof.

Herein discussed is a method of making a fuel cell comprising (a) obtaining a cathode and an anode; (b) modifying the cathode surface and the anode surface; (c) formulating a colloidal suspension, wherein the colloidal suspension comprises an additive, particles having a range of diameters and a size distribution, and a solvent; (d) forming an electrolyte comprising the colloidal suspension between the modified anode surface and the modified cathode surface; and (e) heating at least a portion of the electrolyte; wherein formulating the colloidal suspension comprises controlling pH of the colloidal suspension, or concentration of the binder in the colloidal suspension, or composition of the binder in the colloidal suspension, or the range of diameters of the particles, or maximum diameter of the particles, or median diameter of the particles, or the size distribution of the particles, or boiling point of the solvent, or surface tension of the solvent, or composition of the solvent, or thickness of the minimum dimension of the electrolyte, or the composition of the particles, or combinations thereof. In various embodiments, the anode and the cathode are obtained via any suitable means. In an embodiment, the modified anode surface and the modified cathode surface have a maximum height profile roughness that is less than the average diameter of the particles in the colloidal suspension. The maximum height profile roughness 900 refers to the maximum distance between any trough 902 and an adjacent peak 904 of an anode surface or a cathode surface as illustrated in FIG. 9. In various embodiments, the anode surface and the cathode surface are modified via any suitable means.

Further disclosed herein is a method of making a fuel cell comprising (a) obtaining a cathode and an anode; (b) formulating a colloidal suspension, wherein the colloidal suspension comprises an additive, particles having a range of diameters and a size distribution, and a solvent; (c) forming an electrolyte comprising the colloidal suspension between the anode and the cathode; and (d) heating at least a portion of the electrolyte; wherein formulating the colloidal suspension comprises controlling pH of the colloidal suspension, or concentration of the binder in the colloidal suspension, or composition of the binder in the colloidal suspension, or the range of diameters of the particles, or maximum diameter of the particles, or median diameter of the particles, or the size distribution of the particles, or boiling point of the solvent, or surface tension of the solvent, or composition of the solvent, or thickness of the minimum dimension of the electrolyte, or the composition of the particles, or combinations thereof. In various embodiments, the anode and the cathode are obtained via any suitable means. In an embodiment, the anode surface in contact with the electrolyte and the cathode surface in contact with the electrolyte have a maximum height profile roughness that is less than the average diameter of the particles in the colloidal suspension.

In a preferred embodiment, the solvent comprises water. In a preferred embodiment, the solvent comprises an organic component. The solvent may comprise ethanol, butanol, alcohol, terpineol, diethyl ether 1,2-dimethoxyethane (DME (ethylene glycol dimethyl ether), 1-propanol (n-propanol, n-propyl alcohol), or butyl alcohol or a combination thereof. In some embodiments, the solvent surface tension is less than half of water's surface tension in air. In an embodiment, the solvent surface tension is less than 30 mN/m at atmospheric conditions.

In some embodiments, the electrolyte is formed adjacent to a first substrate or the electrolyte is formed between a first substrate and a second substrate. In some embodiments, the first substrate has a maximum height profile roughness that is less than the average diameter of the particles. In some embodiments, the particles have a packing density greater than 40%, or greater than 50%, or greater than 60%. In an embodiment, the particles have a packing density close to the random close packing (RCP) density.

Random close packing (RCP) is an empirical parameter used to characterize the maximum volume fraction of solid objects obtained when they are packed randomly. A container is randomly filled with objects, and then the container is shaken or tapped until the objects do not compact any further, at this point the packing state is RCP. The packing fraction is the volume taken by a number of particles in a given space of volume. The packing fraction determines the packing density. For example, when a solid container is filled with grain, shaking the container will reduce the volume taken up by the objects, thus allowing more grain to be added to the container. Shaking increases the density of packed objects. When shaking no longer increases the packing density, a limit is reached and if this limit is reached without obvious packing into a regular crystal lattice, this is the empirical random close-packed density.

In some embodiments, the median particle diameter is between 50 nm and 1000 nm, or between 100 nm and 500 nm, or approximately 200 nm. In some embodiments, the first substrate comprises particles having a median particle diameter, wherein the median particle diameter of the electrolyte may be no greater than 10 times and no less than 1/10 of the median particle diameter of the first substrate. In some embodiments, the first substrate comprises a particle size distribution that is bimodal having a first mode and a second mode, each having a median particle diameter. In some embodiments, the median particle diameter in the first mode of the first substrate is greater than 2 times, or greater than 5 times, or greater than 10 times that of the second mode. The particle size distribution of the first substrate may be adjusted to change the behavior of the first substrate during heating. In some embodiments, the first substrate has a shrinkage that is a function of heating temperature. In some embodiments, the particles in the colloidal suspension may have a maximum particle diameter and a minimum particle diameter, wherein the maximum particle diameter is less than 2 times, or less than 3 times, or less than 5 times, or less than 10 times the minimum particle diameter. In some embodiments, the minimum dimension of the electrolyte is less than 10 microns, or less than 2 microns, or less than 1 micron, or less than 500 nm.

In some embodiments, the electrolyte has a gas permeability of no greater than 1 millidarcy, preferably no greater than 100 microdarcy, and most preferably no greater than 1 microdarcy. Preferably, the electrolyte has no cracks penetrating through the minimum dimension of the electrolyte. In some embodiments, the boiling point of the solvent is no less than 200° C., or no less than 100° C., or no less than 75° C. In some embodiments, the boiling point of the solvent is no greater than 125° C., or no greater than 100° C., or no greater than 85° C., no greater than 70° C. In some embodiments, the pH of the colloidal suspension is no less than 7, or no less than 9, or no less than 10.

In some embodiments, the additive comprises polyethylene glycol (PEG), ethyl cellulose, polyvinylpyrrolidone (PVP), polyvinyl butyral (PVB), butyl benzyl phthalate (BBP), polyalkylene glycol (PAG) or a combination thereof. In an embodiment, the additive concentration is no greater than 100 mg/cm3, or no greater than 50 mg/cm3, or no greater than 30 mg/cm3, or no greater than 25 mg/cm3.

In an embodiment, the colloidal suspension is milled. In an embodiment, the colloidal suspension is milled using a rotational mill wherein the rotational mill is operated at no less than 20 rpm, or no less than 50 rpm, or no less than 100 rpm, or no less than 150 rpm. In an embodiment, the colloidal suspension is milled using zirconia milling balls or tungsten carbide balls wherein the colloidal suspension is milled for no less than 2 hours, or no less than 4 hours, or no less than 1 day, or no less than 10 days.

In some embodiments, the particle concentration in the colloidal suspension is no greater than 30 wt %, or no greater than 20 wt %, or no greater than 10 wt %. In other embodiments, the particle concentration in the colloidal suspension is no less than 2 wt %. In some embodiments, the particle concentration in the colloidal suspension is no greater than 10 vol %, or no greater than 5 vol %, or no greater than 3 vol %, or no greater than 1 vol %. In an embodiment, the particle concentration in the colloidal suspension is no less than 0.1 vol %.

In a preferred embodiment, the electrolyte is formed using an additive manufacturing machine (AMM). In a preferred embodiment, the first substrate is formed using an AMM. In a preferred embodiment, the heating comprises the use of electromagnetic radiation (EMR) wherein the EMR comprises one or more of UV light, near ultraviolet light, near infrared light, infrared light, visible light or laser. In a preferred embodiment, the first substrate and the electrolyte are heated to cause co-sintering. In a preferred embodiment, the first substrate, the second substrate, and the electrolyte are heated to cause co-sintering. In an embodiment, the EMR is controlled to preferentially sinter the first substrate over the electrolyte.

In an embodiment, the electrolyte is compresses after heating. In an embodiment, the first substrate and the second substrate apply compressive stress to the electrolyte after heating. In an embodiment, the first substrate and the second substrate that are applying compressive stress are the anode and cathode of a fuel cell. In some embodiments, the minimum dimension of the electrolyte is between 500 nm and 5 microns or between 1 micron and 2 microns.

The detailed discussion described herein uses the production of solid oxide fuel cells (SOFCs) as an illustrative example. As one in the art recognizes, the methodology and the manufacturing process described herein are applicable to all fuel cell types. As such, the production of all fuel cell types is within the scope of this disclosure.

Reactor Cartridge

Figure 9A:
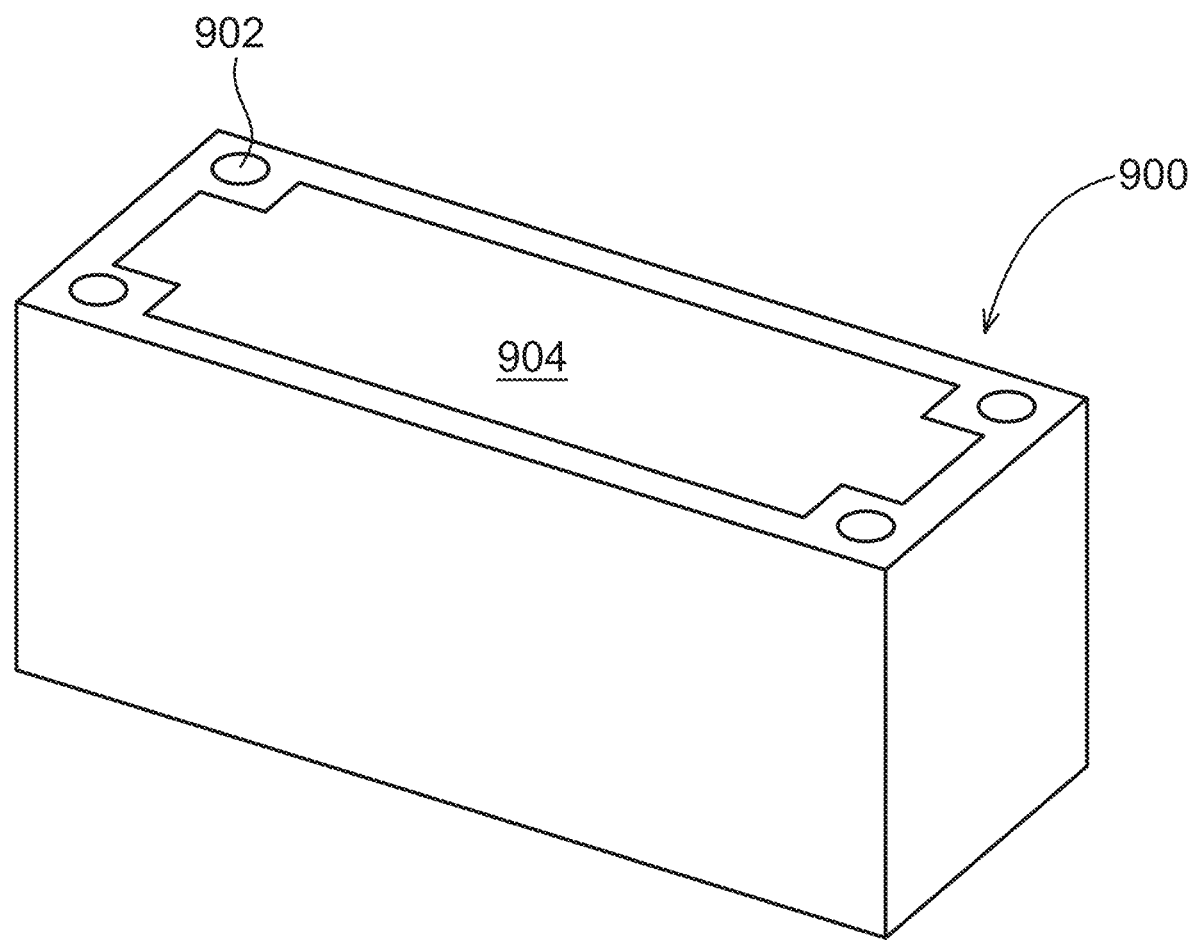
FIG. 9A illustrates a perspective view of a fuel cell cartridge (FCC), according to an embodiment of the disclosure.

In various embodiments, an electrochemical (EC) reactor is formed into a cartridge form. The discussion herein uses fuel cell or fuel cell stack as an example. The cartridge design is applicable to other electrochemical reactors, such as EC gas producer, EC compressor, flow battery. In various embodiments, the fuel cell stack is configured to be made into a cartridge form, such as an easily detachable flanged fuel cell cartridge (FCC) design. FIG. 9A illustrates a perspective view of a fuel cell cartridge (FCC) 900, according to an embodiment of the disclosure. FCC 900 comprises a rectangular shape as illustrated in FIG. 9A. Other form factors are possible such as square-like, cylindrical-like, hexagonal-like or combinations thereof. The form factor may depend on the application where the FCC may be used such as in industrial, home, automotive or other applications. FCC 900 also comprises holes for bolts 902 to secure the FCC in a system or in series with other FCCs, or both. FCC cartridge 900 housing may be comprised of aluminum, steel, plastic, ceramics, or a combination thereof. FCC 900 comprises a top interconnect 904.

Figure 9B:
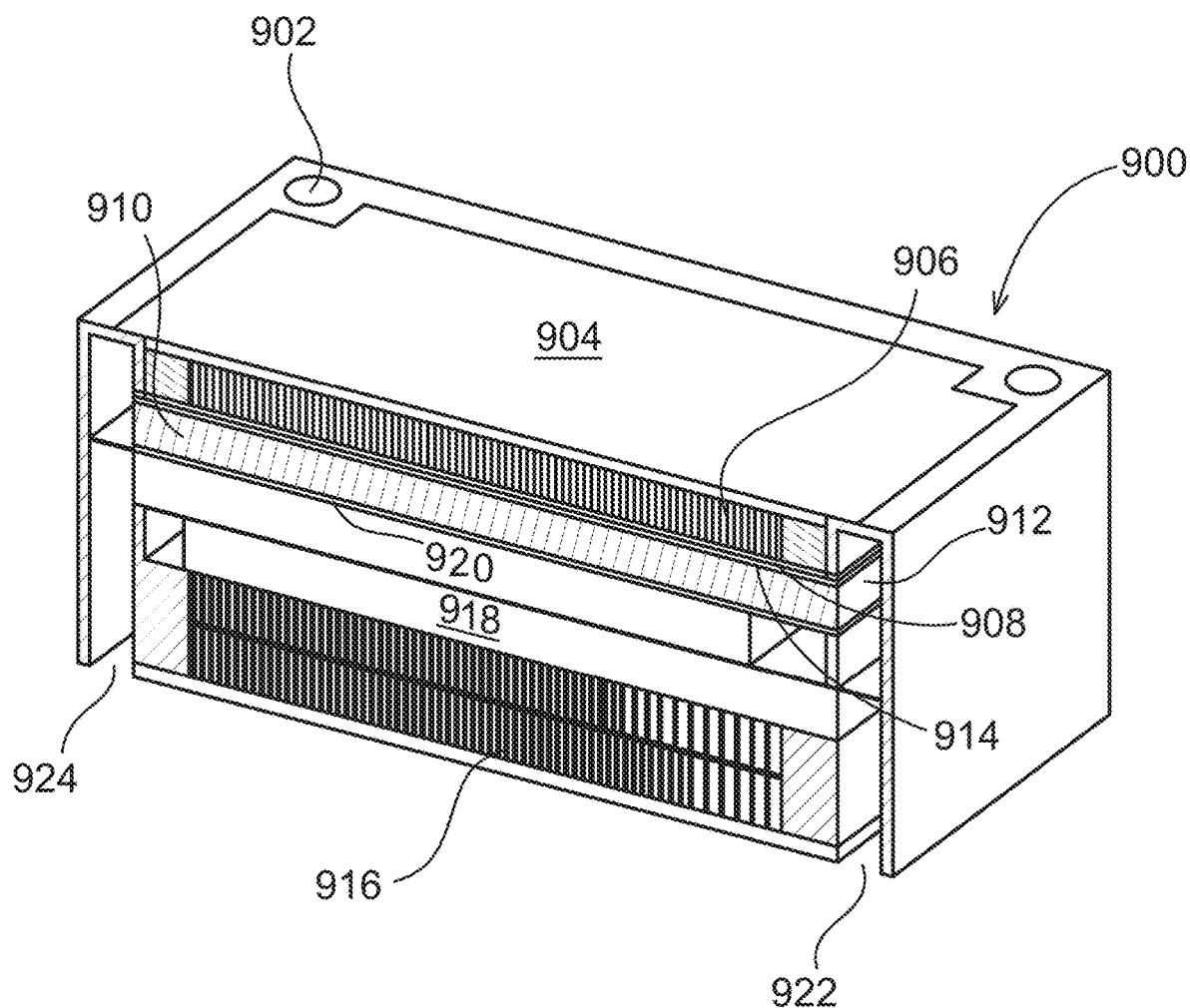
FIG. 9B illustrates a perspective view of a cross-section of a fuel cell cartridge (FCC), according to an embodiment of the disclosure.

FIG. 9B illustrates a perspective view of a cross-section of a fuel cell cartridge (FCC) 900, according to an embodiment of the disclosure. FCC 900 comprises holes for bolts 902, cathode layer 906, barrier layer 908, anode layer 910, gas channels 912 in the electrodes (anode and cathode), electrolyte layer 914, an air heat exchanger 916, fuel heat exchanger 918 and top interconnect 904. Air heat exchanger 916 and fuel heat exchanger 918 combined form an integrated multi-fluid heat exchanger. In some embodiments, there is no barrier layer between the cathode 906 and the electrolyte 914. FCC 900 comprises a second interconnect 920, such as between anode layer 910 and fuel heat exchanger 918. FCC 900 further comprises openings 922, 924 for fuel passages.

Figure 9C:
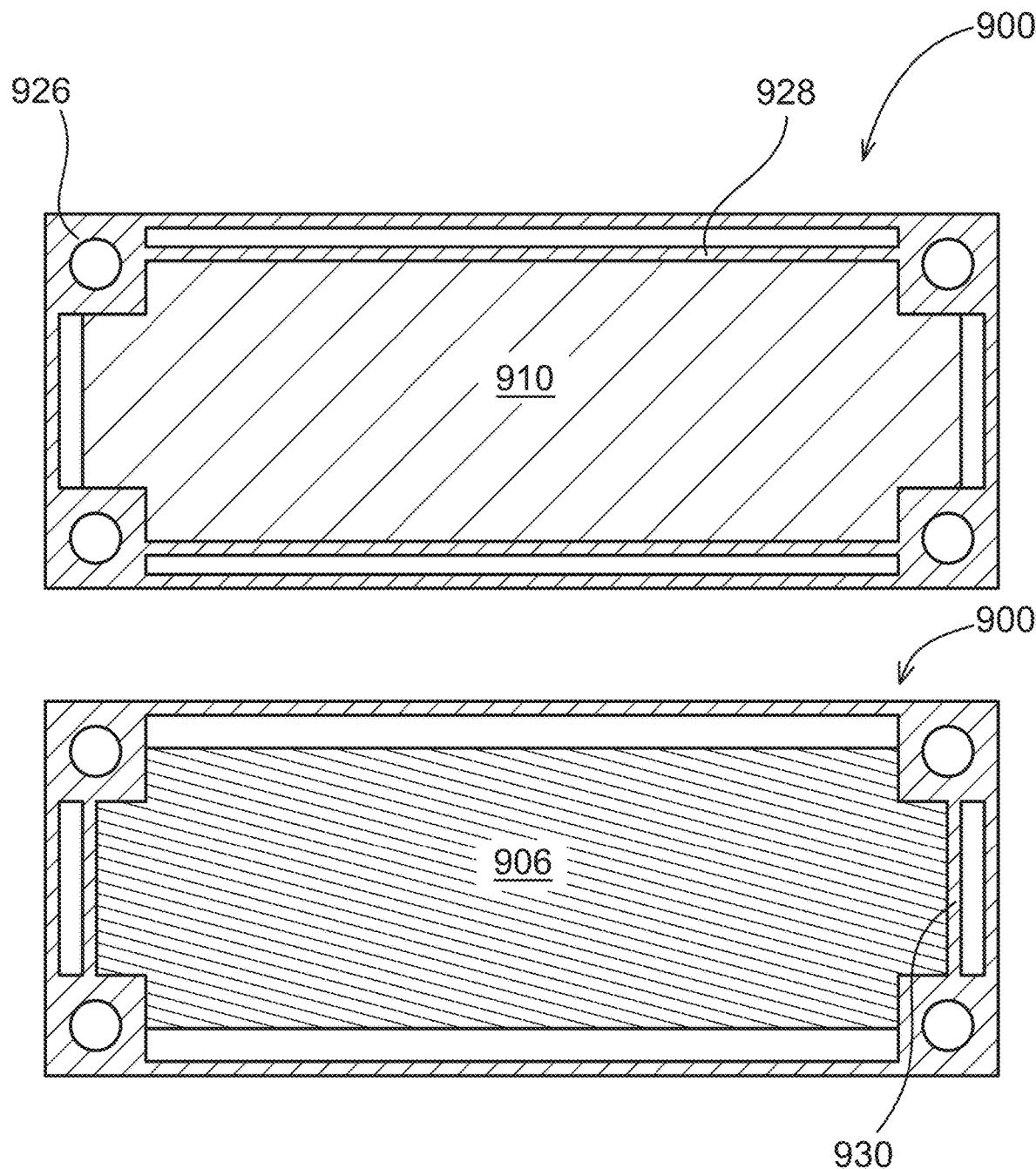
FIG. 9C illustrates cross-sectional views of a fuel cell cartridge (FCC), according to an embodiment of the disclosure.

FIG. 9C illustrates cross-sectional views of a fuel cell cartridge (FCC), according to an embodiment of the disclosure. FCC 900 in FIG. 9C comprises electrical bolt isolation 926, anode 910, seal 928 that seals anode 910 from air flow, cathode 906 and seal 930 that seals cathode 906 from fuel flow. The bolts may be isolated electrically with a seal as well. In various embodiments, the seals may be dual functional seal (DFS) comprising YSZ (yttria-stabilized zirconia) or a mixture of 3YSZ (3 mol % $Y_2O_3$ in $ZrO_2$) and 8YSZ (8 mol % $Y_2O_3$ in $ZrO_2$). In some embodiments, the DFS is impermeable to non-ionic substances and electrically insulating. In some embodiments, the mass ratio of 3YSZ/8YSZ is in the range of from 10/90 to 90/10. In some embodiments, the mass ratio of 3YSZMYSZ is about 50/50. In some embodiments, the mass ratio of 3YSZ/BYSZ is 100/0 or 0/100.

Figure 9D:
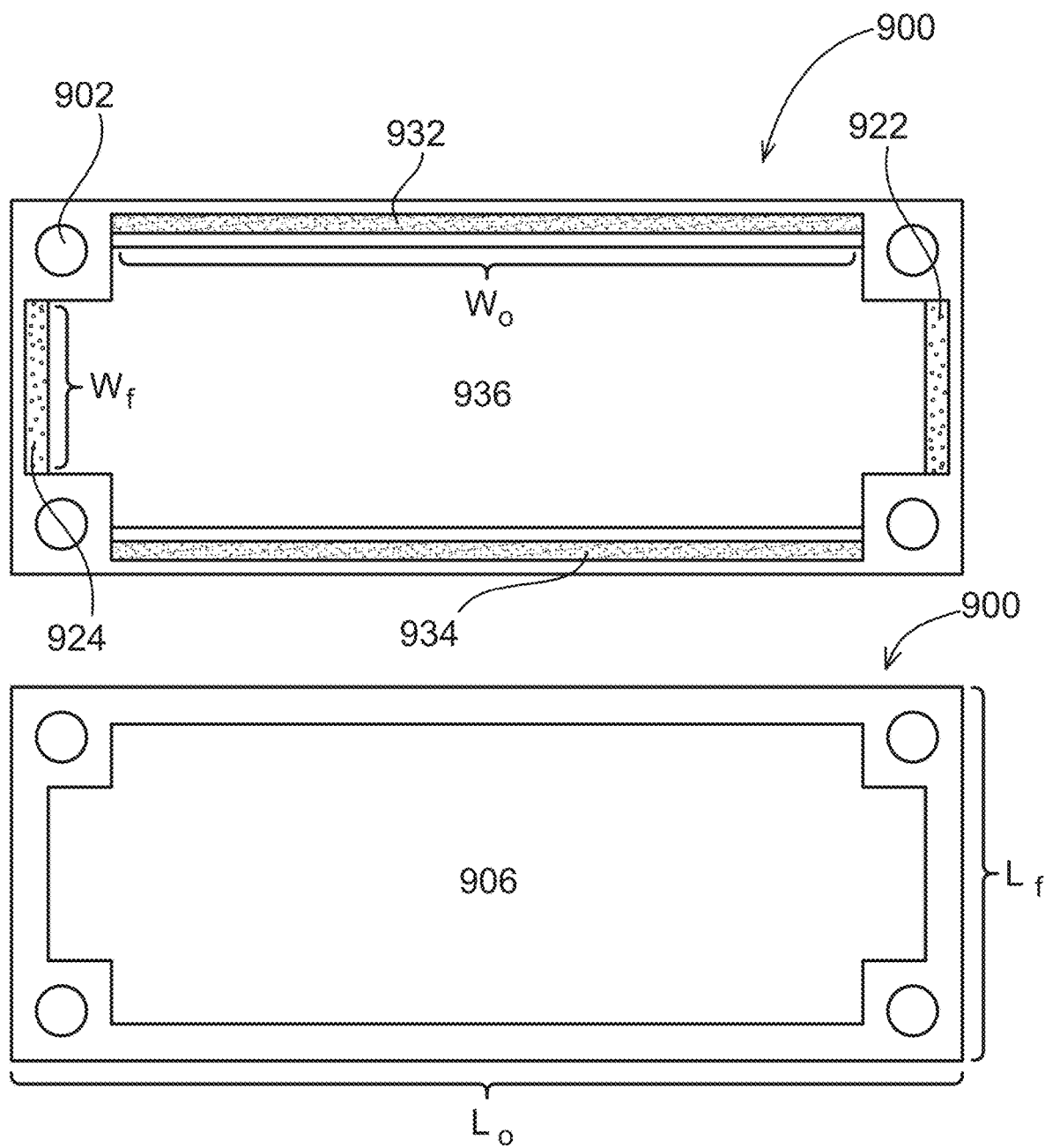
FIG. 9D illustrates top view and bottom view of a fuel cell cartridge (FCC), according to an embodiment of the disclosure.

FIG. 9D illustrates top view and bottom view of a fuel cell cartridge (FCC), according to an embodiment of the disclosure. FCC 900 comprises holes for bolts 902, air inlet 932, air outlet 934, fuel inlet 922, fuel outlet 924, bottom 936 and top interconnect 904 of FCC 900. FIG. 9D further illustrates the top view and bottom view of an embodiment of FCC 900, in which the length of the oxidant side of FCC 900 is shown $L_o$, the length of the fuel side of FCC 900 is shown $L_f$, the width of the oxidant (air inlet 932) entrance is shown $W_o$, and the width of the fuel inlet 922 is shown $W_f$. In FIG. 9D, two fluid exits are shown (air outlet 934 and fuel outlet 924). In some embodiments, the anode exhaust and the cathode exhaust may be mixed and extracted through one fluid exit. In some cases, bottom 936 is an interconnect and 932, 934, 922, 924 are openings for fluid passage, e.g., in the direction perpendicular to the lateral direction.

Disclosed herein is a fuel cell cartridge (FCC) 900 comprising an anode 910, a cathode 906, an electrolyte 914, at least one interconnect, a fuel entrance on a fuel side of the FCC 900, an oxidant entrance on an oxidant side of the FCC, at least one fluid exit, wherein the fuel entrance has a width of $W_f$, the fuel side of the FCC has a length of $L_f$, the oxidant entrance has a width of $W_o$, the oxidant side of the FCC has a length of $L_o$, wherein $W_f/L_f$ is in the range of 0.1 to 1.0, or 0.1 to 0.9, or 0.2 to 0.9, or 0.5 to 0.9, or 0.5 to 1.0 and $W_o/L_o$ is in the range of 0.1 to 1.0, or 0.1 to 0.9, or 0.2 to 0.9, or 0.5 to 0.9, or 0.5 to 1.0.

In some embodiments, the air and fuel entrances and exits are on one surface of the FCC 900 wherein the FCC 900 comprises no protruding fluid passages on said surface. In some embodiments, the surface is smooth with a maximum elevation change of no greater than 1 mm, or no greater than 100 microns, or no greater than 10 microns.

In some embodiments, an FCC 900 comprises a barrier layer between the electrolyte and the cathode, or between the electrolyte and the anode, or both. In an embodiment, the FCC comprises a dual functional seal (DFS) that is impermeable to non-ionic substances and electrically insulating. In some embodiments, the DFS comprises YSZ (yttria-stabilized zircon a or a mixture of 3YSZ (3 mol % $Y_2O_3$ in $ZrO_2$) and 8YSZ (8 mol % $Y_2O_3$ in $ZrO_2$).

In some embodiments, the interconnect comprises no fluid dispersing element and the anode and cathode comprise fluid dispersing components. In some embodiments, the interconnect comprises no fluid dispersing element while the anode and cathode comprise fluid channels.

In some embodiments, a fuel cell cartridge (FCC) 900 comprising an anode, a cathode, an electrolyte, an interconnect, a fuel entrance, an oxidant entrance, at least one fluid exit, wherein the entrances and exit are on one surface of the FCC and the FCC comprises no protruding fluid passage on the surface. In some embodiments, the surface may be smooth with a maximum elevation change of no greater than 1 mm, or no greater than 100 microns, or no greater than 10 microns.

In some embodiments, the FCC 900 comprises a DFS that is impermeable to non-ionic substances and electrically insulating. In an embodiment, the interconnect comprises no fluid dispersing element and the anode and cathode comprise fluid dispersing components. In an embodiment, the interconnect comprises no fluid dispersing element and said anode and cathode comprise fluid channels.

In an embodiment, the FCC 900 is detachably fixed to a mating surface and not soldered nor welded to said mating surface. In an embodiment, the FCC is bolted to or pressed to the mating surface. The mating surface comprises a matching fuel entrance, matching oxidant entrance, and at least one matching fluid exit.

Further disclosed herein is an assembly comprising a fuel cell cartridge (FCC) and a mating surface, wherein the FCC comprises an anode, a cathode, an electrolyte, an interconnect, a fuel entrance on a fuel side of the FCC, an oxidant entrance on an oxidant side of the FCC, at least one fluid exit, wherein the fuel entrance has a width of $W_f$, the fuel side of the FCC has a length of $L_f$, the oxidant entrance has a width of $W_o$, the oxidant side of the FCC has a length of $L_o$, wherein $W_f/L_f$ is in the range of 0.1 to 1.0, or 0.1 to 0.9, or 0.2 to 0.9, or 0.5 to 0.9, or 0.5 to 1.0 and $W_o/L_o$ is in the range of 0.1 to 1.0, or 0.1 to 0.9, or 0.2 to 0.9, or 0.5 to 0.9, or 0.5 to 1.0, wherein the FCC is detachably fixed to the mating surface.

In some embodiments, said entrances and exits are on one surface of the FCC and wherein the FCC comprises no protruding fluid passage on said surface. The surface may be smooth with a maximum elevation change of no greater than 1 mm, or no greater than 100 microns, or no greater than 10 microns.

In an embodiment, said interconnect comprises no fluid dispersing element and said anode and cathode comprise fluid dispersing components. In an embodiment, said interconnect comprises no fluid dispersing element and said anode and cathode comprise fluid channels.

Discussed herein is a method comprising pressing or bolting together a fuel cell cartridge (FCC) and a mating surface. The method excludes welding or soldering together the FCC and the mating surface, wherein the FCC comprises an anode, a cathode, an electrolyte, an interconnect, a fuel entrance on a fuel side of the FCC, an oxidant entrance on an oxidant side of the FCC, at least one fluid exit, wherein the fuel entrance has a width of $W_f$, the fuel side of the FCC has a length of $L_f$, the oxidant entrance has a width of $W_o$, the oxidant side of the FCC has a length of $L_o$, wherein $W_f/L_f$ is in the range of 0.1 to 1.0, or 0.1 to 0.9, or 0.2 to 0.9, or 0.5 to 0.9, or 0.5 to 1.0 and $W_o/L_o$ is in the range of 0.1 to 1.0, or 0.1 to 0.9, or 0.2 to 0.9, or 0.5 to 0.9, or 0.5 to 1.0, wherein the FCC and the mating surface are detachable.

In an embodiment, said entrances and exit are on one surface of the FCC wherein the FCC comprises no protruding fluid passage on said surface. The surface is smooth with a maximum elevation change of no greater than 1 mm, or no greater than 100 microns, or no greater than 10 microns. In an embodiment, said interconnect comprises no fluid dispersing element and said anode and cathode comprise fluid dispersing components. In an embodiment, said interconnect comprises no fluid dispersing element and said anode and cathode comprise fluid channels.

Herein disclosed is a fuel cell cartridge (FCC) comprising a fuel cell and a fuel cell casing, wherein the fuel cell comprises an anode, a cathode and an electrolyte, wherein at least a portion of the fuel cell casing is made of the same material as the electrolyte. In an embodiment, the electrolyte is in contact with the portion of the fuel cell casing made of the same material. In an embodiment, the electrolyte and the portion of the fuel cell casing are made of a DFS, wherein the DFS comprises 3YSZ (3 mol % $Y_2O_3$ in $ZrO_2$) and 8YSZ (8 mol % $Y_2O_3$ in $ZrO_2$), wherein the mass ratio of 3YSZ/8YSZ is in the range of from 100/0 to 0/100 or from 10/90 to 90/10 and wherein the DFS is impermeable to non-ionic substances and electrically insulating. In an embodiment, the mass ratio of 3YSZ/8YSZ is about 50/50 or 40/60 or 60/40 or 30/70 or 70/30 or 20/80 or 80/20.

In an embodiment, said fuel cell casing comprises a fuel entrance and fuel passage for the anode, an oxidant entrance and oxidant passage for the cathode, and at least one fluid exit. In an embodiment, the entrances and at least one exit are on one surface of the FCC wherein the FCC comprises no protruding fluid passage on the surface. In an embodiment, the fuel cell casing is in contact with at least a portion of the anode.

In an embodiment, the FCC comprises a barrier layer between the electrolyte and the cathode and between the fuel cell casing and the cathode. In an embodiment, the FCC comprises an interconnect, wherein the interconnect comprises no fluid dispersing element and said anode and cathode comprise fluid dispersing components. In an embodiment, the FCC comprises an interconnect, wherein the interconnect comprises no fluid dispersing element and said anode and cathode comprise fluid channels.

In an embodiment, the FCC is detachably fixed to a mating surface and not soldered nor welded to said mating surface. In an embodiment, said mating surface comprises matching fuel entrance, matching oxidant entrance, and at least one matching fluid exit.

Also discussed herein is a DFS comprising 3YSZ (3 mol % $Y_2O_3$ in $ZrO_2$) and 8YSZ (8 mol % $Y_2O_3$ in $ZrO_2$), wherein the mass ratio of 3YSZ/8YSZ is in the range of from 10/90 to 90/10 and wherein the DFS is impermeable to non-ionic substances and electrically insulating. In an embodiment, the mass ratio of 3YSZ/8YSZ is about 50/50 or 40/60 or 60/40 or 30/70 or 70/30 or 20/80 or 80/20. In an embodiment, the DFS is used as an electrolyte in a fuel cell or as a portion of a fuel cell casing, or both.

Further disclosed herein is a method comprising providing a DFS in a fuel cell system, wherein the DFS comprises 3YSZ (3 mol % $Y_2O_3$ in $ZrO_2$) and 8YSZ (8 mol % $Y_2O_3$ in $ZrO_2$), wherein the mass ratio of 3YSZ/8YSZ is in the range of from 100/0 to 0/100 or from 10/90 to 90/10 and wherein the DFS is impermeable to non-ionic substances and electrically insulating. In an embodiment, the mass ratio of 3YSZ/8YSZ is about 50/50 or 40/60 or 60/40 or 30/70 or 70/30 or 20/80 or 80/20.

In an embodiment, the DFS is used as electrolyte or a portion of a fuel cell casing or both in the fuel cell system. The portion of a fuel cell casing may be the entire fuel cell casing. The portion of a fuel cell casing is a coating on the fuel cell casing. The electrolyte and said portion of a fuel cell casing are in contact.

Disclosed herein is a fuel cell system comprising an anode having six surfaces, a cathode having six surfaces, an electrolyte, and an anode surround in contact with at least three surfaces of the anode, wherein the electrolyte is part of the anode surround and said anode surround is made of the same material as the electrolyte. In an embodiment, said same material is a DFS comprising 3YSZ (3 mol % $Y_2O_3$ in $ZrO_2$) and 8YSZ (8 mol % $Y_2O_3$ in $ZrO_2$), wherein the mass ratio of 3YSZ/8YSZ is in the range of from 100/0 to 0/100 or from 10/90 to 90/10 and wherein the DFS is impermeable to non-ionic substances and electrically insulating. In an embodiment, the mass ratio of 3YSZ/8YSZ is about 50/50 or 40/60 or 60/40 or 30/70 or 70/30 or 20/80 or 80/20. In an embodiment, the anode surround is in contact with five surfaces of the anode.

In an embodiment, the fuel cell system comprises a barrier layer between the cathode and a cathode surround, wherein the barrier layer is in contact with at least three surfaces of the cathode, wherein the electrolyte is part of the cathode surround and said cathode surround is made of the same material as the electrolyte.

In an embodiment, the fuel cell system comprises fuel passage and oxidant passage in the anode surround and the cathode surround. In an embodiment, the fuel cell system comprises an interconnect, wherein the interconnect comprises no fluid dispersing element and said anode and cathode comprise fluid dispersing components. In an embodiment, the fuel cell system comprises an interconnect, wherein the interconnect comprises no fluid dispersing element and said anode and cathode comprise fluid channels.

Tubular Design

In various cases, the electrochemical reactors as discussed in this disclosure are tubular. The discussion in this section takes tubular fuel cell (TFC) as an example of a tubular electrochemical reactor. The tubular design is applicable to other types of electrochemical reactors, e.g., the EC gas producers, the EC compressors, or flow batteries. Herein disclosed is a tubular fuel cell (TFC) comprising an internal cathode, an external anode, an electrolyte placed between the anode and the cathode, and an interconnect. In some embodiments of a TFC, an electrolyte is considered as a membrane. The cross section of the cathode is a rounded non-circular shape with no sharp corner, wherein the cross section is orthogonal to the longitudinal axis of the TFC, wherein said interconnect is in contact with the cathode but not with the anode and said interconnect has a contacting surface configured to contact an anode of an adjacent TFC, wherein the anode has a contacting surface configured to contact an interconnect of another adjacent TFC and a non-contacting surface.

In an embodiment, the TFC comprises a barrier layer between the cathode and the electrolyte or between the anode and the electrolyte or both. In an embodiment, the rounded non-circular shape comprises rounded rectangle, rounded square, rounded hexagon, rounded trapezoid, rounded parallelogram, rounded pentagon, rounded triangle, rounded octagon, oval, ellipsoid, or rounded irregular shape or combinations thereof.

In an embodiment, the ratio of the area of the contacting surface of the interconnect over the area of the non-contacting surface of the anode is no greater than 1, or no greater than 0.75, or no greater than 0.5. In an embodiment, the ratio of the area of the contacting surface of the interconnect over the area of the non-contacting surface of the anode is no greater than 0.3, or no greater than 0.1, or no greater than 0.05.

In an embodiment, the thickness of the cathode is in the range of from about 10 microns to about 1,000 microns; or from about 50 to about 150 microns; or from about 90 to about 110 microns; or about 100 microns. In an embodiment, the thickness of the anode is in the range of from about 1 micron to about 50 microns; or from about 5 microns to about 25 microns; or from about 8 microns to about 12 microns; or about 10 microns. In an embodiment, the thickness of the electrolyte is in the range of from about 100 nm to about 10 microns; or from about 500 nm to about 5 microns; or from about 800 nm to about 2 microns; or about 1 micron. In an embodiment, the thickness of the barrier layer is in the range of from about 100 nm to about 10 microns; or from about 500 nm to about 5 microns; or from about 800 nm to about 2 microns; or about 1 micron. In an embodiment, the thickness of the interconnect is in the range of from about 10 microns to about 1000 microns; or from about 50 microns to about 500 microns; or from about 80 microns to about 200 microns; or about 100 microns.

In an embodiment, the TFC has a length L and the cross section has a characteristic length of W, wherein the ratio of L/W is no less than 1. In an embodiment, the ratio of L/W is no less than 2 or no less than 10 or no less than 100.

In an embodiment, the TFC comprises a support in the cathode. In an embodiment, the support is in contact with the cathode. In an embodiment, the support is an integral part of the cathode. In an embodiment, the support and the cathode are made from the same material. In an embodiment, the support and the cathode are made from different materials. In an embodiment, the electrolyte is impermeable to fluids. In an embodiment, the cathode and the anode are porous.

Also discussed herein is a fuel cell stack comprising a multiplicity of tubular fuel cells (TFCs), wherein each of said TFCs comprises an internal cathode, an external anode, an electrolyte placed between the anode and the cathode, and an interconnect, wherein a cross section of the cathode is a rounded non-circular shape with no sharp corner, wherein the cross section is orthogonal to the longitudinal axis of the TFC, wherein said interconnect is in contact with the cathode but not with the anode and said interconnect has a contacting surface configured to contact an anode of an adjacent TFC, wherein said anode has a contacting surface configured to contact an interconnect of another adjacent TFC and a non-contacting surface.

In an embodiment, each of said TFCs comprises a barrier layer between the cathode and the electrolyte or between the anode and the electrolyte or both. In an embodiment, said rounded non-circular shape comprises rounded rectangle, rounded square, rounded hexagon, rounded trapezoid, rounded parallelogram, rounded pentagon, rounded triangle, rounded octagon, oval, ellipsoid, rounded irregular shape.

In an embodiment, the ratio of the area of the contacting surface of the interconnect over the area of the non-contacting surface of the anode is no greater than 1, or no greater than 0.75, or no greater than 0.5. In an embodiment, the ratio of the area of the contacting surface of the interconnect over the area of the non-contacting surface of the anode is no greater than 0.3, or no greater than 0.1, or no greater than 0.05.

In an embodiment, each of said TFCs has a length L and the cross section has a characteristic length of W, wherein the ratio of L/W is no less than 1 or no less than 2 or no less than 10 or no less than 100.

In an embodiment, each of said TFCs comprises a support in the cathode. In an embodiment, the support is in contact with the cathode. In an embodiment, the support is an integral part of the cathode. In an embodiment, the support and the cathode are made from the same material.

Herein disclosed is a tubular fuel cell (TFC) comprising an internal anode, an external cathode, an electrolyte placed between the anode and the cathode, and an interconnect, wherein a cross section of the anode is a rounded non-circular shape with no sharp corner, wherein the cross section is orthogonal to the longitudinal axis of the TFC, wherein the interconnect is in contact with the anode but not with the cathode and the interconnect has a contacting surface configured to contact a cathode of an adjacent TFC, wherein the cathode has a contacting surface configured to contact an interconnect of another adjacent TFC and a non-contacting surface.

In an embodiment, the rounded non-circular shape comprises rounded rectangle, rounded square, rounded hexagon, rounded trapezoid, rounded parallelogram, rounded pentagon, rounded triangle, rounded octagon, oval, ellipsoid, rounded irregular shape or combination thereof. In an embodiment, the ratio of the area of the contacting surface of the interconnect over the area of the non-contacting surface of the cathode is no greater than 1, or no greater than 0.75, or no greater than 0.5, no greater than 0.3, or no greater than 0.1, or no greater than 0.05. In an embodiment, the TFC comprises a barrier layer between the cathode and the electrolyte or between the anode and the electrolyte or both.

FIGS. 10A-10C illustrate different aspect ratios of fuel cells and how that may be connected in multi-tubular fuel cell (TFC) units comprising two or more TFCs. The TFCs comprise rounded edges. FIG. 10A illustrates a cross-sectional view of a TFC 1000, according to an embodiment of the disclosure. TFC 1000 comprises an internal cathode layer 1002, barrier layer 1004, electrolyte layer 1006, an external anode layer 1008, an interconnect 1010 and a fluid passage 1012. In some cases, the barrier layer 1004 is placed between anode 1008 and electrolyte 1006. In some cases, two barrier layers are placed (1) between cathode 1002 and electrolyte 1006 and (2) between anode 1008 and electrolyte 1006. Interconnect 1010 is in contact with cathode 1002 but not with anode 1008. The top surface of interconnect 1010 is configured to be contact with the anode 1008 of an adjacent TFC. Anode 1008 has a contacting surface on the bottom configured to be in contact with interconnect 1010 of another adjacent TFC. Anode 1008 has a non-contacting surface on both sides in the configuration as shown in FIGS. 10A-10C. In this example in FIG. 10A, the TFCs 1000 have a rounded rectangular shape that are connected by interconnects 1010 on the short end of the rectangular shape.

FIG. 10B illustrates a cross-sectional view of a TFC 1020, according to an embodiment of the disclosure. TFCs 1020 are similar in construction to TFCs 1000 but are connected by interconnects 1010 on the long side of the rectangular shape.

FIG. 10C illustrates a cross-sectional view of a TFC 1040, according to an embodiment of the disclosure. TFCs 1040 in FIG. 10C are similar in construction to TFCs in FIGS. 10A-10B but comprise a rounded square-like shape wherein the length of the sides are substantially the same. The TFCs 1040 are further connected by interconnects 1010.

In alternative embodiments, the anode 1008 may be configured to be internal and the cathode 1002 may be external. In some cases, the barrier layer may be placed between cathode and electrolyte. In some cases, two barrier layers are placed (1) between cathode and electrolyte and (2) between anode and electrolyte. All the other configurations and features as discussed above are applicable in this embodiment as well.

Figures 11A, 11B, 11C:
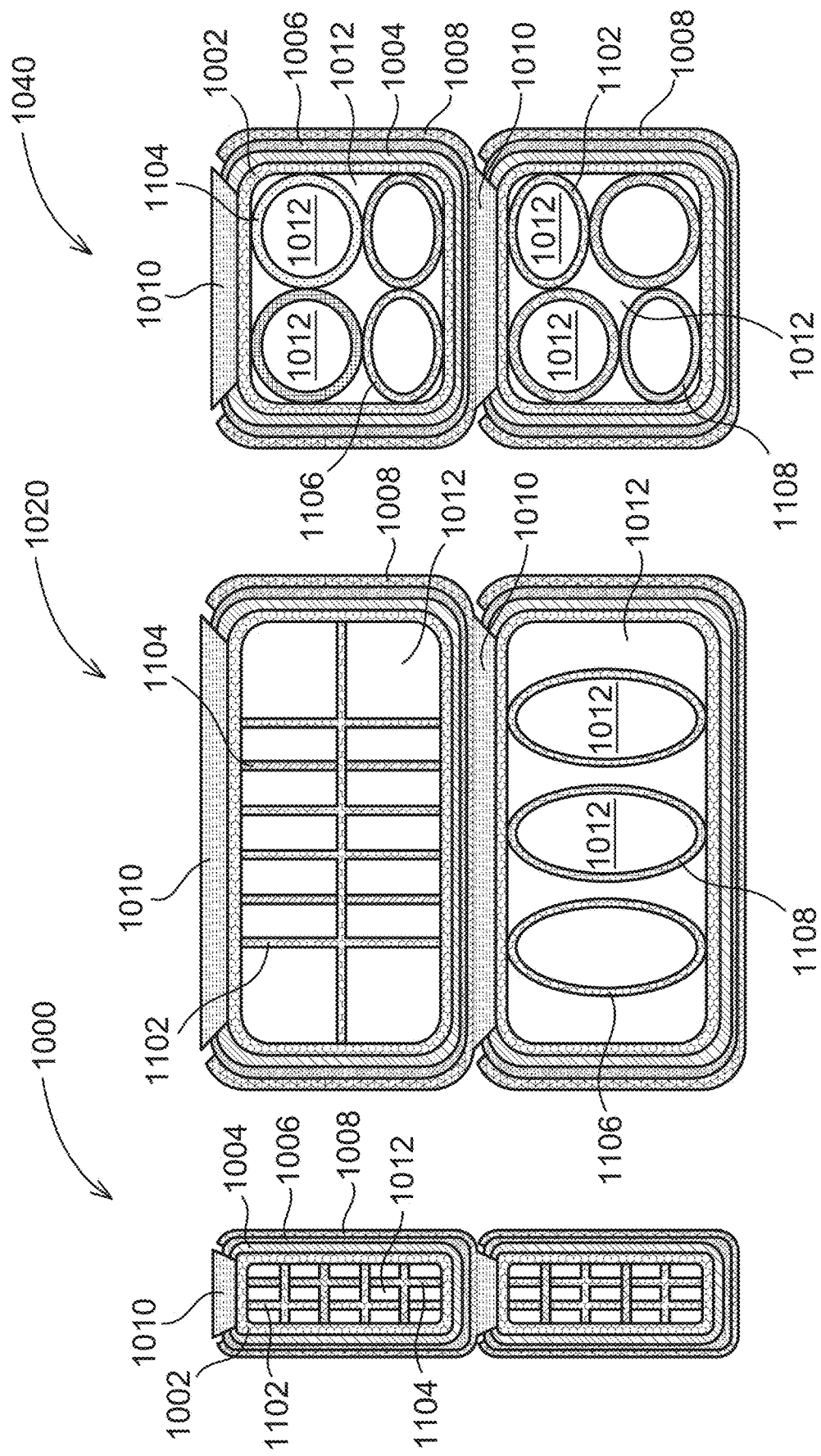
FIG. 11A illustrates a cross-sectional view of a TFC comprising a support, according to an embodiment of the disclosure.
FIG. 11B illustrates a cross-sectional view of a TFC comprising a support, according to an embodiment of the disclosure.
FIG. 11C illustrates a cross-sectional view of a TFC comprising a support, according to an embodiment of the disclosure.

In some embodiment, the TFC may further comprise one or more supports in the cathode layer as shown in FIGS. 11A-11C. FIG. 11A illustrates a cross-sectional view of a TFC 1100 comprising a support, according to an embodiment of the disclosure. TFC 1100 comprises a cathode 1002, barrier layer 1004, electrolyte 1006, anode layer 1008, interconnect 1010 and at least one fluid passage 1012. The shape and design of how the TFCs 1100 are arranged is similar to TFCs in FIG. 10A. TFCs 1100 further comprise one or more supports. The supports may be in any shape, number, size, and material as suitable. In some cases, the supports 1102 are made from the same material as the internal electrode layer such as cathode layer 1002. In some cases, the supports 1104 are made from a material different from the internal electrode layer such as cathode 1002 material. For example, an inert material in relation to the fuel cell. In some cases, the supports may be made from more than one material. In an embodiment, the one or more supports 1102, 1104 are in contact with the cathode 1002. In an embodiment, the one or more supports 1102, 1104 are integral parts of the cathode. In an embodiment, the one or more supports 1102, 1104 are made as an integral part of the cathode.

FIG. 11B illustrates a cross-sectional view of a TFC 1120 comprising a support, according to an embodiment of the disclosure. The shape and design of how the TFCs 1120 are arranged is similar to TFCs in FIG. 10B. TFCs 1120 further comprise one or more supports. The support 1102 may be a linear shaped support of the same material as the inner electrode such as the cathode 1002. The support 1104 may be a linear shaped support 1104 not constructed of the same material. The support 1106 may be an oval or circular-like shaped support constructed of the same material as the inner electrode, such as cathode 1002. The support 1108 may be an oval or circular-like shaped support not constructed of the same material as the inner electrode, such as cathode 1002. As seen in FIG. 11B, TFCs may comprise linear shaped supports 1102, 1104 and circular-shaped supports 1106, 1108.

FIG. 11C illustrates a cross-sectional view of a TFC 1140 comprising a support, according to an embodiment of the disclosure. The shape and design of how the TFCs 1140 are arranged is similar to TFCs in FIG. 10C. TFCs 1140 further comprise one or more supports. In this example, all of the supports 1106, 1108 may be circular-like or oval-like shaped though linear shaped supports 1102, 1104 may also be used.

In some embodiments, the inner electrode may be an anode layer 1008 in TFCs 1100, 1120, 1140. The supports 1102, 1104, 1106, 1108 may be constructed of the same material of the inner anode layer or not constructed of the anode layer 1008 or a combination thereof.

Herein discussed is a method comprising placing a fluidic mixture between two tubular fuel cells (TFCs), wherein said two TFCs have a gap with a minimum distance of no greater than 1 mm; heating the fluidic mixture such that the two TFCs are connected; wherein the fluidic mixture has a viscosity of no greater than 1000 centipoise. In an embodiment, the fluidic mixture has a viscosity of no greater than 500 centipoise or no greater than 300 centipoise or no greater than 200 centipoise or no greater than 100 centipoise or no greater than 50 centipoises. In an embodiment, the minimum distance of the gap is no greater than 500 microns, or no greater than 300 microns, or no greater than 200 microns, or no greater than 100 microns, or no greater than 50 microns.

In an embodiment, placing the fluidic mixture comprises aerosol jetting, material jetting, ink jet printing or combinations thereof. In an embodiment, the fluidic mixture comprises a fluid and a solid and wherein heating the fluidic mixture causes the fluid to dissipate and the solid to remain. In an embodiment, heating the fluidic mixture causes it to solidify. In an embodiment, the heating comprises the use of electromagnetic radiation (EMR). In an embodiment, EMR comprises UV light, near ultraviolet light, near infrared light, infrared light, visible light, laser, electron beam, microwave, or combinations thereof. In an embodiment, the heating comprising oven heating, furnace heating, kiln heating, plasma heating, hot surface heating, or combinations thereof. In an embodiment, the heating is accomplished via conduction, convection, radiation, or combinations thereof. In an embodiment, said heating causes sintering, co-sintering, annealing, densification, solidification, evaporation, drying, or combinations thereof.

In an embodiment, the fluidic mixture comprises gold, silver, platinum, nickel, iron, steel, stainless steel, chromium, cobalt, carbon, or inconel. In an embodiment, the fluidic mixture comprises material used for an electrode in the fuel cells or material used for an interconnect in the fuel cells or both.

In an embodiment, each of the TFCs comprises an internal cathode, an external anode, an electrolyte placed between the anode and the cathode, and an interconnect, wherein a cross section of the cathode is a rounded non-circular shape with no sharp corner, wherein the cross section is orthogonal to the longitudinal axis of the TFC, wherein the interconnect is in contact with the cathode but not with the anode and said interconnect has a contacting surface configured to contact an anode of an adjacent TFC, wherein said anode has a contacting surface configured to contact an interconnect of another adjacent TFC and a non-contacting surface.

In an embodiment, each of the TFCs comprises an internal anode, an external cathode, an electrolyte placed between the anode and the cathode, and an interconnect, wherein a cross section of the anode is a rounded non-circular shape with no sharp corner, wherein the cross section is orthogonal to the longitudinal axis of the TFC, wherein the interconnect is in contact with the anode but not with the cathode and said interconnect has a contacting surface configured to contact a cathode of an adjacent TFC, wherein the cathode has a contacting surface configured to contact an interconnect of another adjacent TFC and a non-contacting surface.

Also discussed herein is a method comprising applying contact paste on a first tubular fuel cell (TFC) and placing a second TFC in contact with the contact paste on the opposite side of the first TFC, wherein each of the first TFC and second TFC comprises an internal cathode, an external anode, an electrolyte placed between the anode and the cathode, and an interconnect, wherein a cross section of the cathode is a rounded non-circular shape with no sharp corner, wherein the cross section is orthogonal to the longitudinal axis of the TFC, wherein the interconnect is in contact with the cathode but not with the anode and said interconnect has a contacting surface configured to contact an anode of an adjacent TFC, wherein the anode has a contacting surface configured to contact an interconnect of another adjacent TFC and a non-contacting surface.

In an embodiment, the contact paste is applied via dipping, coating, spreading, spraying, airbrushing, spray pyrolysis, or painting or combinations thereof. In an embodiment, the contact paste comprises gold, silver, platinum, nickel, iron, steel, stainless steel, chromium, cobalt, carbon, or Inconel or combinations thereof. In an embodiment, the contact paste comprises material used for an electrode in the fuel cells or material used for an interconnect in the fuel cells or both. In an embodiment, the TFC comprises a barrier layer between the cathode and the electrolyte or between the anode and the electrolyte or both.

In an embodiment, the rounded non-circular shape comprises rounded rectangle, rounded square, rounded hexagon, rounded trapezoid, rounded parallelogram, rounded pentagon, rounded triangle, rounded octagon, oval, ellipsoid, or rounded irregular shape. In an embodiment, the ratio of the area of the contacting surface of the interconnect over the area of the non-contacting surface of the anode is no greater than 1, or no greater than 0.75, or no greater than 0.5. In an embodiment, the ratio of the area of the contacting surface of the interconnect over the area of the non-contacting surface of the anode is no greater than 0.3, or no greater than 0.1, or no greater than 0.05. In an embodiment, the TFC has a length L and wherein the cross section has a characteristic length of W, wherein the ratio of L/W is no less than 1, or no less than 2 or no less than 10 or no less than 100.

In an embodiment, the TFC comprises a support in the cathode. In an embodiment, the support is in contact with the cathode. In an embodiment, the support is an integral part of the cathode. In an embodiment, the support and the cathode are made from the same material.

In an embodiment, the method comprises heating the contact paste. In an embodiment, the heating comprises the use of electromagnetic radiation (EMR). In an embodiment, EMR comprises UV light, near ultraviolet light, near infrared light, infrared light, visible light, laser, electron beam or combinations thereof. In an embodiment, the heating comprising oven heating, furnace heating, kiln heating, plasma heating, hot surface heating, or combinations thereof. In an embodiment, said heating is accomplished via conduction, convection, radiation, or combinations thereof. In an embodiment, said heating causes sintering, co-sintering, annealing, densification, solidification, evaporation, drying, or combinations thereof.

Further discussed herein is a method comprising applying contact paste on a first tubular fuel cell (TFC) and placing a second TFC in contact with the contact paste on the opposite side of the first TFC, wherein each of the first TFC and second TFC comprises an internal anode, an external cathode, an electrolyte placed between the anode and the cathode, and an interconnect, wherein a cross section of the anode is a rounded non-circular shape with no sharp corner, wherein the cross section is orthogonal to the longitudinal axis of the TFC, wherein said interconnect is in contact with the anode but not with the cathode and said interconnect has a contacting surface configured to contact a cathode of an adjacent TFC, wherein said cathode has a contacting surface configured to contact an interconnect of another adjacent TFC and a non-contacting surface.

In an embodiment, the contact paste is applied via dipping, coating, spreading, spraying, painting, or combinations thereof. In an embodiment, the contact paste comprises gold, silver, platinum, nickel, iron, steel, stainless steel, chromium, cobalt, carbon, or Inconel or combinations thereof. In an embodiment, the contact paste comprises material used for an electrode in the fuel cells or material used for an interconnect in the fuel cells or both. In an embodiment, the TFC comprises a barrier layer between the cathode and the electrolyte or between the anode and the electrolyte or both. In an embodiment, the ratio of the area of the contacting surface of the interconnect over the area of the non-contacting surface of the anode is no greater than 1, or no greater than 0.75, or no greater than 0.5, or no greater than 0.3, or no greater than 0.1, or no greater than 0.05. In an embodiment, the TFC has a length L and wherein the cross section has a characteristic length of W, wherein the ratio of L/W is no less than 1, or no less than 2 or no less than 10 or no less than 100.

In an embodiment, the TFC comprises a support in the anode. In an embodiment, the support is in contact with the anode. In an embodiment, the support is an integral part of the anode. In an embodiment, the support and the anode are made from the same material.

In an embodiment, the method comprises heating the contact paste. In an embodiment, the heating comprises the use of electromagnetic radiation (EMR). In an embodiment, EMR comprises UV light, near ultraviolet light, near infrared light, infrared light, visible light, laser, electron beam, microwave. In an embodiment, said heating comprising oven heating, furnace heating, kiln heating, plasma heating, hot surface heating, or combinations thereof. In an embodiment, the heating is accomplished via conduction, convection, radiation, or combinations thereof. In an embodiment, said heating causes sintering, co-sintering, annealing, densification, solidification, evaporation, drying, or combinations thereof.

Integrated Heat Exchanger

Disclosed herein is an electrochemical (EC) reactor, such as a EC gas producer or a solid oxide reactor (SOR), comprising a first electrode, a second electrode, an electrolyte between the first and second electrodes, and a first heat exchanger, wherein the first heat exchanger is in fluid communication with the first electrode. The minimum distance between the first electrode and the first heat exchanger is no greater than 10 cm. In some embodiments, the minimum distance is no greater than 5 cm. In other embodiments, the minimum distance is no greater than 1 cm. In still other embodiments, the minimum distance is no greater than 5 mm. In even still other embodiments, the minimum distance is no greater than 1 mm. In an embodiment, the EC reactor comprises a second heat exchanger, wherein the second heat exchanger is in fluid communication with the second electrode. The minimum distance between the second electrode and the second heat exchanger no greater than 10 cm. In some embodiments, the minimum distance is no greater than 5 cm. In other embodiments, the minimum distance is no greater than 1 cm. In still other embodiments, the minimum distance is no greater than 5 mm. In even still other embodiments, the minimum distance is no greater than 1 mm.

In one embodiment, the first heat exchanger is adjacent to the first electrode, or alternatively wherein the second heat exchanger is side-by-side or adjacent to the second electrode. The one or more heat exchangers may be placed side-by-side the components in an EC reactor, or on top of or below the components (i.e., electrodes) of an EC reactor. FIG. 9B is an illustrative example where an integrated multi-fluid heat exchanger comprising 916 and 918 is at the bottom of a repeat unit/stack in a fuel cell separated only by an interconnect layer 920 from the anode 910. In this case, the minimum distance between the heat exchanger and the repeat unit/stack is only the thickness of the interconnect, which is 1 mm or less, 0.5 mm or less, 200 microns or less, or in the range of about 100 nm to about 100 microns. In some embodiments, the first heat exchanger and the second heat exchanger are the same heat exchanger, wherein the heat exchangers form a multi-fluid heat exchanger. The EC reactor may comprise a solid oxide fuel cell, solid oxide flow battery, electrochemical gas producer, or electrochemical compressor. The EC reactor may comprise a reformer upstream of the first electrode or a reformer in contact with the first electrode or a reformer in the first heat exchanger. The EC reactor may comprise two or more repeat units separated by interconnects, wherein each repeat unit comprises a first electrode, a second electrode, and an electrolyte. Each repeat unit may comprise at least one heat exchanger adjacent to the repeat unit.

Herein also disclosed is an EC reactor, such as a solid oxide reactor (SOR), comprising a stack and a heat exchanger. The stack has a stack height and comprises multiple repeat units separated by interconnects, wherein each repeat unit comprises a first electrode, a second electrode, and an electrolyte between the first and second electrodes. The heat exchanger is in fluid communication with the stack and wherein the minimum distance between the stack and the heat exchanger is no greater than 2 times the stack height, or no greater than the stack height, or no greater than half the stack height. The heat exchanger may be adjacent to the stack. The heat exchanger comprises at least three fluid inlets and at least three fluid channels, wherein each of the at least three fluid channels has a minimum dimension of no greater than 30 mm. The stack or the heat exchanger may further comprise a reformer. The reformer may be built into the stack or the heat exchanger. In an embodiment, the interconnect comprises no fluid dispersing element and the electrodes comprise fluid dispersing components or fluid channels.

In an embodiment, the EC reactor is in the form of a cartridge (such as that illustrated in FIGS. 9A-9D). The cartridge may comprise a fuel entrance on a fuel side of the cartridge, an oxidant entrance on an oxidant side of the cartridge, at least one fluid exit, wherein the fuel entrance has a width of $W_f$, the fuel side of the cartridge has a length of $L_f$, the oxidant entrance has a width of $W_o$, the oxidant side of the cartridge has a length of $L_o$, wherein $W_f/L_f$ is in the range of 0.1 to 1.0, 0.1 to 0.9, 0.2 to 0.9, 0.5 to 0.9, or 0.5 to 1.0 and $W_o/L_o$ is in the range of 0.1 to 1.0, 0.1 to 0.9, 0.2 to 0.9, 0.5 to 0.9, or 0.5 to 1.0. In some embodiments, the entrances and exit are on one surface of the cartridge wherein the cartridge comprises no protruding fluid passage on the surface. The cartridge may be detachably fixed to a mating surface and not soldered nor welded to the mating surface. The cartridge may be bolted to or pressed to the mating surface. The mating surface may comprise a matching fuel entrance, matching oxidant entrance, and at least one matching fluid exit.

Further disclosed herein is a EC reactor cartridge, such as a solid oxide reactor cartridge (SDRC), comprising a first electrode, a second electrode, an electrolyte between the first and second electrodes, and a heat exchanger, wherein said heat exchanger is in fluid communication with the first electrode or the second electrode or both. The minimum distance between the heat exchanger and the first electrode or the second electrode is no greater than 10 cm, or no greater than 5 cm, or no greater than 1 cm, or no greater than 5 mm, or no greater than 1 mm.

In an embodiment, the EC reactor cartridge comprises a reformer upstream of the first electrode or a reformer in contact with the first electrode or a reformer in the heat exchanger. The EC reactor cartridge may comprise a fuel entrance on a fuel side of the cartridge, an oxidant entrance on an oxidant side of the cartridge, at least one fluid exit, wherein the fuel entrance has a width of $W_f$, the fuel side of the cartridge has a length of $L_f$, the oxidant entrance has a width of $W_o$, the oxidant side of the cartridge has a length of $L_o$. The ratio of $W_f/L_f$ is in the range of 0.1 to 1.0, 0.1 to 0.9, 0.2 to 0.9, 0.5 to 0.9, or 0.5 to 1.0 and the ratio of $W_o/L_o$ is in the range of 0.1 to 1.0, 0.1 to 0.9, 0.2 to 0.9, 0.5 to 0.9, or 0.5 to 1.0. The entrances and exit may be on one surface of the cartridge and wherein the cartridge comprises no protruding fluid passage on the surface. The EC reactor cartridge may be detachably fixed to a mating surface and not soldered nor welded to the mating surface.

Discussed herein is a method of forming an EC reactor, such as a solid oxide reactor (SOR), comprising forming a first electrode in a device, forming an electrolyte in the same device, forming a second electrode in the same device, and forming a heat exchanger in the same device, wherein the electrolyte is between the first electrode and the second electrode and is in contact with the electrodes. The heat exchanger may be in fluid communication with the first electrode or the second electrode or both. The forming method may comprise one or more of material jetting, binder jetting, inkjet printing, aerosol jetting, aerosol jet printing, vat photopolymerization, powder bed fusion, material extrusion, directed energy deposition, sheet lamination, ultrasonic inkjet printing, direct (dry) powder deposition, or combinations thereof. Preferably, the forming is accomplished by inkjet printing.

In an embodiment, the method of forming an EC reactor further comprises heating the EC reactor. The heating may be performed in situ. The heating may be performed using electromagnetic radiation (EMR). The method of forming an EC reactor may further comprise forming multiple repeat units and interconnects between the repeat units, wherein a repeat unit comprises the first electrode, the electrolyte, and the second electrode. In an embodiment, forming the repeat units and the interconnects take place in the same device. In a preferred embodiment, the method comprises heating the repeat units and the interconnects in situ using EMR. In a preferred embodiment, the method further comprises forming a reformer. The reformer may be formed in the same device.

In an embodiment, the interconnects in the EC reactor comprise no fluid dispersing element. In an embodiment, the method of forming an EC reactor comprises forming a first template while forming the first electrode, wherein the first template is in contact with the first electrode; removing at least a portion of the first template to form channels in the first electrode. The method further comprises forming a second template while forming the second electrode, wherein the second template is in contact with the second electrode; removing at least a portion of the second template to form channels in the second electrode. In an embodiment, the first electrode comprises fluid dispersing components (FDC) or fluid channels; wherein the second electrode comprises fluid dispersing components (FDC) or fluid channels.

In an embodiment, the EC reactor, such as an SOR, is formed into a cartridge. The cartridge comprises a fuel entrance on a fuel side of the cartridge, an oxidant entrance on an oxidant side of the cartridge, at least one fluid exit, wherein the fuel entrance has a width of $W_f$, the fuel side of the cartridge has a length of $L_f$, the oxidant entrance has a width of $W_o$, and the oxidant side of the cartridge has a length of $L_o$. The ratio of $W_f/L_f$ may be in the range of 0.1 to 1.0, 0.1 to 0.9, 0.2 to 0.9, 0.5 to 0.9, or 0.5 to 1.0 and the ratio of $W_o/L_o$ is in the range of 0.1 to 1.0, 0.1 to 0.9, 0.2 to 0.9, 0.5 to 0.9, or 0.5 to 1.0. In an embodiment, the entrances and exit are on one surface of the cartridge and said cartridge comprises no protruding fluid passage on said surface. In an embodiment, the cartridge is detachably fixed to a mating surface and not soldered nor welded to the mating surface. The cartridge may be bolted to or pressed to the mating surface. In an embodiment, the method comprises forming a reformer upstream of the first electrode or a reformer in contact with the first electrode or a reformer in the heat exchanger. The reformer may be formed in the same device.

Also disclosed herein is a method comprising forming an EC reactor stack and a heat exchanger, wherein the stack having a stack height comprises multiple repeat units separated by interconnects, wherein each repeat unit comprises a first electrode, a second electrode, and an electrolyte between the first and second electrodes. The heat exchanger may be in fluid communication with the stack and wherein the minimum distance between the stack and the heat exchanger is no greater than 2 times the stack height, or no greater than the stack height, or no greater than half the stack height.

In an embodiment, the EC reactor stack, such as an SOR, and the heat exchanger are formed in the same device. The method may comprise forming the stack and the heat exchanger into a cartridge. The cartridge may be detachably fixed to a mating surface and not soldered nor welded to the mating surface.

Further discussed herein is a method comprising forming an EC reactor, such as a SOR, comprising a first electrode, a second electrode, an electrolyte between the first and second electrodes, and a heat exchanger. The heat exchanger may be in fluid communication with the first electrode or the second electrode or both. The minimum distance between the heat exchanger and the first electrode or the second electrode is no greater than 10 cm, no greater than 5 cm, no greater than 1 cm, no greater than 5 mm, or no greater than 1 mm. In some cases, the electrodes, the electrolyte, and the heat exchanger are formed in the same device. The method in some cases also comprises forming the EC reactor into a cartridge. The cartridge may be detachably fixed to a mating surface and not soldered nor welded to the mating surface.

Disclosed herein is a method comprising forming an EC reactor cartridge comprising forming a first electrode, forming a second electrode, forming an electrolyte between the first and second electrodes, and forming a heat exchanger. In an embodiment, the heat exchanger is in fluid communication with the first electrode or the second electrode or both. In an embodiment, the electrodes, the electrolyte, and the heat exchanger are formed in the same device. In an embodiment, the method comprises forming a reformer upstream of the first electrode or a reformer in contact with the first electrode or a reformer in the heat exchanger. In an embodiment, the reformer is formed in the same device.

Fischer Tropsch

The method and system of this disclosure are suitable for making a catalyst or a catalyst composite, such as a Fischer-Tropsch (FT) catalyst or catalyst composite. Disclosed herein is a Fischer-Tropsch (FT) catalyst composite comprising a catalyst and a substrate, wherein the mass ratio between the catalyst and the substrate is in no less than 1/100, or no less than 1/10, or no less than 1/5, or no less than 1/3, or no less than 1/1. In an embodiment, the catalyst comprises Fe, Co, Ni, or Ru. The substrate comprises $Al_2O_3$, $ZrO_2$, $SiO_2$, $TiO_2$, $CeO_2$, modified $Al_2O_3$, modified $ZrO_2$, modified $SiO_2$, modified $TiO_2$, modified $CeO_2$, gadolinium, steel, cordierite ($2MgO$-$2Al_2O_3$-$5SiO_2$), aluminum titanate ($Al_2TiO_5$), silicon carbide (SiC), all phases of aluminum oxide, yttria or scandia-stabilized zirconia (YSZ), gadolinia or samaria-doped ceria, or combinations thereof. In an embodiment, the catalyst composite comprises a promoter wherein the promoter comprises noble metals, metal cations, or combinations thereof. The promoter may comprise B, La, Zr, K, Cu, or combinations thereof. In an embodiment, the catalyst composite comprises fluid channels or alternatively fluid dispersing components.

The FT reactor/system of this disclosure is much smaller than traditional FT reactors/systems (e.g., 3-100 times smaller or 100+ times smaller for the same FT product generation rate). The high catalyst to substrate ratio is not achievable by traditional methods to make FT catalysts. As such, in some embodiments, the FT reactor system is miniaturized compared to traditional FT reactors/systems.

Also discussed herein is a method comprising depositing a FT catalyst to a substrate to form a FT catalyst composite, wherein said depositing comprises material jetting, binder jetting, inkjet printing, aerosol jetting, or aerosol jet printing, vat photopolymerization, powder bed fusion, material extrusion, directed energy deposition, sheet lamination, ultrasonic inkjet printing, or combinations thereof. In an embodiment, the mass ratio between the catalyst and the substrate is in no less than 1/100, or no less than 1/10, or no less than 1/5, or no less than 1/3, or no less than 1/1. In preferred embodiments, the deposition method comprises forming fluid channels or alternatively fluid dispersing components in the catalyst composite.

Further discussed herein is a system comprising a Fischer-Tropsch (FT) reactor containing a FT catalyst composite comprising a catalyst and a substrate, wherein the mass ratio between the catalyst and the substrate is in no less than 1/100, or no less than 1/10, or no less than 1/5, or no less than 1/3, or no less than 1/1. In an embodiment, the catalyst comprises Fe, Co, Ni, or Ru. In an embodiment, the substrate comprises $Al_2O_3$, $ZrO_2$, $SiO_2$, $TiO_2$, $CeO_2$, modified $Al_2O_3$, modified $ZrO_2$, modified $SiO_2$, modified $TiO_2$, modified $CeO_2$, gadolinium, steel, cordierite ($2MgO$-$2Al_2O_3$-$5SiO_2$), aluminum titanate ($Al_2TiO_5$), silicon carbide (SiC), all phases of aluminum oxide, yttria or scandia-stabilized zirconia (YSZ), gadolinia or samaria-doped ceria, or combinations thereof. In an embodiment, the catalyst composite comprises a promoter.

As an example, a FT catalyst composite is formed via printing. The catalyst and the substrate/support are made into an ink form comprising a solvent and particles (e.g., nanoparticles). The ink optionally comprises a dispersant, a binder, a plasticizer, a surfactant, a co-solvent, or combinations thereof. The ink may be any kind of suspension. The ink may be treated with a mixing process, such as ultrasonication or high shear mixing. In some cases, an iron ink is in an aqueous environment. In some cases, an iron ink is in an organic environment. The iron ink may also include a promoter. The substrate/support may be a suspension or ink of alumina, in an aqueous environment or an organic environment. The substrate ink may be treated with a mixing process, such as ultrasonication or high shear mixing. In some cases, the substrate ink comprises a promoter. In some cases, the promoter is added as its own ink, in an aqueous environment or an organic environment. In some cases, the various inks are printed separately and sequentially. In some cases, the various inks are printed separately and simultaneously, for example, through different print heads. In some cases, the various inks are printed in combination as a mixture.

As an example, an exhaust from the fuel cell comprises hydrogen, carbon dioxide, water, and optionally carbon monoxide. The exhaust is passed over a FT catalyst (e.g., an iron catalyst) to produce synthetic fuels or lubricants. The FT iron catalyst has the property to promote water gas shift reaction or reverse water gas shift reaction. The FT reactions take place at a temperature in the range of 150-350° C. and a pressure in the range of one to several tens of atmospheres (e.g., 15 atm or 10 atm or 5 atm or 1 atm). Additional hydrogen may be added to the exhaust stream to reach a hydrogen to carbon oxides ratio (carbon dioxide and carbon monoxide) of no less than 2 or no less than 3 or between 2 and 3.

Fluid Dispersing Component

Figure 12A:
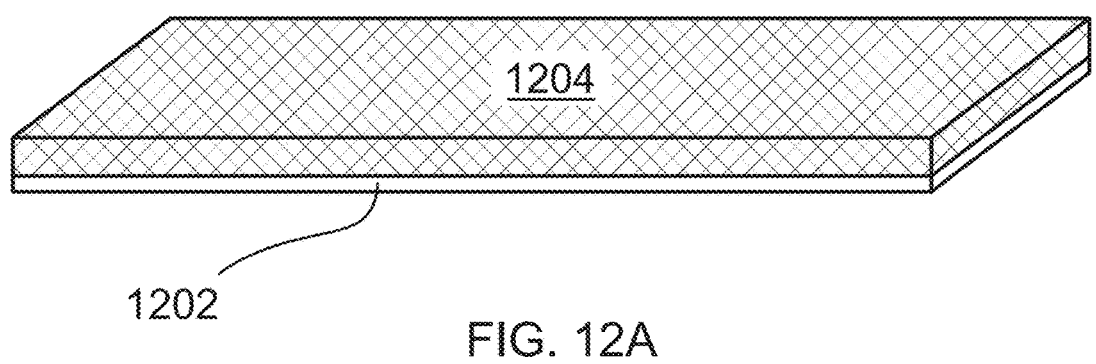
FIG. 12A illustrates an impermeable interconnect 1202 with a fluid dispersing component 1204, according to an embodiment of the disclosure.
Figure 12B:
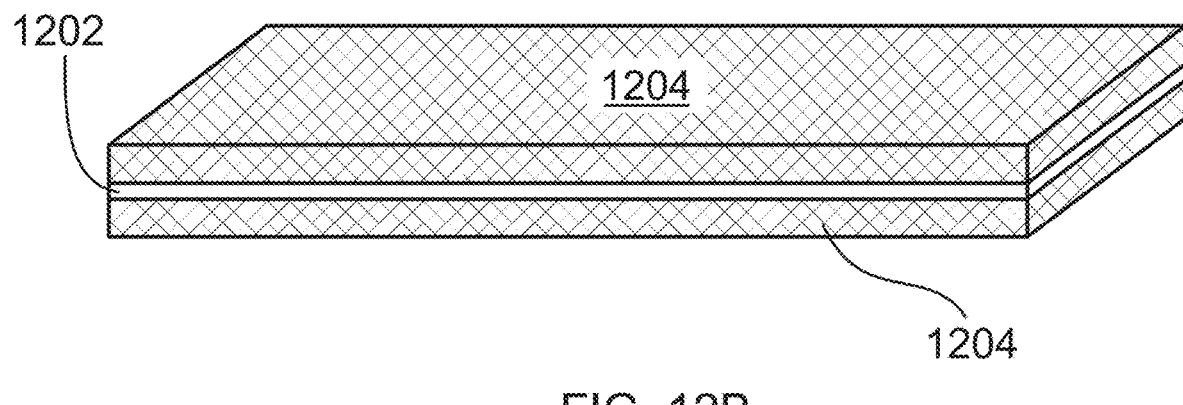
FIG. 12B illustrates an impermeable interconnect 1202 with two fluid dispersing components 1204, according to an embodiment of the disclosure.
Figure 12C:
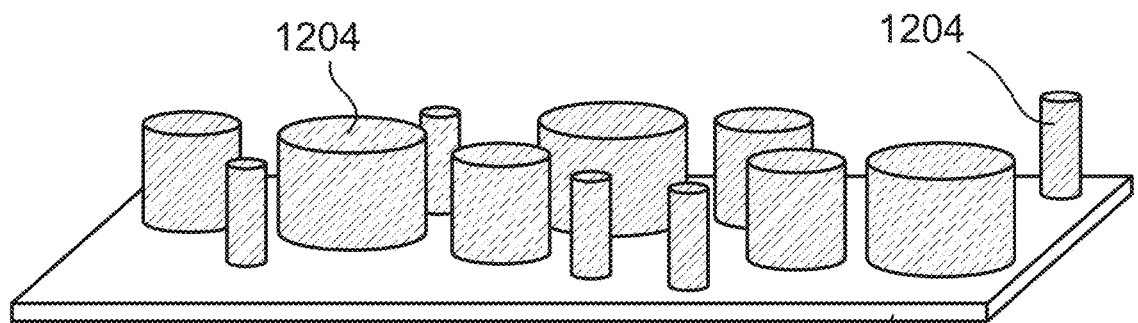
FIG. 12C illustrates segmented fluid dispersing components 1204 of similar shapes but different sizes on an impermeable interconnect 1202, according to an embodiment of the disclosure.
Figure 12D:
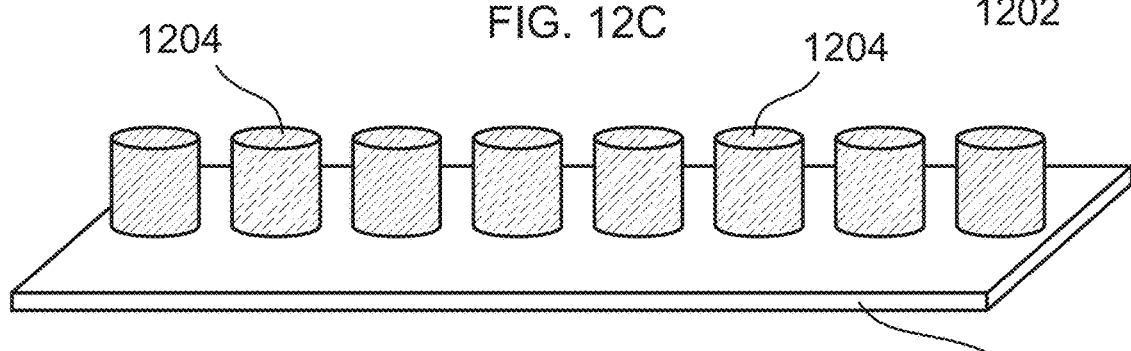
FIG. 12D illustrates segmented fluid dispersing components 1204 of similar shapes and similar sizes on an impermeable interconnect 1202, according to an embodiment of the disclosure.

FIG. 12A illustrates an impermeable interconnect 1202 with a fluid dispersing component 1204, according to an embodiment of the disclosure. FIG. 12B illustrates an impermeable interconnect 1202 with two fluid dispersing components 1204, according to an embodiment of the disclosure. The fluid dispersing components 1204 are in contact with both sides (major faces) of interconnect 1202. As such, the interconnect is shared between two repeat units in an electrochemical reactor, such as in a EC gas producer. Fluid dispersing components 1204 function to distribute fluids, e.g., reactive gases (such as methane, hydrogen, carbon monoxide, air, oxygen, etc.), in an electrochemical reactor. As such, traditional interconnects with channels are no longer needed. The design and manufacturing of such traditional interconnects with channels is complex and expensive. According to this disclosure, the interconnects are simply impermeable layers that conduct or collect electrons, having no fluid dispersing elements.

FIGS. 12C-F schematically illustrate segmented fluid dispersing components 1204 on top of impermeable interconnect 1202, according to embodiments of the disclosure.

Figure 12E:
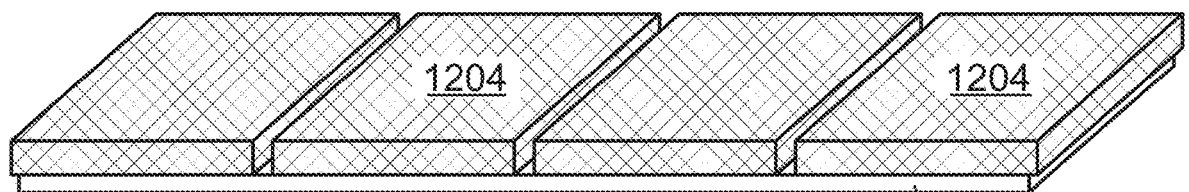
FIG. 12E illustrates segmented fluid dispersing components 1204 of similar shapes and similar sizes but closely packed on an impermeable interconnect 1202, according to an embodiment of the disclosure.
Figure 12F:
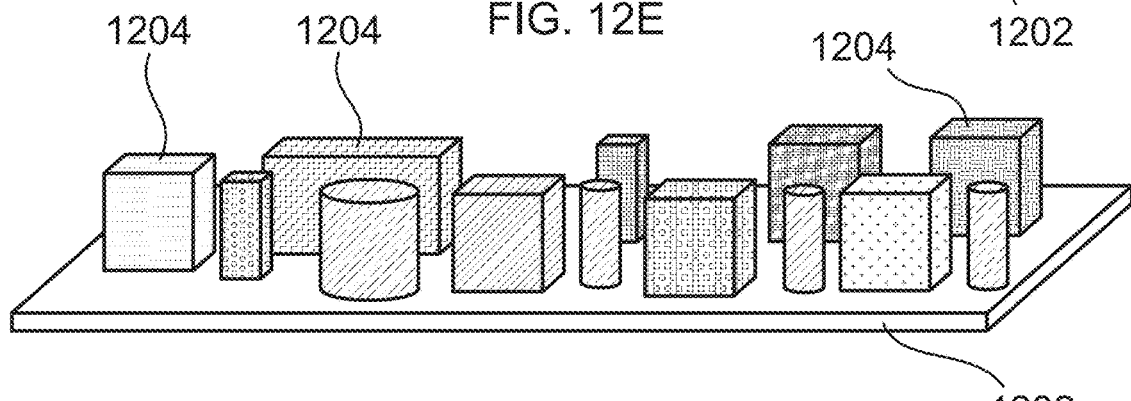
FIG. 12F illustrates segmented fluid dispersing components 1204 of different shapes and different sizes on an impermeable interconnect 1202, according to an embodiment of the disclosure.
Figure 13A:
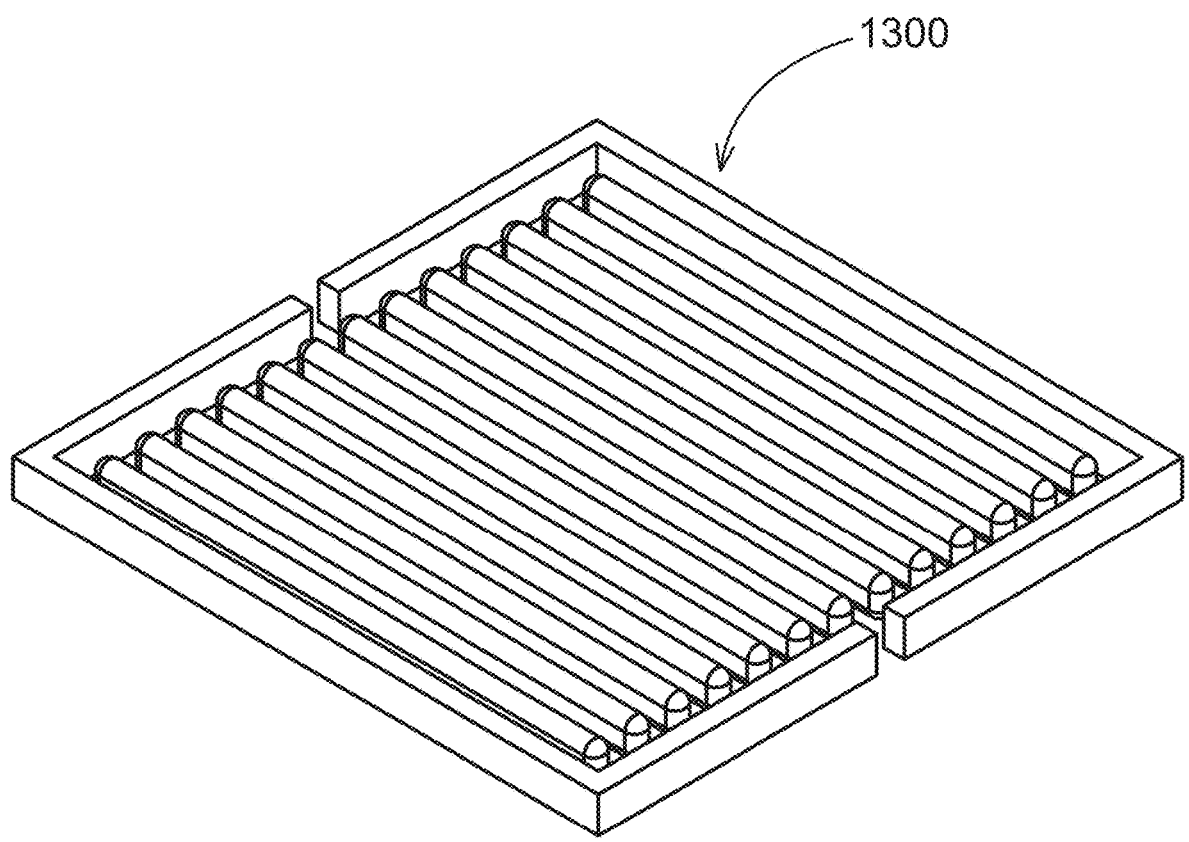
FIG. 13A illustrates a template 1300 for making channeled electrodes, according to an embodiment of the disclosure.
Figure 13C:
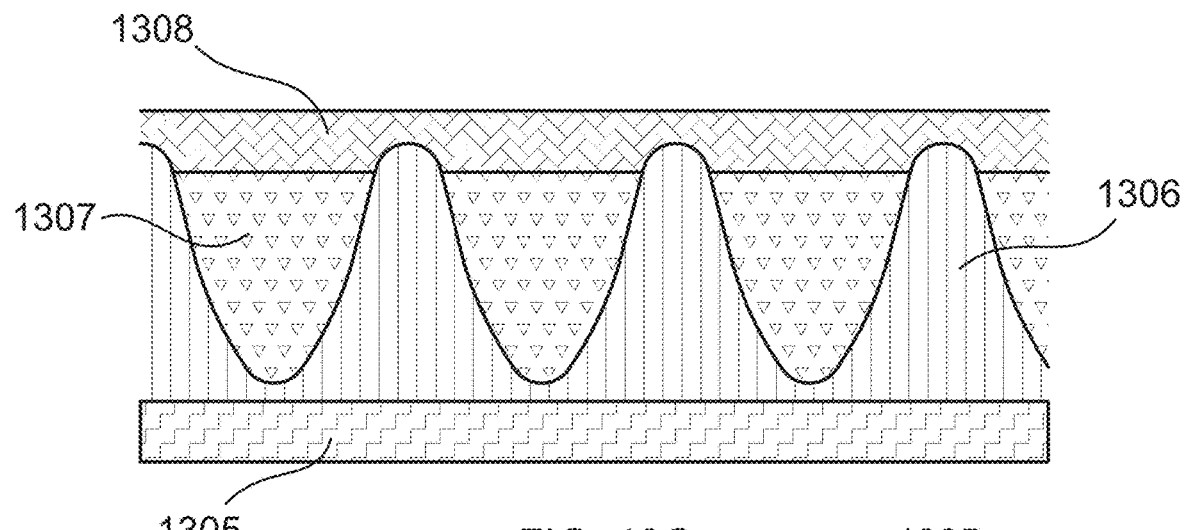
FIG. 13C is a cross-sectional view of a half cell between a second interconnect and an electrolyte, according to an embodiment of the disclosure.

Such segments may have different compositions, shapes, densities, porosities, pore sizes, pore shapes, permeabilities, or combinations thereof. The segments may be discontinuous. FIG. 13C illustrates segmented fluid dispersing components 1204 of similar shapes but different sizes on an impermeable interconnect 1202. FIG. 13D illustrates segmented fluid dispersing components 1204 of similar shapes and similar sizes on an impermeable interconnect 1202, according to an embodiment of the disclosure. FIG. 12E illustrates segmented fluid dispersing components 1204 of similar shapes and similar sizes but closely packed on an impermeable interconnect 1202, according to an embodiment of the disclosure. FIG. 12F illustrates segmented fluid dispersing components 1204 of different shapes and different sizes on an impermeable interconnect 1202, according to an embodiment of the disclosure. It is also contemplated that these segments have different compositions, densities, porosities, pore sizes, pore shapes, permeabilities, or combinations thereof.

Figure 12G:
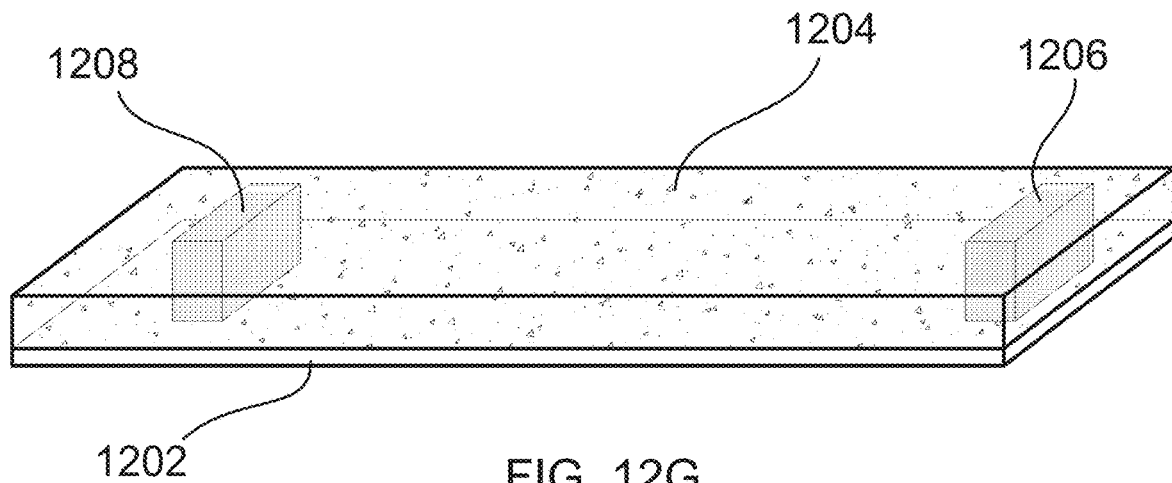
FIG. 12G illustrates an impermeable interconnect 1202 and fluid dispersing component segment 1204, according to an embodiment of the disclosure.
Figure 12H:
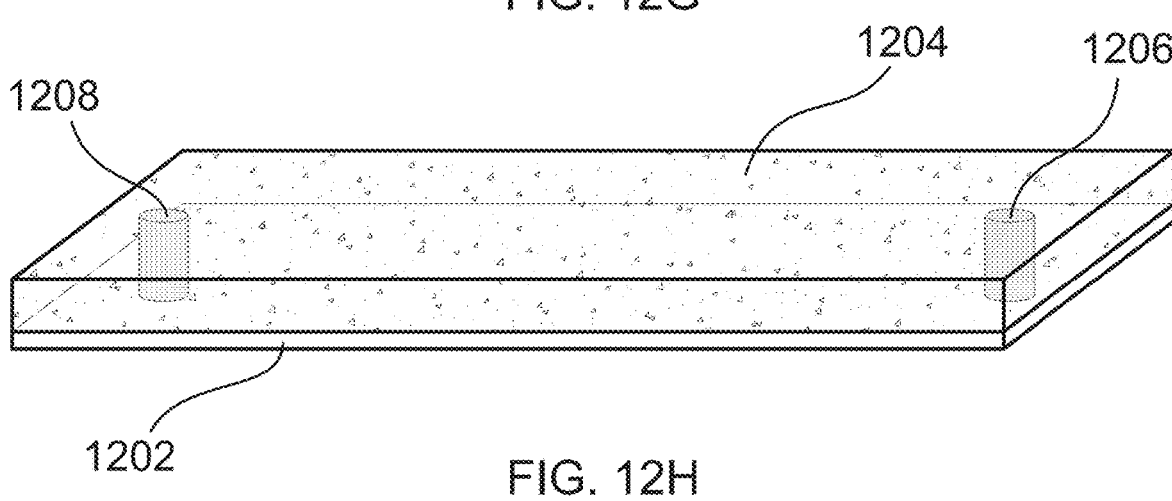
FIG. 12H illustrates an impermeable interconnect and fluid dispersing component segment, according to an embodiment of the disclosure.
Figure 12I:
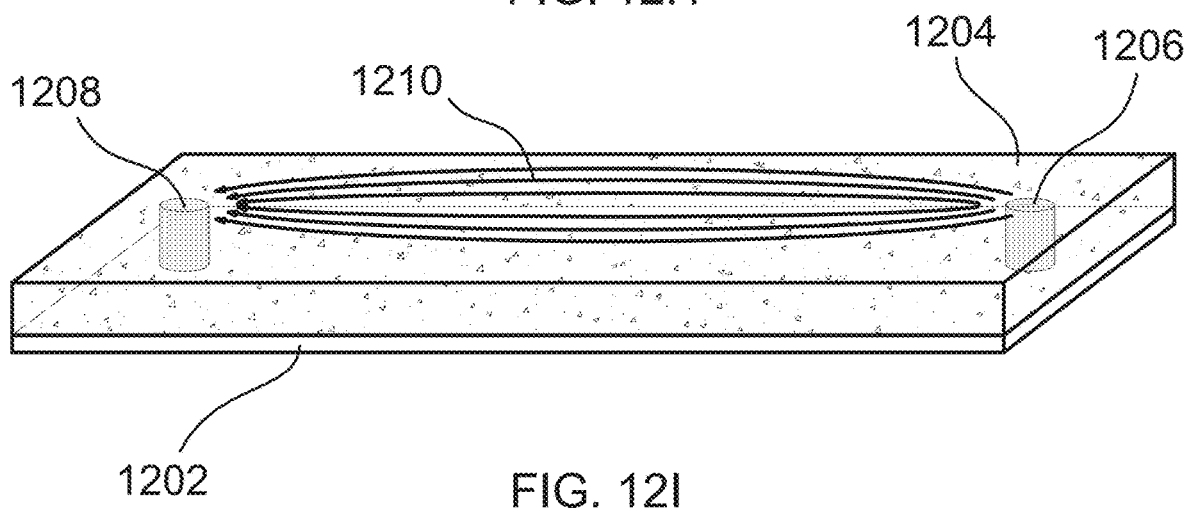
FIG. 12I illustrates an impermeable interconnect and fluid dispersing component segments, according to an embodiment of the disclosure.
Figure 12J:
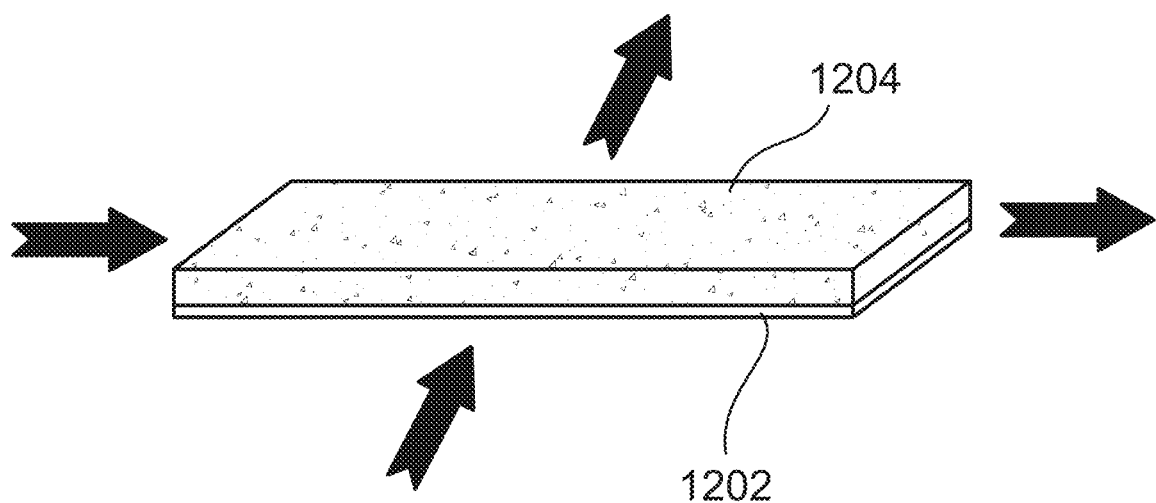
FIG. 12J illustrates an impermeable interconnect 1202 and a fluid dispersing component segment 1204, according to an embodiment of the disclosure.

FIGS. 12G-I schematically illustrates an impermeable interconnect 1202 with fluid dispersing component 1204, according to embodiments of the disclosure. Further illustrated are different fluid inlet and out designs. The fluid dispersing components may have varying density, porosity, pore size, pore shape, composition, or permeability, or combinations thereof, in different portions (e.g., in the lateral direction or perpendicular to the lateral direction). Such variabilities provide control and adjustability of the fluid flow in the fluid dispersing component. FIG. 12G illustrates an impermeable interconnect 1202 and fluid dispersing component 1204, according to an embodiment of the disclosure. FIG. 12H illustrates an impermeable interconnect 1202 and fluid dispersing component 1204, according to an embodiment of the disclosure. FIG. 12I illustrates an impermeable interconnect 1202 and fluid dispersing component 1204, according to an embodiment of the disclosure. 1206 and 1208 in FIGS. 12G-I represent different inlet and outlet designs, according to embodiments of the disclosure. The interconnect 1202 has matching inlet and outlet for each configuration. In FIG. 12I, 1206 represents a fluid inlet and 1208 represents a fluid outlet. The fluid flow is denoted by arrows 1210. FIG. 12J illustrates an impermeable interconnect 1202 and a fluid dispersing component 1204, according to an embodiment of the disclosure. Further illustrated in FIG. 12J are alternative fluid flow designs as shown by the arrows. For example, the fluid may flow from left to right across the fluid dispersing component; or the fluid may flow from front to back across the fluid dispersing component.

Figure 12K:
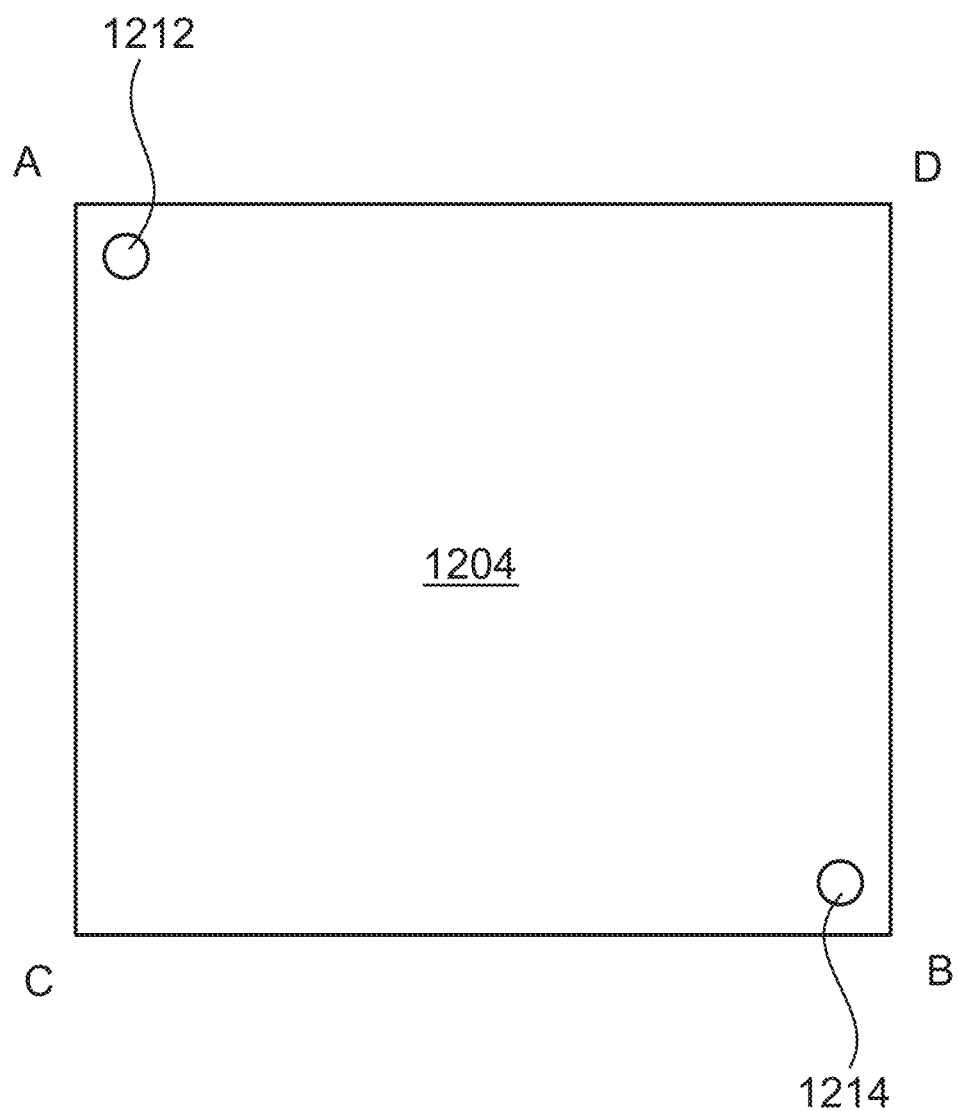
FIG. 12K illustrates a fluid dispersing component 1204, according to an embodiment of the disclosure.

FIG. 12K illustrates a fluid dispersing component 1204, according to an embodiment of the disclosure. Fluid dispersing component 1204 design comprises four corners labeled A, B, C, and D. Location A comprises fluid flow inlet 1212. Location B comprises fluid flow outlet 1214.

Discussed herein is an electrochemical reactor (e.g., a fuel cell) comprising an impermeable interconnect having no fluid dispersing element, an electrolyte, a fluid dispersing component (FDC) between the interconnect and the electrolyte. In an embodiment, the fuel cell comprises two FDC's. The two FDC's may be symmetrically placed in contact with the interconnect on its opposing side or opposing major faces. As such, the interconnect is shared between the two repeat units in the electrochemical reactor, each repeat unit comprising one of the two FDC's. The FDC may be a foam, open cell foam, or comprises a lattice structure.

In a preferred embodiment, the FDC is segmented wherein the segments have different compositions, materials, shapes, sizes, densities, porosities, pore sizes, pore shapes, permeabilities, or combinations thereof. The shapes of the segments may comprise pillar, hollow cylinder, cube, rectangular cuboid, trigonal trapezohedron, quadrilateral frustum, parallelepiped, triangular bipyramid, tetragonal anti-wedge, pyramid, pentagonal pyramid, prism, or combinations thereof.

In some embodiments, the FDC has varying density, porosity, pore size, pore shape, permeability, or combinations thereof wherein the density, porosity, pore size, pore shape, or permeability or combination thereof is controlled. In some embodiments, the density, porosity, pore size, pore shape, or permeability or combination thereof, is controlled to adjust flow of a fluid through the FDC. In other embodiments, the density, porosity, pore size, pore shape, or permeability or combination thereof is controlled to cause uniform fluid flow from a first point in the FDC to a second point in the FDC. The fluid flow pattern may be adjusted as desired. For example, it does not need to be uniform. The fluid flow may be increased or decreased according to the reactivities of the FDC or reaction rates of the fluid in the various portions of the FDC. Alternatively and/or in combination, the fluid flow may be increased or decreased according to the fluid flow rates to an anode or a cathode in the various portions of the FDC. Alternatively and/or in combination, the fluid flow may be increased or decreased according to the reaction rates in an anode or a cathode related to or in contact with the various portions of the FDC.

In an embodiment, density is higher in the center of the FDC. In an embodiment, density is lower in the center of the FDC. In an embodiment, porosity or permeability or pore throat size is lower toward the center of the FDC. In an embodiment, porosity or permeability or pore throat size is higher toward the center of the FDC.

In an embodiment, at least a portion of the FDC is part of an anode or part of a cathode. In a preferred embodiment, the FDC is an anode or a cathode. In an embodiment, the impermeable interconnect has a thickness of no greater than 10 microns, or no greater than 1 micron, or no greater than 500 nm. In a preferred embodiment, the impermeable interconnect comprises inlets and outlets for fluids. In a preferred embodiment, the fluids comprise reactants for the fuel cell.

Herein also disclosed is a method of making a fuel cell comprising (a) forming an impermeable interconnect having no fluid dispersing element; (b) forming an electrolyte; (c) forming a fluid dispersing component (FDC); and (d) placing the FDC between the interconnect and the electrolyte.

In an embodiment, the FDC is formed by creating a multiplicity of segments and assembling the segments. The segments have different compositions, materials, shapes, sizes, densities, porosities, pore sizes, pore shapes, permeabilities, or combinations thereof wherein the shapes comprise a pillar, hollow cylinder, cube, rectangular cuboid, trigonal trapezohedron, quadrilateral frustum, parallelepiped, triangular bipyramid, tetragonal anti-wedge, pyramid, pentagonal pyramid, prism, or combinations thereof. The FDC may be a foam, open cell foam; or comprises a lattice structure.

In preferred embodiments, the method of forming the FDC comprises varying density, porosity, pore size, pore shape, permeability, or combinations thereof. In an embodiment, the method comprises controlling the density, porosity, pore size, pore shape, permeability, or combinations thereof of the FDC. The method may comprise controlling density, porosity, pore size, pore shape, permeability, or combinations thereof of the FDC to adjust flow of a fluid through the FDC. The method may comprise controlling density, porosity, pore size, pore shape, permeability, or combinations thereof of the FDC to cause uniform fluid flow from a first point in the FDC to a second point in the FDC. The method may comprise controlling density, porosity, pore size, pore shape, permeability, or combinations thereof of the FDC to cause patterned fluid flow from a first point in the FDC to a second point in the FDC.

The fluid flow pattern may be adjusted as desired. For example, it does not need to be uniform. The fluid flow may be increased or decreased according to the reactivities of the FDC or reaction rates of the fluid in the various portions of the FDC. Alternatively and/or in combination, the fluid flow may be increased or decreased according to the fluid flow rates to an anode or a cathode in the various portions of the FDC. Alternatively and/or in combination, the fluid flow may be increased or decreased according to the reaction rates in an anode or a cathode related to or in contact with the various portions of the FDC.

In an embodiment, step (c) comprises varying composition of material used to form the FDC. In an embodiment, step (c) comprises varying particles size used to form the FDC. In an embodiment, step (c) comprises heating different portions of the FDC to different temperatures. In an embodiment, said heating comprises electromagnetic radiation (EMR). In an embodiment, EMR comprises one or more of UV light, near ultraviolet light, near infrared light, infrared light, visible light, laser or electron beam.

In an embodiment, steps (a)-(d) or steps (b)-(d) are performed using additive manufacturing (AM). In various embodiments, AM comprises extrusion, photopolymerization, powder bed fusion, material jetting, binder jetting, directed energy deposition or lamination or combinations thereof.

In an embodiment, the method of forming the FDCs comprises heating the fuel cell such that shrinkage rates of the FDC and the electrolyte are matched or such that shrinkage rates of the interconnect, the FDC, and the electrolyte are matched. In a preferred embodiment, the heating comprises EMR. In an embodiment, EMR comprises UV light, near ultraviolet light, near infrared light, infrared light, visible light, laser or electron beam or combinations thereof. In a preferred embodiment, heating is performed in situ. In preferred embodiments, heating takes place for no greater than 30 minutes, or no greater than 30 seconds, or no greater than 30 milliseconds.

In a preferred embodiment, at least a portion of the FDC is part of an anode or part of a cathode. In a preferred embodiment, the FDC is an anode or a cathode. In preferred embodiments, the impermeable interconnect has a thickness of no greater than 10 microns, or no greater than 1 micron, or no greater than 500 nm. Preferably, the impermeable interconnect comprises inlets and outlets for fluids. More preferably, the fluids comprise reactants for the fuel cell.

Channeled Electrodes

Disclosed herein is a method comprising providing a template wherein the template is in contact with an electrode material; and removing at least a portion of the template to form channels in the electrode material, such as in an EC gas producer. FIG. 13A illustrates a template 1300 for making channeled electrodes, according to an embodiment of the disclosure. Such templates may be removed by oxidation, melting, vaporization, reduction, or any suitable means, either after the electrochemical reactor is made or at the start of the utilization of the reactor.

In an embodiment, the channeled electrode material comprises NiO, YSZ, GDC, LSM, LSCF, or combinations thereof. The channeled electrode material may comprise any material previously described herein for a cathode or anode.

In an embodiment, providing a template comprises printing the template or precursors that assemble to form the template. Providing a template comprises polymerizing one or more monomers or a photo-initiator, or both. In an embodiment, the method comprises curing monomers and/or oligomers, through internal or external techniques. In various embodiments, internal techniques include polymerization by free radical molecular initiation, and/or initiation by in situ reduction/oxidation. In various embodiments, external techniques include photolysis, exposure to ionizing radiation, (ultra)sonication and thermal decomposition to form the initiator species. In a preferred embodiment, said curing comprises UV curing. In an embodiment, the method comprises adding a polymerizing agent, wherein the polymerizing agent comprises a photo-initiator. In an embodiment, the polymerizing agent is printed on top of the monomer or printed within each slice of the monomer.

In an embodiment, providing a template comprises dispersing metal oxide particles in a monomer ink before printing the template. In an embodiment, the metal oxide comprises NiO, CuO, LSM (lanthanum strontium manganite), LSCF (lanthanum strontium cobalt ferrite), GDC (gadolinium doped ceria), SDC (samaria-doped ceria), or combinations thereof. In an embodiment, said monomer comprises alcohol, aldehyde, carboxylic acid, ester, and/or ether functional groups. In an embodiment, said template comprises NiO, Cu(I)O, Cu(II)O, an organic compound, a photopolymer, or combinations thereof.

In an embodiment, removing at least a portion of the template comprises heating, combustion, solvent treatment, oxidation, reduction, or combinations thereof. In an embodiment, the combustion leaves no deposits and is not explosive. In an embodiment, the reduction takes place in a metal oxide and produces porous template. In an embodiment, the method of providing a template comprises heating in situ.

In an embodiment, the template and electrode material are printed slice by slice and a second slice is printed atop a first slice before the first slice is heated, wherein the heating removes at least a portion of the template. In an embodiment, the heating comprises EMR. In an embodiment, EMR comprises one or more of UV light, near ultraviolet light, near infrared light, infrared light, visible light, laser, electron beam.

In an embodiment, the channels and the electrode material form an electrode layer. In an embodiment, the channels have regular trajectories within the electrode layer. For example, the channels are parallel to one another. The channels may run from one end, edge, or corner of the electrode layer to the opposite end, edge or corner. The channels may run from one end, edge or corner of the electrode, turn 90 degrees to another end, edge or corner. The channels have random trajectories within the electrode layer. For example, the channels may have tortuous trajectories with no regularities. The channels may have more than one entry point and more than one exit point. The more than one entry point and the more than one exit point are distributed across the electrode layer. The entry points and the exits points of the channels in the electrode layer may be on any side of the electrode layer, including the top surface or side and the bottom surface or side.

In some embodiments, the volume fraction of the template in the electrode layer is in the range of 5%-95%, or 10%-90%, or 20%-80%, or 30%-70%, or 40%-60%. The volume fraction of the channels in the electrode layer is in the range of 10%-90%, or 20%-80%, or 30%-70%, or 40%-60%. The total effective porosity of the electrode layer with channels is preferably in the range of 20%-80%, or 30%-70%, or 40%-60%. Such total effective porosity of the electrode layer with channels is no less than the porosity of the electrode material. The tortuosity of the electrode layer with channels is no greater than the native tortuosity of the electrode material.

In preferred embodiments, the gas channels span the height of the electrode layer. The gas channels may occupy a height that is less than that of the electrode layer. As an example, the electrode layer is about 50 microns thick. In an embodiment, the gas channel width is no less than 10 microns. In an embodiment, the gas channel width is no less than 100 microns.

Also discussed herein is a method comprising (a) printing a first template and a first electrode material to form a first electrode layer, wherein the first template is in contact with the first electrode material; (b) printing an electrolyte layer; (c) printing a second template and a second electrode material to form a second electrode layer, wherein the second template is in contact with the second electrode material; and (d) printing an interconnect. In a preferred embodiment, the steps are performed in any sequence. In a preferred embodiment, the method comprises repeating steps (a)-(d) in any sequence to form a stack or a repeat unit of a stack.

In an embodiment, the method comprises (e) removing at least a portion of the first template and of the second template to form channels in the first and second electrode layers. In an embodiment, the removing comprises heating, combustion, solvent treatment, oxidation, reduction, or combinations thereof. In an embodiment, the removing takes place in situ. Removing may take place after a stack or a repeat unit of a stack is printed. Removing may take place when a stack is initiated to operate. In an embodiment, the printing takes place slice by slice and a second slice is printed atop a first slice before the first slice is heated, wherein the heating removes at least a portion of the template. The printing step comprises material jetting, binder jetting, inkjet printing, aerosol jetting, or aerosol jet printing, or combinations thereof.

Further discussed herein is a method comprising (a) printing a first electrode layer; (b) printing an electrolyte layer; (c) printing a second electrode layer; and (d) printing an interconnect. In an embodiment, the printing comprises material jetting, binder jetting, inkjet printing, aerosol jetting, or aerosol jet printing. In a preferred embodiment, the steps are performed in any sequence. In a preferred embodiment, the method comprises repeating steps (a)-(d) in any sequence to form a stack or a repeat unit of a stack. Also disclosed herein is a method comprising aerosol jetting or aerosol jet printing an electrode layer, or an electrolyte layer, or an interconnect, or combinations thereof.

Figure 13B:
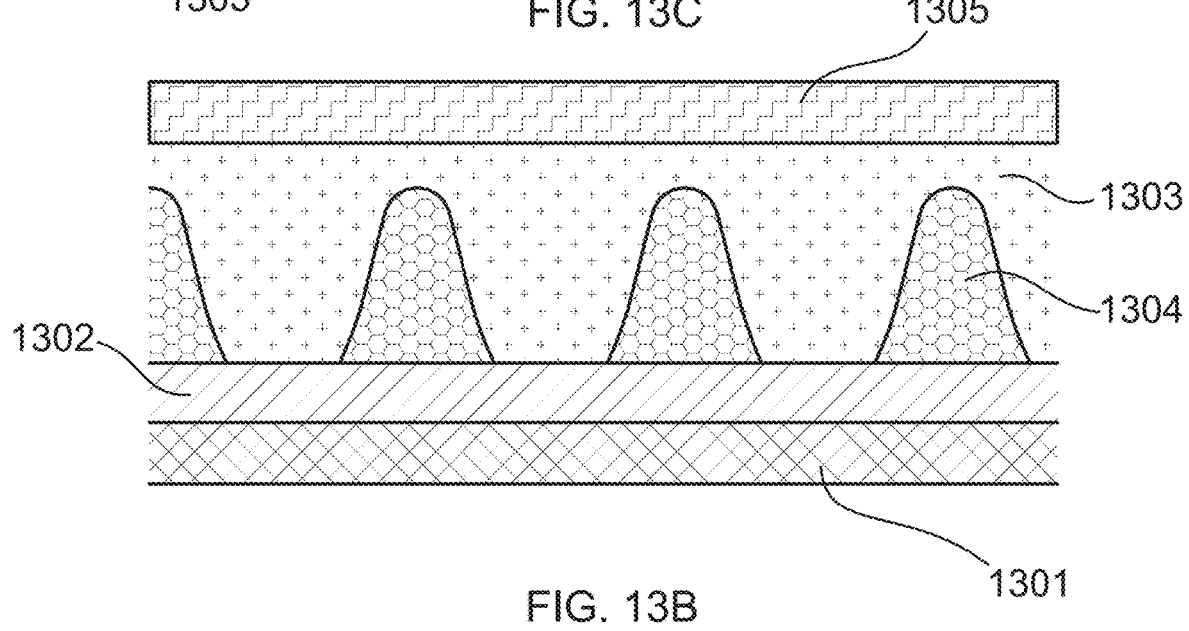
FIG. 13B is a cross-sectional view of a half cell between a first interconnect and an electrolyte, according to an embodiment of the disclosure.
Figures 13D, 13E:
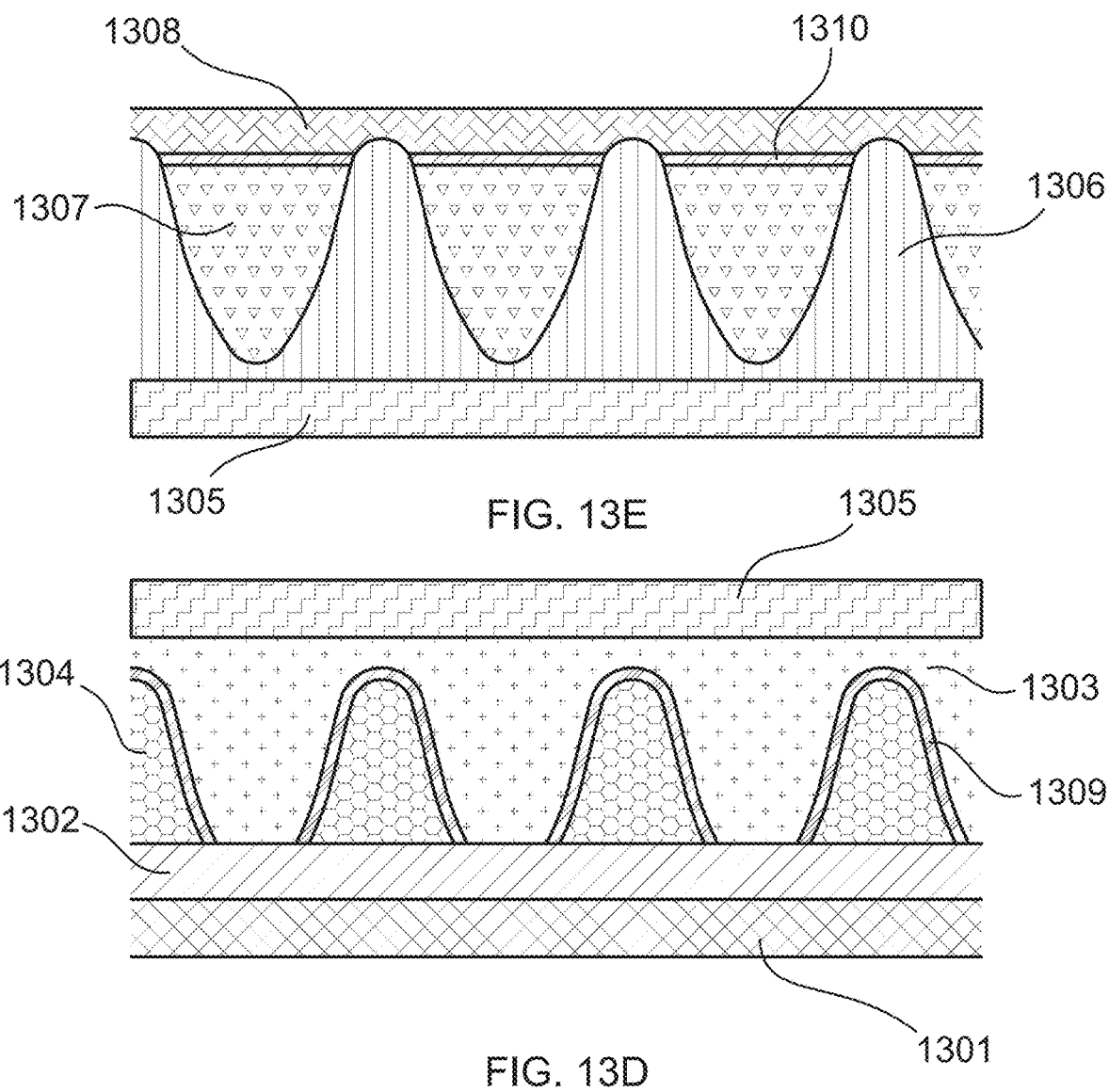
FIG. 13D is a cross-sectional view of a half cell between a first interconnect and an electrolyte, according to an embodiment of the disclosure.
FIG. 13E is a cross-sectional view of a half cell between a second interconnect and an electrolyte, according to an embodiment of the disclosure.

FIG. 13B is a cross-sectional view of a half cell between a first interconnect and an electrolyte, according to an embodiment of the disclosure. The stack in FIG. 13B comprises a bottom/first interconnect 1301, an optional layer that contains the bottom interconnect material and first electrode material 1302, first electrode segments 1303, first filler materials that form a first template 1304 and electrolyte 1305.

FIG. 13C is a cross-sectional view of a half cell between a second interconnect and an electrolyte, according to an embodiment of the disclosure. The half cell comprises an electrolyte 1305, second electrode segments 1306, filler materials that forms a second template 1307 and a top/second interconnect 1308. The views shown in FIG. 13B and FIG. 13C are perpendicular to one another.

FIG. 13D is a cross-sectional view of a half cell between a first interconnect and an electrolyte, according to an embodiment of the disclosure. The half cell comprises a bottom interconnect 1301, an optional layer that contains the bottom interconnect material and first electrode material 1302, first electrode segments 1303, first filler materials that forms a first template 1304, electrolyte 1305 and optional shields 1409 for the first filler materials when the first electrode is heated and/or sintered.

FIG. 13E is a cross-sectional view of a half cell between a second interconnect and an electrolyte, according to an embodiment of the disclosure. The half cell comprises an electrolyte 1305, second electrode segments 1306, filler materials that forms a second template 1307, top interconnect 1308 and optional shields for the second filler materials when the top interconnect is heated and/or sintered. The views shown in FIG. 13D and FIG. 13E are perpendicular to one another.

In some embodiments, there is a layer between 1307 and 1308 (not shown) that contains the top interconnect material and second electrode material. In some embodiments, 1305 represents an electrolyte with a barrier for the first electrode or for second electrode. 1309 represents optional shields for the first fillers when the first electrode is heated/sintered. 1310 represents optional shields for the second fillers when the top interconnect is heated/sintered. In some instances, electrolyte 1305 or electrolyte-barrier layer is in contact with the first electrode and the second electrode continuously along its opposing major faces. The shapes of the electrode segments and the fillers in these cross-sectional views are only representative and not exact. They may take on any regular or irregular shapes. The fillers and/or templates are removed when the electrochemical reactor is made (e.g., a fuel cell stack or a gas producer), for example, via heating in a furnace. Or alternatively, they are removed when the electrochemical reactor is initiated into operation via hot gas/fluid passing through, using the effects of oxidation, melting, vaporization, gasification, reduction, or combinations thereof. These removed fillers and/or templates become channels in the electrodes. In various embodiments, multiple tiers of channels are present in an electrode. For an illustrative example, an electrode is 25 microns thick with a multiplicity of channels having a height of 20 microns. For another illustrative example, an electrode is 50 microns thick with a multiplicity of channels in 2 tiers, each tier of channels having a height of 20 microns. In various embodiments, the fillers comprise carbon, graphite, graphene, cellulose, metal oxides, polymethyl methacrylate, nano diamonds, or combinations thereof.

In an embodiment, a unit in an electrochemical reactor comprising an interconnect, a first electrode, an electrolyte, and a second electrode is made via this method: providing the interconnect, depositing a first electrode material in segments on the interconnect, sintering the first electrode material, depositing a first filler material between the first electrode material segments, depositing additional first electrode material to cover the filler material, sintering the additional first electrode material and forming the first electrode, depositing an electrolyte material on the first electrode, sintering the electrolyte material to form the electrolyte, depositing a second electrode material on the electrolyte such that a multiplicity of valleys are formed in the second electrode material, sintering the second electrode material to form the second electrode, depositing a second filler material in the valleys of the second electrode, depositing a second interconnect material to cover the second electrode and the second filler material, and sintering the second interconnect material. In various embodiments, deposition is performed using inkjet printing or ultrasonic inkjet printing. In various embodiments, sintering is performed using electromagnetic radiation (EMR). In some cases, the first and second filler materials absorb little to no EMR; the absorption is so minimal that the filler materials have no measurable change. In some cases, shields are deposited to cover the first filler material or the second filler material or both so that the heating and/or sintering process for the layer on top does not cause measurable change in the first filler material or the second filler material or both. In some cases, the shields comprise YSZ, SDC, SSZ, CGO, NiO-YSZ, Cu, CuO, $Cu_2O$, LSM, LSCF, lanthanum chromite, stainless steel, LSGM, or combinations thereof.

Dual Porosity Electrodes

FIGS. 14A-D illustrates various embodiments of electrodes having dual porosities with one, two or three layers shown in detail that may be used in electrochemical reactors such as EC gas producers. FIG. 14A schematically illustrates segments of fluid dispersing components in a first layer, according to an embodiment of the disclosure. First layer 1400 comprises fluid dispersing component segments 1402. Segments 1402 may have different compositions, shapes, densities, porosities, pore sizes, pore shapes, permeabilities, or combinations thereof. Volume fraction of channels (VFc) relative to layer 1400 containing the channels is also shown. Herein discussed is an electrode in an EC reactor comprising a material and channels, wherein the material and channels form a first layer in the electrode having a first layer porosity. The material has a material porosity. The channels have a volume fraction VFc, which is the ratio between the volume of the channels and the volume of the first layer. The first layer porosity refers to the average porosity of the first layer as a whole. The first layer porosity is at least 5% greater than the material porosity. The VFc is in the range of 0-99%, or 1-30%, or 10-90%, or 5-50%, or 3-30%, or 1-50%. The VFc is no less than 5%, or 10%, or 20%, or 30%, or 40%, or 50%.

FIG. 14B schematically illustrates fluid dispersing components in a first layer along with a second layer in an electrode, according to an embodiment of the disclosure. Electrode embodiment in FIG. 14B shows a first layer 1404 of fluid dispersing component segments 1405 and a second layer 1406. The segments, as shown in FIG. 14B, may have different compositions, shapes, densities, porosities, pore sizes, pore shapes, permeabilities, or combinations thereof. The electrode comprises a second layer wherein the second layer has a second layer porosity. The second layer porosity refers to the average porosity of the second layer as a whole. In an embodiment, said second layer porosity is no greater than the first layer porosity or the second layer porosity is no less than the first layer porosity. The second layer 1406 may comprise the same material as in the first layer. The second layer 1406 may also comprise variabilities in compositions, shapes, densities, porosities, pore sizes, pore shapes, permeabilities, or combinations thereof in the lateral direction or perpendicular to the lateral direction.

FIG. 14D schematically illustrates fluid dispersing components in a first layer 1408 along with a second layer 1412, according to an embodiment of the disclosure. The electrode embodiment in FIG. 14D is similar to the embodiment in FIG. 14B. The electrode in FIG. 14D comprises a first layer 1408 further comprising fluid dispersing component segments 1410, wherein segments 1410 may have different compositions, shapes, densities, porosities, pore sizes, pore shapes, permeabilities, or combinations thereof. The second layer 1412 may comprise the same material as in the first layer. The second layer 1412 may also comprise variabilities in compositions, shapes, densities, porosities, pore sizes, pore shapes, permeabilities, or combinations thereof in the lateral direction or perpendicular to the lateral direction.

FIG. 14C schematically illustrates fluid dispersing components in a first layer along with a second and third layer, according to an embodiment of the disclosure. Electrode embodiment in FIG. 14C comprises a first layer 1414, second layer 1416 and a third layer 1418. In an embodiment, the second layer and the third layer are on two sides of the first layer. In an embodiment, the second layer and the third layer are in continuous contact with two sides of the first layer. First layer 1414 may comprises segments 1420 that have different compositions, shapes, densities, porosities, pore sizes, pore shapes, permeabilities, or combinations thereof. The second layer or the third layer may comprise the same material as in the first layer. The second layer or the third layer may also comprise variabilities in compositions, shapes, densities, porosities, pore sizes, pore shapes, permeabilities, or combinations thereof in the lateral direction or perpendicular to the lateral direction.

In an embodiment, the material porosity of the first, second or third layer is in the range of 20-60%, in the range of 30-50%, in the range of 30-40% or in the range of 25-35%. In an embodiment, the material porosity is no less than 25%, or 35%, or 45%.

In an embodiment, the electrode has a thickness of no greater than 10 cm, or 5 cm, or 1 cm. In an embodiment, the electrode has a thickness of no greater than 8 mm, or 5 mm, or 1 mm. In an embodiment, the electrode has a thickness of no greater than 100 microns, or 80 microns, or 60 microns.

In an embodiment, contribution to the permeability of the first layer from the channels is greater than contribution to the permeability of the first layer from the material. In an embodiment, no less than 50%, or 70%, or 90% of the permeability of the first layer is due to the permeability of the channels. In an embodiment, permeability of the material in the first layer is no greater than 50%, or no greater than 10%, or no greater than 1%, or no greater than 0.001% of the permeability of the channels in the first layer.

Herein disclosed is a method of making an electrically conductive component (ECC) of an electrochemical reactor (e.g., a fuel cell) comprising: (a) depositing on a substrate a first composition comprising a first pore former with a first pore former volume fraction VFp1; (b) depositing on the substrate a second composition comprising a second pore former with a second pore former volume fraction VFp2, wherein said first composition and second composition form a first layer in the ECC; and (c) heating the first layer such that the first pore former and the second pore former become empty spaces. In an embodiment, said VFp1 is in the range of 0-100%, or 10-90%, or 30-70%, or 50-100%, or 90-100%. In an embodiment, the VFp2 is in the range of 0-100%, or 0-70%, or 25-75%, or 30-60%. In an embodiment, the heating comprises reduction reactions or oxidation reactions, or both reduction and oxidation reactions.

Figure 15:
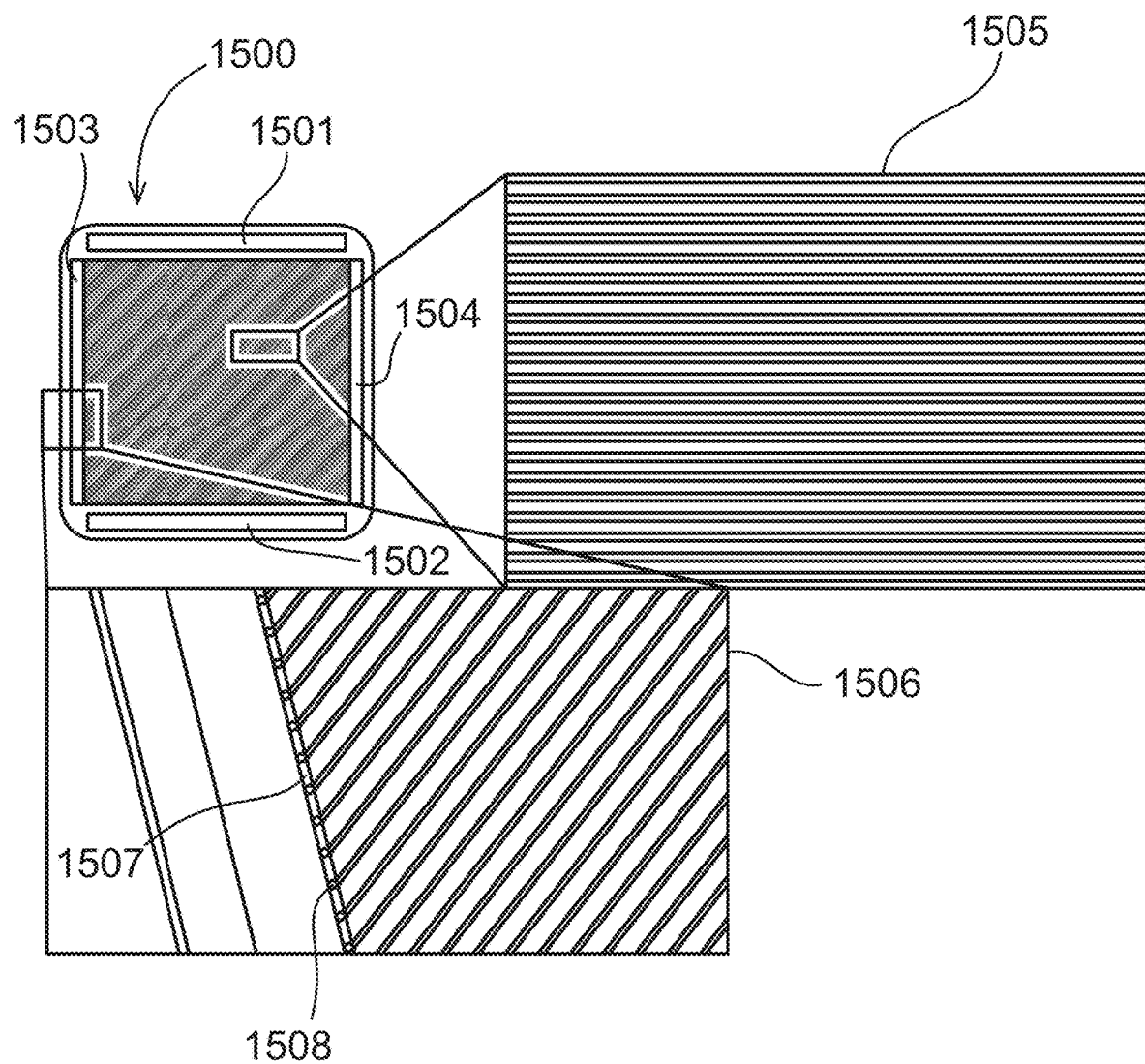
FIG. 15 is an illustrative example of an electrode having dual porosities, according to an embodiment of the disclosure.

FIG. 15 is an illustrative example of an electrode having dual porosities, according to an embodiment of the disclosure. FIG. 15 shows EC component 1500 comprising a channeled electrode having dual porosities. Device 1500 comprises an anode gas inlet 1501, an anode gas outlet 1502, a cathode gas inlet 1503, and a cathode gas outlet 1504. Exploded view 1505 is a view of a portion of a cathode layer. View 1506 is a closer view of the cathode wherein view 1506 represents a slice through the cathode layer that is composed of cathode 1507. Cathode 1507 is a porous cathode that is formed using micro pore formers. Channels 1508 represents channels formed from macro pore formers.

In an embodiment, (a) and (b) are accomplished via printing, or via extrusion, or via additive manufacturing (AM), or via tape casting, or via spraying, or via deposition, or via sputtering, or via screen printing. In an embodiment, said additive manufacturing comprises extrusion, photopolymerization, powder bed fusion, material jetting, binder jetting, directed energy deposition, lamination.

In an embodiment, the first pore former and the second pore former are the same. In an embodiment, the first pore former and the second pore former are different. In an embodiment, said first pore former or second pore former has an average diameter in the range of 10 nm to 1 mm or 100 nm to 100 microns or 500 nanometers to 50 microns. In an embodiment, said first pore former or second pore former has a size distribution. In an embodiment, said first pore former or second pore former comprises carbon, graphite, polymethyl methacrylate (PMMA), cellulose, metal oxides, or combinations thereof.

In an embodiment, the method comprises repeating (a) and (b) to form a second layer in the ECC; and heating the second layer. In an embodiment, heating the second layer takes places at the same time as heating the first layer. In an embodiment, heating the second layer takes places at a different time as heating the first layer. In an embodiment, heating the second layer and heating the first layer have at least a portion of overlapping time period. In an embodiment, the method comprises repeating (a) and (b) to form a third layer in the ECC; and heating the third layer. In an embodiment, the second layer and the third layer are on two sides of the first layer. In an embodiment, heating the first, second, and third layers is simultaneous. Alternatively, the first, second, and third layers are heated at different times. In an embodiment, heating of the first, second, and third layers has overlapping time periods. In an embodiment, the first, second, or third layer is heated more than once.

In an embodiment, at least a portion of the empty spaces caused by the second pore former or the first pore former or both become channels in the first layer. In an embodiment, the channels have a volume fraction VFc, which is the ratio between the volume of the channels and the volume of the first layer. In an embodiment, said VFc is in the range of 0-99% or 1-30% or 10-90% or 5-50% or 3-30% or 1-50%. In an embodiment, said VFc is no less than 5% or 10% or 20% or 30% or 40% or 50%.

In an embodiment, VFp1 is different from VFp2. In an embodiment, said first layer has dual porosities, a material porosity and a layer porosity. In an embodiment, the material porosity is in the range of 20-60%, or 30-50%, or 30-40%, or 25-35%. In an embodiment, the material porosity is no less than 25% or 35% or 45%.

In an embodiment, the ECC has a thickness of no greater than 10 cm or 5 cm or 1 cm. In an embodiment, the ECC a thickness of no greater than 8 mm or 5 mm or 1 mm. In an embodiment, the ECC has a thickness of no greater than 100 microns or 80 microns or 60 microns.

In an embodiment, the first layer comprises channels and material after (c), wherein contribution to the permeability of the first layer from the channels is greater than contribution to the permeability of the first layer from the material. In an embodiment, no less than 50% or 70% or 90% of the permeability of the first layer is due to the permeability of the channels. In an embodiment, permeability of the material in the first layer is no greater than 50% or no greater than 10% or no greater than 1% or no greater than 0.001% of the permeability of the channels in the first layer.

Herein discussed is a method comprising: (a) providing a first material to an additive manufacturing machine (AMM); (b) providing a second material to the AMM; (c) mixing the first material and the second material into a mixture; and (d) forming said mixture into a part. In an embodiment, said first material or second material is a gas, or liquid, or solid, or gel.

In an embodiment, said additive manufacturing comprises extrusion, photopolymerization, powder bed fusion, material jetting, binder jetting, directed energy deposition, lamination. In an embodiment, said AM comprises direct metal laser sintering (DMLS), selective laser sintering (SLS), selective laser melting (SLM), directed energy deposition (DED), laser metal deposition (LMD), electron beam (EBAM), or metal binder jetting. In an embodiment, steps (c) and (d) take place continuously.

In an embodiment, step (c) comprises varying the ratio of the first material and the second material in the mixture. In an embodiment, the ratio of the first material and the second material in the mixture is varied in situ. In an embodiment, the ratio of the first material and the second material in the mixture is varied in real time. In an embodiment, the ratio of the first material and the second material in the mixture is varied continuously. In an embodiment, the ratio of the first material and the second material in the mixture is varied according to a composition profile. In an embodiment, the ratio of the first material and the second material in the mixture is varied according to a manual algorithm, a computational algorithm, or a combination thereof. In an embodiment, the ratio of the first material and the second material in the mixture is varied by controlling material flow rates or pumping rates.

In an embodiment, step (d) comprises placing said mixture in a pattern on a substrate. In an embodiment, step (d) comprises placing said mixture according to pre-defined specifications.

In an embodiment, the formed part has varying properties. In an embodiment, the properties comprise strength, weight, density, electrical performance, electrochemical performance, or combinations thereof. In various embodiments, the formed part possesses superior properties, such as strength, density, weight, electrical performance, or electrochemical performance, or combinations thereof, when compared with a similar part formed by a different process.

In an embodiment, step (d) comprises depositing said mixture on a substrate. In an embodiment, mixing takes place prior to deposition, during deposition, or after deposition. In an embodiment, mixing takes place in the AMM or in the air or on the substrate. In an embodiment, mixing takes place via advection, dispersion, diffusion, melting, fusion, pumping, stirring, heating, or combinations thereof.

Herein disclosed is an additive manufacturing machine (AMM) comprising: (a) a first material source; (b) a second material source; and (c) a mixer configured to mix the first material and the second material into a mixture; wherein said AMM is configured to form said mixture into a part. In an embodiment, said first material or second material is a gas, or liquid, or solid, or gel.

In an embodiment, said AMM is configured to perform extrusion, photopolymerization, powder bed fusion, material jetting, binder jetting, directed energy deposition, or lamination. In an embodiment, said AMM is configured to perform direct metal laser sintering (DMLS), selective laser sintering (SLS), selective laser melting (SLM), directed energy deposition (DED), laser metal deposition (LMD), electron beam (EBAM), or metal binder jetting.

In an embodiment, said mixer is configured to mix the first material and the second material continuously while the AMM forms said mixture into a part. In an embodiment, said mixer is configured to vary the ratio of the first material and the second material in the mixture. In an embodiment, said mixer is configured to vary the ratio of the first material and the second material in the mixture in situ. The mixer may be configured to vary the ratio of the first material and the second material in the mixture in real time. In an embodiment, the mixer can be configured to vary the ratio of the first material and the second material in the mixture continuously. In an embodiment, the mixer is configured to vary the ratio of the first material and the second material in the mixture according to a composition profile. In an embodiment, the mixer is configured to vary the ratio of the first material and the second material in the mixture according to a manual algorithm, a computational algorithm, or a combination thereof. In an embodiment, said mixer is configured to vary the ratio of the first material and the second material in the mixture by controlling material flow rates or pumping rates.

In an embodiment, said AMM is configured to place said mixture in a pattern on a substrate. In an embodiment, said AMM is configured to place said mixture according to pre-defined specifications.

In an embodiment, the formed part has varying properties. In an embodiment, the properties comprise strength, weight, density, electrical performance, electrochemical performance, or combinations thereof. In various embodiments, the formed part possesses superior properties, such as strength, density, weight, electrical performance, or electrochemical performance, or combinations thereof, when compared with a similar part formed using a different apparatus.

In an embodiment, the AMM is configured to deposit said mixture on a substrate. In an embodiment, mixing takes place prior to deposition, during deposition, or after deposition. In an embodiment, mixing takes place in the AMM or in the air or on the substrate. In an embodiment, mixing takes place via advection, dispersion, diffusion, melting, fusion, pumping, stirring, heating, or combinations thereof.

Integrated Deposition and Heating

Disclosed herein is a method comprising depositing a composition on a substrate slice by slice (this may also be described as line-by-line deposition) to form an object; heating in situ the object using electromagnetic radiation (EMR); wherein said composition comprises a first material and a second material, wherein the second material has a higher absorbance of EMR than the first material. In various embodiments, heating may cause an effect comprising drying, curing, sintering, annealing, sealing, alloying, evaporating, restructuring, foaming or combinations thereof. In some embodiments, the EMR has a peak wavelength ranging from 10 to 1500 nm and a minimum energy density of 0.1 Joule/cm$^2$ wherein the peak wavelength is on the basis of irradiance with respect to wavelength. In some embodiments, the EMR comprises one or more of UV light, near ultraviolet light, near infrared light, infrared light, visible light, laser or electron beam.

Figure 16:
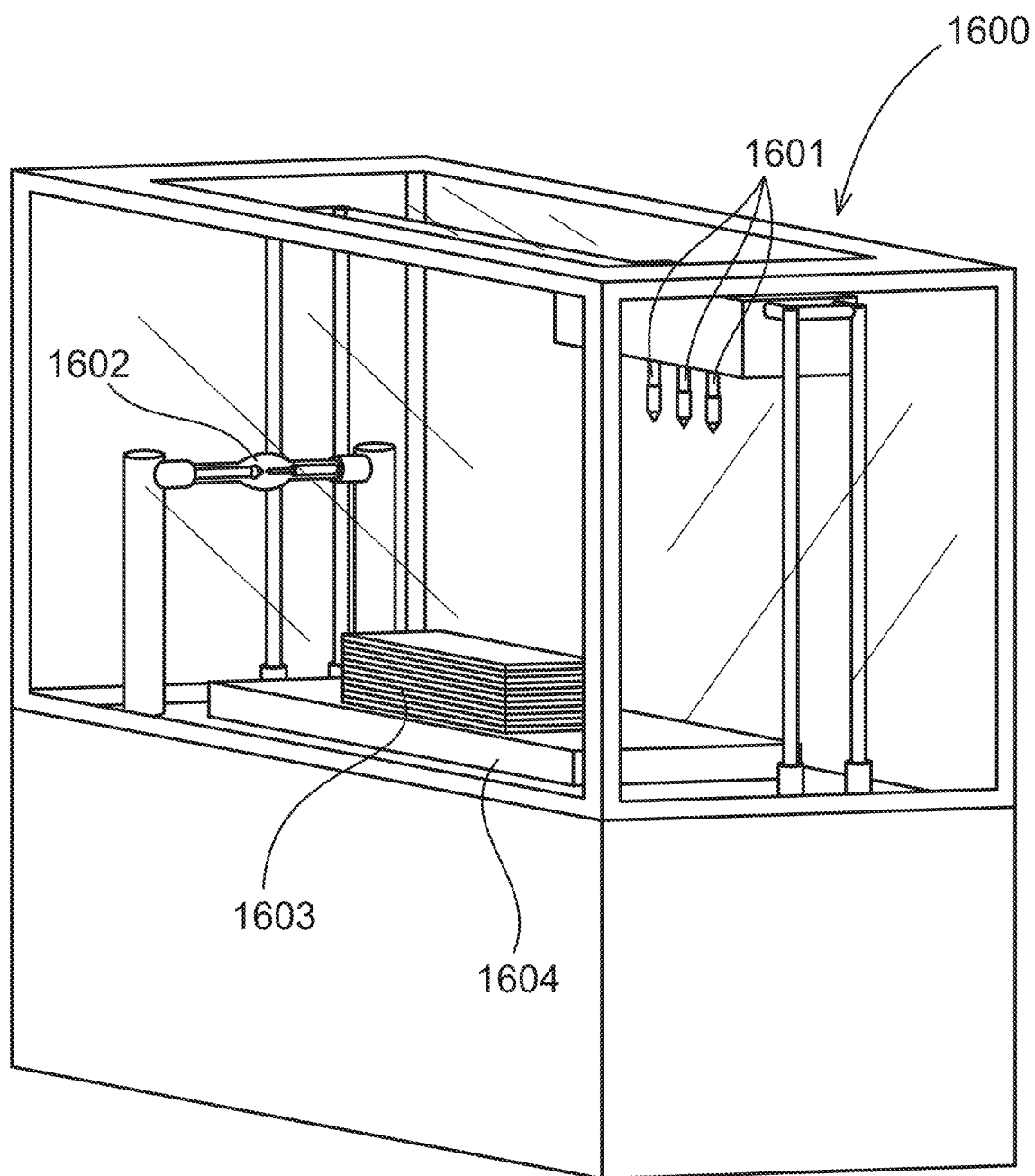
FIG. 16 illustrates a system for integrated deposition and heating using electromagnetic radiation (EMR), according to an embodiment of the disclosure.

FIG. 16 illustrates a system for integrated deposition and heating using electromagnetic radiation (EMR), according to an embodiment of the disclosure. The system 1600 may be used to assemble an electrochemical reactor such as a fuel cell or EC gas producer. FIG. 16 further illustrates system 1600 an object 1603 on a receiver 1604 formed by deposition nozzles 1601 and EMR 1602 for heating in situ, according to an embodiment of this disclosure. Receiver 1604 may be a platform that moves and may further receive deposition, heat, irradiation, or combinations thereof. Receiver 1604 may also be referred to as a chamber wherein the chamber may be completely enclosed, partially enclosed or completely open to the atmosphere.

In some embodiments, the first material comprises yttria-stabilized zirconia (YSZ), 8YSZ (8 mol % YSZ powder), yttrium, zirconium, gadolinia-doped ceria (GDC or CGO), samaria-doped ceria (SDC), scandia-stabilized zirconia (SSZ), lanthanum strontium manganite (LSM), lanthanum strontium cobalt ferrite (LSCF), lanthanum strontium cobaltite (LSC), lanthanum strontium gallium magnesium oxide (LSGM), nickel, NiO, NiO-YSZ, Cu-CGO, $Cu_2O$, CuO, cerium, copper, silver, crofer, steel, lanthanum chromite, doped lanthanum chromite, ferritic steel, stainless steel or combinations thereof. In other embodiments, the first material comprises YSZ, SSZ, CGO, SDC, NiO-YSZ, LSM-YSZ, CGO-LSCF, doped lanthanum chromite, stainless steel or combinations thereof. In some embodiments, the second material comprises carbon, nickel oxide, nickel, silver, copper, CGO, SDC, NiO-YSZ, NiO-SSZ, LSCF, LSM, doped lanthanum chromite ferritic steels or combinations thereof. The first material may comprise any electrode material previously disclosed herein.

In some embodiments, object 1603 comprises a catalyst, a catalyst support, a catalyst composite, an anode, a cathode, an electrolyte, an electrode, an interconnect, a seal, a fuel cell, an electrochemical gas producer, an electrolyser, an electrochemical compressor, a reactor, a heat exchanger, a vessel or combinations thereof.

In some embodiments, the second material may be deposited in the same slice as the first material. In other embodiments, the second material may be deposited in a slice adjacent another slice that contains the first material. In some embodiments, said heating may remove at least a portion of the second material. In preferred embodiments, said heating leaves minimal residue of the second material such that there is no significant residue that would interfere with the subsequent steps in the process or the operation of the device being constructed. More preferably, this leaves no measurable reside of the portion of the second material.

In some embodiments, the second material may add thermal energy to the first material during heating. In other embodiments, the second material has a radiation absorbance that is at least 5 times that of the first material; the second material has a radiation absorbance that is at least 10 times that of the first material; the second material has a radiation absorbance that is at least 50 times that of the first material or the second material has a radiation absorbance that is at least 100 times that of the first material.

In some embodiments, the second material may have a peak absorbance wavelength no less than 200 nm, or 250 nm, or 300 nm, or 400 nm, or 500 nm. In other embodiments, the first material has a peak absorbance wavelength no greater than 700 nm, or 600 nm, or 500 nm, or 400 nm, or 300 nm. In other embodiments, the EMR has a peak wavelength no less than 200 nm, or 250 nm, or 300 nm, or 400 nm, or 500 nm.

In some embodiments, the second material may comprise carbon, nickel oxide, nickel, silver, copper, CGO, NiO-YSZ, LSCF, LSM, ferritic steels, other metal oxides or combinations thereof. In some cases, the ferritic steel is Crofer 22 APU. In some embodiments, the first material comprises YSZ, CGO, NiO-YSZ, LSM-YSZ, other metal oxides or combinations thereof. In an embodiment, the second material comprises LSCF, LSM, carbon, nickel oxide, nickel, silver, copper, or steel. In some embodiments, carbon comprises graphite, graphene, carbon nanoparticles, nano diamonds or combinations thereof. The second material may comprise any electrode material previously disclosed herein.

In some embodiments, the deposition method comprises material jetting, binder jetting, inkjet printing, aerosol jetting, aerosol jet printing, vat photopolymerization, powder bed fusion, material extrusion, directed energy deposition, sheet lamination, ultrasonic inkjet printing or combinations thereof.

In some embodiments, the deposition method further comprises one or more of the steps of controlling distance from the EMR to the receiver, EMR energy density, EMR spectrum, EMR voltage, EMR exposure duration, EMR exposure area, EMR exposure volume, EMR burst frequency, EMR exposure repetition number. In an embodiment, the object does not change location between the deposition and heating steps. In an embodiment, the EMR has a power output of no less than 1 W, or 10 W, or 100 W, or 1000 W.

Also disclosed herein is a system comprising at least one deposition nozzle, an electromagnetic radiation (EMR) source and a deposition receiver, wherein the deposition receiver is configured to receive EMR exposure and deposition at the same location. In some cases, the receiver is configured such that it receives deposition for a first time period, moves to a different location in the system to receive EMR exposure for a second time period.

The following detailed description describes the production of solid oxide fuel cells (SOFCs) for illustrative purposes. As one in the art recognizes, the methodology and the manufacturing processes are applicable to all fuel cell types. As such, the production of all fuel cell types is within the scope of this disclosure.

Additive Manufacturing

Additive manufacturing (AM) refers to a group of techniques that join materials to make objects, usually slice by slice or layer upon layer. AM is contrasted to subtractive manufacturing methodologies, which involve removing sections of a material by machining, cutting, grinding or etching away. AM may also be referred to as additive fabrication, additive processes, additive techniques, additive layer manufacturing, layer manufacturing or freeform fabrication. Some examples of AM are extrusion, photopolymerization, powder bed fusion, material jetting, binder jetting, directed energy deposition, lamination, direct metal laser sintering (DMLS), selective laser sintering (SLS), selective laser melting (SLM), directed energy deposition (DED), laser metal deposition (LMD), electron beam (EBAM) and metal binder jetting. A 3D printer is a type of AM machine (AMM). An inkjet printer or ultrasonic inkjet printer are additional examples of AMMs.

In a first aspect, the invention is a method of making an electrochemical reactor such as a EC gas producer or a fuel cell comprising: (a) producing an anode using an AMM; (b) creating an electrolyte using the AMM; and (c) making a cathode using the AMM. In preferred embodiments, the anode, the electrolyte and the cathode are assembled into a fuel cell utilizing an AMM in addition to other steps that are not completed using an AMM. In a preferred embodiment, the fuel cell is formed using only the AMM. In other embodiments, steps (a), (b), and (c) exclude tape casting and screen printing. In an embodiment, the method of assembling a fuel cell with an AMM excludes compression in assembling. In other embodiments, the layers are deposited one on top of another in a step-wise manner such that assembling is accomplished at the same time as deposition. The methods described herein are useful in making planar fuel cells. The methods described herein are also useful in making fuel cell, wherein electrical current flow is perpendicular to the electrolyte in the lateral direction when the fuel cell is in use.

In an embodiment, the interconnect, the anode, the electrolyte, and the cathode are formed layer on layer, for example, printed layer on layer. It is important to note that, within the scope of the invention, the order of forming these layers can be varied. In other words, either the anode or the cathode can be formed before the other. Naturally, the electrolyte is formed so that it is between the anode and the cathode. Barrier layer(s), catalyst layer(s) and interconnect(s) are formed so as to lie in the appropriate position within the fuel cell to perform their functions.

In some embodiments, each of the interconnect, the anode, the electrolyte and the cathode have six faces. In preferred embodiments, the anode is printed on the interconnect and is in contact with the interconnect; the electrolyte is printed on the anode and is in contact with the anode; the cathode is printed on the electrolyte and is in contact with the electrolyte. Each print may be sintered, for example, using EMR. As such, the assembly process and the forming process are simultaneous, which is not possible with conventional methods. Moreover, with the preferred embodiment, the needed electrical contact and gas tightness are also achieved at the same time. In contrast, conventional fuel cell assembly processes accomplish this via pressing or compression of the fuel cell components or layers. The pressing and compression processes can cause cracks in the fuel cell layers that are undesirable.

In some embodiments, the AM method comprises making at least one barrier layer using the AMM. In preferred embodiments, the at least one barrier layer may be located between the electrolyte and the cathode or between the electrolyte and the anode or both. In other embodiments, the at least one barrier layer may be assembled with the anode, the electrolyte and the cathode using the AMM. In some embodiments, no barrier layer is needed or utilized in the fuel cell.

In some embodiments, the AM method comprises making an interconnect using the AMM. In other embodiments, the interconnect may be assembled with the anode, the electrolyte and the cathode using the AMM. In some embodiments, the AMM forms a catalyst and incorporates said catalyst into the fuel cell.

In some embodiments, the anode, the electrolyte, the cathode and the interconnect are made at a temperature above 100° C. In some embodiment, the AM method comprises heating the fuel cell, wherein said fuel cell comprises the anode, the electrolyte, the cathode, the interconnect and optionally at least one barrier layer. In some embodiments, the fuel cell comprises a catalyst. In some embodiments, the method comprises heating the fuel cell to a temperature above 500° C. In some embodiments, the fuel cell is heated using one or both of EMR or oven curing.

In a preferred embodiment, the AMM utilizes a multi-nozzle additive manufacturing method. In a preferred embodiment, the multi-nozzle additive manufacturing method comprises nanoparticle jetting. In some embodiments, a first nozzle delivers a first material, a second nozzle delivers a second material, a third nozzle delivers a third material. In some embodiments, particles of a fourth material are placed in contact with a partially constructed fuel cell and bonded to the partially constructed fuel cell using a laser, photoelectric effect, light, heat, polymerization or binding. In an embodiment, the anode, the cathode or the electrolyte comprises a first, second, third or fourth material. In preferred embodiments, the AMM performs multiple AM techniques. In various embodiments, the AM techniques comprise one or more of extrusion, photopolymerization, powder bed fusion, material jetting, binder jetting, directed energy deposition or lamination. In various embodiments, AM is a deposition technique comprising material jetting, binder jetting, inkjet printing, aerosol jetting, or aerosol jet printing, vat photopolymerization, powder bed fusion, material extrusion, directed energy deposition, sheet lamination, ultrasonic inkjet printing or combinations thereof.

Further described herein is an AM method of making a fuel cell stack comprising: (a) producing an anode using an additive manufacturing machine (AMM); (b) creating an electrolyte using the AMM; (c) making a cathode using the AMM; (d) making an interconnect using the AMM; wherein the anode, the electrolyte, the cathode, and the interconnect form a first fuel cell; (e) repeating steps (a)-(d) to make a second fuel cell; and (f) assembling the first fuel cell and the second fuel cell into a fuel cell stack.

In some embodiments, the first fuel cell and the second fuel cell are formed from the anode, the electrolyte, the cathode and the interconnect utilizing the AMM. In an embodiment, the fuel cell stack is formed using only the AMM. In other embodiments, steps (a)-(f) exclude one or both of tape casting and screen printing.

In some embodiments, the AM method comprises making at least one barrier layer using the AMM. In some embodiments, the at least one barrier layer is located between the electrolyte and the cathode or between the electrolyte and the anode or both for the first fuel cell and the second fuel cell.

In some embodiments, steps (a)-(d) are performed at a temperature above 100° C. In other embodiments, steps (a)-(d) are performed at a temperature in the range of 100° C. to 500° C. In some embodiments, the AMM makes a catalyst and incorporates said catalyst into the fuel cell stack.

In some embodiments, the AM method comprises heating the fuel cell stack. In an embodiment, the AM method comprises heating the fuel cell stack to a temperature above 500° C. In some embodiments, the fuel cell stack is heated using EMR and/or oven curing. In some embodiments, the laser has a laser beam, wherein the laser beam is expanded to create a heating zone with uniform power density. In some embodiments, the laser beam is expanded by utilizing one or more mirrors. In some embodiments, each layer of the fuel cell may be cured separately by EMR. In some embodiments, a combination of one or more fuel cell layers may be cured together by EMR. In some embodiments, the first fuel cell is EMR cured, assembled with the second fuel cell, and then the second fuel cell is EMR cured. In other embodiments, the first fuel cell is assembled with the second fuel cell, and then the first fuel cell and the second fuel cell are cured separately by EMR. In some embodiments, the first fuel cell and the second fuel cell may be cured separately by EMR, and then the first fuel cell is assembled with the second fuel cell to form a fuel cell stack. In some embodiments, the first fuel cell is assembled with the second fuel cell to form a fuel cell stack, and then the fuel cell stack may be cured by EMR.

Also discussed herein is an AM method of making a multiplicity of fuel cells comprising (a) producing a multiplicity of anodes simultaneously using an additive manufacturing machine (AMM); (b) creating a multiplicity of electrolytes using the AMM simultaneously; and (c) making a multiplicity of cathodes using the AMM simultaneously. In preferred embodiments, the anodes, the electrolytes and cathodes are assembled into fuel cells utilizing the AMM simultaneously. In other preferred embodiments, the fuel cells are formed using only the AMM.

In some embodiments, the method comprises making at least one barrier layer using the AMM for each of the multiplicity of fuel cells simultaneously. The at least one barrier layer may be located between the electrolyte and the cathode or located between the electrolyte and the anode, or both. In preferred embodiments, the at least one barrier layer may be assembled with the anode, the electrolyte and the cathode using the AMM for each fuel cell.

In some embodiments, the method comprises making an interconnect using the AMM for each of the multiplicity of fuel cells simultaneously. The interconnect may be assembled with the anode, the electrolyte and the cathode using the AMM for each fuel cell. In other embodiments, the AMM forms a catalyst for each of the multiplicity of fuel cells simultaneously and incorporates said catalyst into each of the fuel cells. In other embodiments, heating each layer or heating a combination of layers of the multiplicity of fuel cells takes place simultaneously. The multiplicity of fuel cells may include two or more fuel cells.

In preferred embodiments, the AMM uses two or more different nozzles to jet or print different materials at the same time. For a first example, in an AMM, a first nozzle deposits an anode layer for fuel cell 1, a second nozzle deposits a cathode layer for fuel cell 2 and a third nozzle deposits an electrolyte for fuel cell 3, at the same time. For a second example, in an AMM, a first nozzle deposits an anode for fuel cell 1, a second nozzle deposits a cathode for fuel cell 2, a third nozzle deposits an electrolyte for fuel cell 3 and a fourth nozzle deposits an interconnect for fuel cell 4, at the same time.

Disclosed herein is an additive manufacturing machine (AMM) comprising a chamber wherein manufacturing of fuel cells takes place. Said chamber is able to withstand temperatures of at least 100° C. In an embodiment, said chamber enables production of the fuel cells. The chamber enables heating of the fuel cells in situ as the components of the fuel cell are being deposited.

In some embodiments, the chamber may be heated by laser, electromagnetic waves/electromagnetic radiation (EMR), hot fluid or a heating element associated with the chamber, or combinations thereof. The heating element may comprise a heated surface, heating coil or a heating rod. In other embodiments, said chamber may be configured to apply pressure to the fuel cells inside. The pressure may be applied via a moving element associated with the chamber. The moving element may be a moving stamp or plunger. In some embodiments, said chamber may be configured to withstand pressure. the chamber may be configured to be pressurized or depressurized by a fluid. The fluid in the chamber may be changed or replaced when needed.

In some cases, the chamber may be enclosed. In some cases, the chamber may be sealed. In some cases, the chamber may be open to ambient atmosphere or to a controlled atmosphere. In some cases, the chamber may be a platform without top and side walls.

Referring to FIG. 16, system 1600 comprises deposition nozzles or material jetting nozzles 1601, EMR source 1602 (e.g., xenon lamp), object being formed 1603, and chamber or receiver 1604 as a part of an AMM. As illustrated in FIG. 16, the chamber or received 604 is configured to receive both deposition from nozzles and radiation from EMR source 1602. In various embodiments, deposition nozzles 1601 may be movable. In various embodiments, the chamber or receiver 1604 may be movable. In various embodiments, EMR source 1602 is movable. In various embodiments, the object comprises a catalyst, a catalyst support, a catalyst composite, an anode, a cathode, an electrolyte, an electrode, an interconnect, a seal, a fuel cell, an electrochemical gas producer, an electrolyser, an electrochemical compressor, a reactor, a heat exchanger, a vessel or combinations thereof.

AM techniques suitable for this disclosure comprise extrusion, photopolymerization, powder bed fusion, material jetting, binder jetting, directed energy deposition and lamination. In some embodiments, extrusion may be used for AM. Extrusion AM involves the spatially controlled deposition of material (e.g., thermoplastics). Extrusion AM may also be referred to as fused filament fabrication (FFF) or fused deposition modeling (FDM) in this disclosure.

In some embodiments, AM comprises photopolymerization (i.e., stereolithography (SLA)) for the process of this disclosure. SLA involves spatially-defined curing of a photoactive liquid (a "photoresin"), using a scanning laser or a high-resolution projected image, and transforming the photoactive liquid into a crosslinked solid. Photopolymerization can produces parts with details and dimensions ranging from the micrometer- to meter-scales.

In some embodiments, AM comprises powder bed fusion (PBF). PBF AM processes build objects by melting powdered feedstock, such as a polymer or metal. PBF processes begin by spreading a thin layer of powder across a build area. Cross-sections are then melted a layer at a time, most often using a laser, electron beam or intense infrared lamps. In some embodiments, PBF of metals may use selective laser melting (SLM) or electron beam melting (EBM). In other embodiments, PBF of polymers may use selective laser sintering (SLS). In various embodiments, SLS systems may print thermoplastic polymer materials, polymer composites or ceramics. In various embodiments, SLM systems may be suitable for a variety of pure metals and alloys, wherein the alloys are compatible with rapid solidification that occurs in SLM.

In some embodiments, AM may comprise material jetting. AM by material jetting may be accomplished by depositing small drops (or droplets) of material with spatial control. In various embodiments, material jetting is performed three dimensionally (3D), two dimensionally (2D) or both. In preferred embodiments, 3D jetting is accomplished layer by layer. In preferred embodiments, print preparation converts the computer-aided design (CAD), along with specifications of material composition, color, and other variables to the printing instructions for each layer. Binder jetting AM involves inkjet deposition of a liquid binder onto a powder bed. In some cases, binder jetting is combined with other AM processes, such as for example, spreading of powder to make the powder bed (analogous to SLS/SLM) and inkjet printing.

In some embodiments, AM comprises directed energy deposition (DED). Instead of using a powder bed as discussed above, the DED process uses a directed flow of powder or a wire feed, along with an energy intensive source such as laser, electric arc or electron beam. In preferred embodiments, DED is a direct-write process, wherein the location of material deposition is determined by movement of the deposition head which allows large metal structures to be built without the constraints of a powder bed.

In some embodiments, AM comprises lamination AM or laminated object manufacturing (LOM). In preferred embodiments, consecutive layers of sheet material are consecutively bonded and cut in order to form a 3D structure.

Traditional methods of manufacturing a fuel cell stack can comprise over 100 steps. These steps may include, but not limited to, milling, grinding, filtering, analyzing, mixing, binding, evaporating, aging, drying, extruding, spreading, tape casting, screen printing, stacking, heating, pressing, sintering and compressing. The methods disclosed herein describe manufacturing of a fuel cell or fuel cell stack using one AMM.

The AMM of this disclosure preferably performs both extrusion and ink jetting to manufacture a fuel cell or fuel cell stack. Extrusion may be used to manufacture thicker layers of a fuel cell, such as, the anode and/or the cathode. Ink jetting may be used to manufacture thin layers of a fuel cell. Ink jetting may be used to manufacture the electrolyte. The AMM may operate at temperature ranges sufficient to enable curing in the AMM itself. Such temperature ranges are 100° C. or above, 100-300° C. or 100-500° C.

As a preferred example, all layers of a fuel cell are formed and assembled via printing. The material for making the anode, cathode, electrolyte and the interconnect, respectively, may be made into an ink form comprising a solvent and particles (e.g., nanoparticles). There are two categories of ink formulations—aqueous inks and non-aqueous inks. In some cases, the aqueous ink comprises an aqueous solvent (e.g., water, deionized water), particles, dispersant and a surfactant. In some cases, the aqueous ink comprises an aqueous solvent, particles, dispersant, surfactant but no polymeric binder. The aqueous ink may optionally comprise a co-solvent, such as an organic miscible solvent (methanol, ethanol, isopropyl alcohol). Such co-solvents preferably have a lower boiling point than water. The dispersant may be an electrostatic dispersant, steric dispersant, ionic dispersant, or a non-ionic dispersant, or a combination thereof. The surfactant may preferably be non-ionic, such as an alcohol alkoxylate or an alcohol ethoxylate. The non-aqueous ink may comprise an organic solvent (e.g., methanol, ethanol, isopropyl alcohol, butanol) and particles.

For example, CGO powder is mixed with water to form an aqueous ink further comprising a dispersant and a surfactant but with no polymeric binder added. The CGO fraction based on mass (herein expressed as weight % (wt %)) is in the range of 10 wt % to 25 wt %. For example, CGO powder is mixed with ethanol to form a non-aqueous ink further comprising polyvinyl butaryl added with the CGO fraction in the range of 3 wt % to 30 wt %. For example, LSCF is mixed with n-butanol or ethanol to form a non-aqueous ink further comprising polyvinyl butaryl with the LSCF fraction in the range of 10 wt % to 40 wt %. For example, YSZ particles are mixed with water to form an aqueous ink further comprising a dispersant and surfactant but with no polymeric binder added. The YSZ fraction is in the range of 3 wt % to 40 wt %. For example, NiO particles are mixed with water to form an aqueous ink further comprising a dispersant and surfactant but with no polymeric binder added with the NiO fraction in the range of 5 wt % to 25 wt %.

As an example, for the cathode of a fuel cell, LSCF or LSM particles are dissolved in a solvent, wherein the solvent is water or an alcohol (e.g., butanol) or a mixture of alcohols. Organic solvents other than alcohols may also be used in other examples. As an example, LSCF is deposited (e.g., printed) into a layer. A xenon lamp may be used to irradiate the LSCF layer with EMR to sinter the LSCF particles. The xenon flash lamp may be a 10 kW unit applied at a voltage of 400V and a frequency of 10 Hz for a total exposure duration of 1000 ms.

For example, for the electrolyte, YSZ particles are mixed with a solvent, wherein the solvent is water (e.g., de-ionized water) or an alcohol (e.g., butanol) or a mixture of alcohols. Organic solvents other than alcohols may also be used in other examples. For the interconnect, metallic particles (e.g., silver nanoparticles) are dissolved in a solvent, wherein the solvent may comprise water (e.g., de-ionized water) and an organic solvent. The organic solvent may comprise mono-, di-, or tri-ethylene glycols or higher ethylene glycols, propylene glycol, 1,4-butanediol or ethers of such glycols, thiodiglycol, glycerol and ethers and esters thereof, polyglycerol, mono-, di-, and tri-ethanolamine, propanolamine, N,N-dimethylformamide, dimethyl sulfoxide, dirnethylacetamide, N-methylpyrrolidone, 1,3-dimethylimidazolidone, methanol, ethanol, isopropanol, n-propanol, diacetone alcohol, acetone, methyl ethyl ketone or propylene carbonate, or combinations thereof. For a barrier layer in a fuel cell, CGO particles are dissolved in a solvent, wherein the solvent may be water (e.g., de-ionized water) or an alcohol. The alcohol may comprise methanol, ethanol, butanol or a mixture of alcohols. Organic solvents other than alcohols may also be used. CGO may be used as barrier layer for LSCF. YSZ may also be used as a barrier layer for LSM. In some cases, for the aqueous inks where water is the solvent, no polymeric binder may be added to the aqueous inks.

The manufacturing process of a conventional fuel cell sometimes comprises more than 100 steps and utilizing dozens of machines. According to an embodiment of this disclosure, a method of making a fuel cell comprises using only one AMM to manufacture a fuel cell, wherein the fuel cell comprises an anode, electrolyte and a cathode. In preferred embodiments, the fuel cell comprises at least one barrier layer, for example, between the electrolyte and the cathode, or between the electrolyte and the cathode, or both. The at least one barrier layer is preferably also made by the same AMM. In preferred embodiments, the AMM may also produce an interconnect and assembles the interconnect with the anode, cathode, at least one barrier layer and the electrolyte. Such manufacturing methods and systems are applicable not only to making fuel cells but also for making other types of electrochemical devices. The following discussion uses fuel cells as an example, but any reactor or catalyst is within the scope of this disclosure.

In various embodiments, a single AMM makes a first fuel cell, wherein the fuel cell comprises an anode, electrolyte, cathode, at least one barrier layer and an interconnect. In various embodiments, a single AMM makes a second fuel cell. In various embodiments, a single AMM is used to assemble a first fuel cell with a second fuel cell to form a fuel cell stack. In various embodiments, the production of fuel cells using an AMM is repeated as many times as desired. A fuel cell stack comprising two or more fuel cells is thus assembled using an AMM. In some embodiments, the various layers of the fuel cell are produced by an AMM above ambient temperature. For example, the temperatures may be above 100° C., in the range of 100° C. to 500° C. or in the range of 100° C. to 300° C. In various embodiments, a fuel cell or fuel cell stack is heated after it is assembled. In some embodiments, the fuel cell or fuel cell stack is heated at a temperature above 500° C. In preferred embodiments, the fuel cell or fuel cell stack is heated at a temperature in the range of 500° C. to 1500° C.

In various embodiments, an AMM comprises a chamber where the manufacturing of fuel cells takes place. This chamber may be able to withstand high temperature to enable the production of the fuel cells wherein the high temperature is at least 300° C., at least 500° C., at least 1000° C. or at least 1500° C. In some cases, this chamber may also enable the heating of the fuel cells to take place in the chamber. Various heating methods may be applied, such as laser heating/curing, electromagnetic wave heating, hot fluid heating or one or more heating elements associated with the chamber. The heating element may be a heating surface, heating coil or a heating rod and is associated with the chamber such that the content in the chamber is heated to the desired temperature range. In various embodiments, the chamber of the AMM may also be able to apply pressure to the fuel cell(s) inside. For example, a pressure may be applied via a moving element, such as a moving stamp or plunger. In various embodiments, the chamber of the AMM is able to withstand pressure. The chamber can be pressurized or depressurized as desired by a fluid. The fluid in the chamber can also be changed or replaced as needed.

In preferred embodiments, a fuel cell or fuel cell stack is heated using EMR. In other embodiments, the fuel cell or fuel cell stack may be heated using oven curing. In other embodiments, the laser beam may be expanded (for example, by the use of one or more mirrors) to create a heating zone with uniform power density. In a preferred embodiment, each layer of the fuel cell may be cured by EMR separately. In preferred embodiments, a combination of fuel cell layers may be EMR cured separately, for example, a combination of the anode, the electrolyte, and the cathode layers. In some embodiments, a first fuel cell is EMR cured, assembled with a second fuel cell, and then the second fuel cell is EMR cured. In an embodiment, a first fuel cell is assembled with a second fuel cell, and then the first fuel cell and the second fuel cell are EMR cured separately. In an embodiment, a first fuel cell is assembled with a second fuel cell to form a fuel cell stack, and then the fuel cell stack is EMR cured. A fuel cell stack comprising two or more fuel cells may be EMR cured. The sequence of laser heating/curing and assembling is applicable to all other heating methods.

In preferred embodiments, an AMM produces each layer of a multiplicity of fuel cells simultaneously. In preferred embodiments, the AMM assembles each layer of a multiplicity of fuel cells simultaneously. In preferred embodiments, heating each layer or heating a combination of layers of a multiplicity of fuel cells takes place simultaneously. All the discussion and all the features described herein for a fuel cell or a fuel cell stack are applicable to the production, assembling and heating of the multiplicity of fuel cells. In preferred embodiments, a multiplicity of fuel cells may be 2 or more 20 or more, 50 or more, 80 or more, 100 or more, 500 or more, 800 or more, 1000 or more, 5000 or more or 10,000 or more.

Treatment Process

Herein disclosed is a treatment process that comprises one or more of the following effects: heating, drying, curing, sintering, annealing, sealing, alloying, evaporating, restructuring, foaming or sintering. A preferred treatment process is sintering. The treatment process comprises exposing a substrate to a source of electromagnetic radiation (EMR). In some embodiments, EMR is exposed to a substrate having a first material. In various embodiments, the EMR has a peak wavelength ranging from 10 to 1500 nm. In various embodiments, the EMR has a minimum energy density of 0.1 Joule/cm$^2$. In an embodiment, the EMR has a burst frequency of $10^{-4}$-1000 Hz or 1-1000 Hz or 10-1000 Hz. In an embodiment, the EMR has an exposure distance of no greater than 50 mm. In an embodiment, the EMR has an exposure duration no less than 0.1 ms or 1 ms. In an embodiment, the EMR is applied with a capacitor voltage of no less than 100V. For example, a single pulse of EMR is applied with an exposure distance of about 10 mm and an exposure duration of 5-20 ms. For example, multiple pulses of EMR are applied at a burst frequency of 100 Hz with an exposure distance of about 10 mm and an exposure duration of 5-20 ms. In some embodiments, the EMR consists of one exposure. In other embodiment, the EMR comprises no greater than 10 exposures, or no greater than 100 exposures, or no greater than 1000 exposures, or no greater than 10,000 exposures.

In various embodiments, metals and ceramics are sintered almost instantaneously (milliseconds for <<10 microns) using pulsed light. The sintering temperature may be controlled to be in the range of 100° C. to 2000° C. The sintering temperature may be tailored as a function of depth. In one example, the surface temperature is 1000° C. and the sub-surface is kept at 100° C., wherein the sub-surface is 100 microns below the surface. In some embodiments, the material suitable for this treatment process includes yttria-stabilized zirconia (YSZ), 8YSZ (8 mol % YSZ powder), yttrium, zirconium, gadolinia-doped ceria (GDC or CGO), samaria-doped ceria (SDC), scandia-stabilized zirconia (SSZ), lanthanum strontium manganite (LSM), lanthanum strontium cobalt ferrite (LSCF), lanthanum strontium cobaltite (LSC), lanthanum strontium gallium magnesium oxide (LSGM), nickel, NiO, NiO-YSZ, Cu-CGO, $Cu_2O$, CuO, cerium, copper, silver, crofer, steel, lanthanum chromite, doped lanthanum chromite, ferritic steel, stainless steel, or combinations thereof. This treatment process may be suitable for any electrode or electrolyte material previously listed herein.

This treatment process is applicable in the manufacturing process of a fuel cell. In preferred embodiments, a layer in a fuel cell (i.e., anode, cathode, electrolyte, seal, catalyst, etc) is treated using processes described herein to be heated, cured, sintered, sealed, alloyed, foamed, evaporated, restructured, dried or annealed or combinations thereof. In preferred embodiments, a portion of a layer in a fuel cell is treated using processes described herein to be heated, cured, sintered, sealed, alloyed, foamed, evaporated, restructured, dried, annealed, or combinations thereof. In preferred embodiments, a combination of layers of a fuel cell are treated using processes described herein to be heated, cured, sintered, sealed, alloyed, foamed, evaporated, restructured, dried, annealed or combinations thereof, wherein the layers may be a complete layer or a partial layer.

The treatment process of this disclosure is preferably rapid, with the treatment duration varied from microseconds to milliseconds. The treatment duration may be accurately controlled. The treatment process of this disclosure may produce fuel cell layers that have no cracks or have minimal cracking. The treatment process of this disclosure controls the power density or energy density in the treatment volume (the volume of an object being treated) of the material being treated. The treatment volume may be accurately controlled. In an embodiment, the treatment process of this disclosure provides the same energy density or different energy densities in a treatment volume. In an embodiment, the treatment process of this disclosure provides the same treatment duration or different treatment durations in a treatment volume. In an embodiment, the treatment process of this disclosure provides simultaneous treatment for one or more treatment volumes. In an embodiment, the treatment process of this disclosure provides simultaneous treatment for one or more fuel cell layers or partial layers or combination of layers. In an embodiment, the treatment volume is varied by changing the treatment depth.

In an embodiment, a first portion of a treatment volume is treated by electromagnetic radiation of a first wavelength; a second portion of the treatment volume is treated by electromagnetic radiation of a second wavelength. In some cases, the first wavelength is the same as the second wavelength. In some cases, the first wavelength is different from the second wavelength. In an embodiment, the first portion of a treatment volume has a different energy density from the second portion of the treatment volume. In an embodiment, the first portion of a treatment volume has a different treatment duration from the second portion of the treatment volume.

In an embodiment, the EMR has a broad emission spectrum so that the desired effects are achieved for a wide range of materials having different absorption characteristics. In this disclosure, absorption of electromagnetic radiation (EMR) refers to the process, wherein the energy of a photon is taken up by matter, such as the electrons of an atom. Thus, the electromagnetic energy is transformed into internal energy of the absorber, for example, thermal energy. For example, the EMR spectrum extends from the deep ultraviolet (UV) range to the near infrared (IR) range, with peak pulse powers at 220 nm wavelength. The power of such EMR is on the order of Megawatts. Such EMR sources perform tasks such as breaking chemical bonds, sintering, ablating or sterilizing.

In an embodiment, the EMR has an energy density of no less than 0.1, 1, or 10 Joule/$cm^2$. In an embodiment, the EMR has a power output of no less than 1 watt (W), 10 W, 100 W, 1000 W. The EMR delivers power to the substrate of no less than 1 W, 10 W, 100 W, 1000 W. In an embodiment, such EMR exposure heats the material in the substrate. In an embodiment, the EMR has a range or a spectrum of different wavelengths. In various embodiments, the treated substrate is at least a portion of an anode, cathode, electrolyte, catalyst, barrier layer, or interconnect of a fuel cell.

In an embodiment, the peak wavelength of the EMR is between 50 and 550 nm or between 100 and 300 nm. In an embodiment, the absorption of at least a portion of the substrate for at least one frequency of the EMR between 10 and 1500 nm is no less than 30% or no less than 50%. In an embodiment, the absorption of at least a portion of the substrate for at least one frequency between 50 and 550 nm is no less than 30% or no less than 50%. In an embodiment, the absorption of at least a portion of the substrate for at least one frequency between 100 and 300 nm is no less than 30% or no less than 50%.

Sintering is the process of compacting and forming a solid mass of material by heat or pressure without melting it to the point of liquefaction. In this disclosure, the substrate under EMR exposure is sintered but not melted. In preferred embodiments, the EMR comprises one or more of UV light, near ultraviolet light, near infrared light, infrared light, visible light, laser, electron beam, microwave. In an embodiment, the substrate is exposed to the EMR for no less than 1 microsecond, no less than 1 millisecond. In an embodiment, the substrate is exposed to the EMR for less than 1 second at a time or less than 10 seconds at a time. In an embodiment, the substrate is exposed to the EMR for less than 1 second or less than 10 seconds. In an embodiment, the substrate is exposed to the EMR repeatedly, for example, more than 1 time, more than 3 times, more than 10 times. In an embodiment, the substrate is distanced from the source of the EMR for less than 50 cm, less than 10 cm, less than 1 cm, or less than 1 mm.

In some embodiments, after EMR exposure a second material is added to or placed on to the first material. In various cases, the second material is the same as the first material. The second material may be exposed to EMR. In some cases, a third material may be added. The third material is exposed to EMR.

In some embodiments, the first material comprises YSZ, 8YSZ, yttrium, zirconium, GDC, SDC, LSM, LSCF, LSC, nickel, NiO or cerium or a combination thereof. The second material may comprise graphite. In some embodiments, the electrolyte, anode, or cathode comprises a second material. In some cases, the volume fraction of the second material in the electrolyte, anode, or cathode is less than 20%, 10%, 3%, or 1%. The absorption rate of the second material for at least one frequency (e.g., between 10 and 1500 nm or between 100 and 300 nm or between 50 and 550 nm) is greater than 30% or greater than 50%.

In various embodiments, one or a combination of parameters may be controlled, wherein such parameters include distance between the EMR source and the substrate, the energy density of the EMR, the spectrum of the EMR, the voltage of the EMR, the duration of exposure, the burst frequency and the number of EMR exposures. Preferably, these parameters are controlled to minimize the formation of cracks in the substrate.

In an embodiment, the EMR energy is delivered to a surface area of no less than 1 mm$^2$, or no less than 1 cm$^2$, or no less than 10 cm$^2$, or no less than 100 cm$^2$. In some cases, during EMR exposure of the first material, at least a portion of an adjacent material is heated at least in part by conduction of heat from the first material. In various embodiments, the layers of the fuel cell (e.g., anode, cathode, electrolyte) are thin. Preferably they are no greater than 30 microns, no greater than 10 microns, or no greater than 1 micron.

In some embodiments, the first material of the substrate is in the form of a powder, sol gel, colloidal suspension, hybrid solution or sintered material. In various embodiments, the second material may be added by vapor deposition. In preferred embodiments, the second material coats the first material. In preferred embodiments, the second material reacts with light, (e.g. focused light), as by a laser, and sintered or annealed with the first material.

Advantages

The preferred treatment process of this disclosure enables rapid manufacturing of fuel cells by eliminating traditional, costly, time consuming, expensive sintering processes and replacing them with rapid, in situ methods that allow continuous manufacturing of the layers of a fuel cell in a single machine if desired. This process also shortens sintering time from hours and days to seconds or milliseconds or even microseconds.

In various embodiments, this treatment method is used in combination with manufacturing techniques like screen printing, tape casting, spraying, sputtering, physical vapor deposition and additive manufacturing.

This preferred treatment method enables tailored and controlled heating by tuning EMR characteristics (such as, wavelengths, energy density, burst frequency, and exposure duration) combined with controlling thicknesses of the layers of the substrate and heat conduction into adjacent layers to allow each layer to sinter, anneal, or cure at each desired target temperature. This process enables more uniform energy applications, decreases or eliminates cracking, which improves electrolyte performance. The substrate treated with this preferred process also has less thermal stress due to more uniform heating.

Particle Size Control

Without wishing to be limited by any theory, we have unexpectedly discovered that the sintering process may require much less energy expenditure and much less time than what is traditionally needed if the particle size distribution of the particles in a material is controlled to meet certain criteria. In some cases, such particle size distribution comprises D10 and D90, wherein 10% of the particles have a diameter no greater than D10 and 90% of the particles have a diameter no greater than D90, wherein D90/D10 is in the range of from 1.5 to 100. In some cases, such particle size distribution is bimodal such that the average particle size in the first mode is at least 5 times the average particle size in the second mode. In some cases, such particle size distribution comprises D50, wherein 50% of the particles have a diameter no greater than D50, wherein D50 is no greater than 100 nm. The sintering processes utilize electromagnetic radiation (EMR), or plasma, or a furnace, or hot fluid, or a heating element, or combinations thereof. Preferably, the sintering processes utilize electromagnetic radiation (EMR). For example, without the processes as disclosed herein, an EMR source just sufficient enough to sinter a material has power capacity P. With the processes as disclosed herein, the material is sintered with EMR sources having much less power capacity, e.g., 50% P or less, 40% P or less, 30% P or less, 20% P or less, 10% P or less, 5% P or less.

Herein disclosed is a method of sintering a material comprising mixing particles with a liquid to form a dispersion, wherein the particles have a particle size distribution comprising D10 and D90, wherein 10% of the particles have a diameter no greater than D10 and 90% of the particles have a diameter no greater than D90, wherein D90/D10 is in the range of from 1.5 to 100; depositing the dispersion on a substrate to form a layer; and treating the layer to cause at least a portion of the particles to sinter.

In some embodiments, the particle size distribution is a number distribution determined by dynamic light scattering. Dynamic light scattering (DLS) is a technique that can be used to determine the size distribution profile of small particles in a dispersion or suspension. In the scope of DLS, temporal fluctuations are typically analyzed by means of the intensity or photon auto-correlation function (also known as photon correlation spectroscopy or quasi-elastic light scattering). In the time domain analysis, the autocorrelation function (ACF) usually decays starting from zero delay time, and faster dynamics due to smaller particles lead to faster decorrelation of scattered intensity trace. It has been shown that the intensity ACF is the Fourier transformation of the power spectrum, and therefore the DLS measurements can be equally well performed in the spectral domain.

In an embodiment, the particle size distribution is determined by transmission electron microscopy (TEM). TEM is a microscopy technique in which a beam of electrons is transmitted through a specimen to form an image. In this case, the specimen is most often a suspension on a grid. An image is formed from the interaction of the electrons with the sample as the beam is transmitted through the specimen. The image is then magnified and focused onto an imaging device, such as a fluorescent screen or a sensor such as a scintillator attached to a charge-coupled device.

Herein disclosed is a method of sintering a material comprising mixing particles with a liquid to form a dispersion, wherein the particles have a particle size distribution comprising D50, wherein 50% of the particles have a diameter no greater than D50, wherein D50 is no greater than 100 nm; depositing the dispersion on a substrate to form a layer; and treating the layer to cause at least a portion of the particles to sinter. In various embodiments, D50 is no greater than 50 nm, or no greater than 30 nm, or no greater than 20 nm, or no greater than 10 nm, or no greater than 5 nm. In an embodiment, the layer has a thickness of no greater than 1 mm or no greater than 500 microns or no greater than 300 microns or no greater than 100 microns or no greater than 50 microns.

In some embodiments, depositing comprises material jetting, binder jetting, inkjet printing, aerosol jetting, or aerosol jet printing, vat photopolymerization, powder bed fusion, material extrusion, directed energy deposition, sheet lamination, ultrasonic inkjet printing, or combinations thereof. In some embodiments, said liquid comprises water and at least one organic solvent having a lower boiling point than water and miscible with water. In some embodiments, said liquid comprises water, a surfactant, a dispersant and no polymeric binder. In some embodiments, said liquid comprises one or more organic solvents and no water. In some embodiments, the particles comprise Cu, CuO, $Cu_2O$, Ag, $Ag_2O$, Au, $Au_2O$, $Au_2O_3$, titanium, yttria-stabilized zirconia (YSZ), 8YSZ (8 mol % YSZ powder), yttrium, zirconium, gadolinia-doped ceria (GDC or CGO), samaria-doped ceria (SDC), scandia-stabilized zirconia (SSZ), lanthanum strontium manganite (LSM), lanthanum strontium cobalt ferrite (LSCS), lanthanum strontium cobaltite (LSC), lanthanum strontium gallium magnesium oxide (LSGM), nickel (Ni), NiO, NiO-YSZ, Cu-CGO, cerium, crofer, steel, lanthanum chromite, doped lanthanum chromite, ferritic steel, stainless steel, or combinations thereof. The particles may comprise any material previously listed herein for electrodes or electrolyte.

In some embodiments, wherein the particles have a bi-modal particle size distribution such that the average particle size in the first mode is at least 5 times the average particle size in the second mode. In some embodiments, D10 is in the range of from 5 nm to 50 nm or from 5 nm to 100 nm or from 5 nm to 200 nm. In some embodiments, D90 is in the range of from 50 nm to 500 nm or from 50 nm to 1000 nm. In some embodiments, D90/D10 is in the range of from 2 to 100 or from 4 to 100 or from 2 to 20 or from 2 to 10 or from 4 to 20 or from 4 to 10.

In some embodiments, the method comprises drying the dispersion after depositing. In some embodiments, drying comprises heating the dispersion before deposition, heating the substrate that is contact with the dispersion, or combination thereof. Drying may take place for a time period in the range of 1 ms to 1 min or 1 s to 30 s or 3 s to 10 s. In some embodiments, the dispersion may be deposited at a temperature in the range of 40° C. to 100° C. or 50° C. to 90° C. or 60° C. to 80° C. or about 70° C.

In some embodiments, treating comprises the use of electromagnetic radiation (EMR), or a furnace, or plasma, or hot fluid, or a heating element, or combinations thereof. In some embodiments, the EMR comprises UV light, near ultraviolet light, near infrared light, infrared light, visible light, laser, electron beam or microwave or a combination thereof. In an embodiment, the EMR consists of one exposure. In other embodiments, the EMR has an exposure frequency of $10^{-4}$-1000 Hz or 1-1000 Hz or 10-1000 Hz. In an embodiment, the EMR has an exposure distance of no greater than 50 mm. In an embodiment, the EMR has an exposure duration no less than 0.1 ms or 1 ms. In an embodiment, the EMR is applied with a capacitor voltage of no less than 100V.

EXAMPLES

The following examples are provided as part of the disclosure of various embodiments of the present invention. As such, none of the information provided below is to be taken as limiting the scope of the invention.

Example 1

Making an EC Reactor Stack

Example 1 is illustrative of the preferred method of making an EC reactor stack, e.g., a fuel cell stack. The method uses an AMM model no. 0012323 from Ceradrop and an EMR model no. 092309423 from Xenon Corp. An interconnect substrate is put down to start the print.

As a first step, an anode layer is made by the AMM. This layer is deposited by the AMM as a slurry A, having the composition as shown in the table below. This layer is allowed to dry by applying heat via an infrared lamp. This anode layer is sintered by irradiating it with an electromagnetic pulse from a xenon flash tube for 1 second.

An electrolyte layer is formed on top of the anode layer by the AMM depositing a slurry B, having the composition shown in the table below. This layer is allowed to dry by applying heat via an infrared lamp. This electrolyte layer is sintered by irradiating it with an electromagnetic pulse from a xenon flash tube for 60 seconds.

Next a cathode layer is formed on top of the electrolyte layer by the AMM depositing a slurry C, having the composition shown in the table below. This layer is allowed to dry by applying heat via an infrared lamp. This cathode layer is sintered by irradiating it with an electromagnetic pulse from a xenon flash tube for ½ second.

An interconnect layer is formed on top of the cathode layer by the AMM depositing a slurry D, having the composition shown in the table below. This layer is allowed to dry by applying heat via an infrared lamp. This interconnect layer is sintered by irradiating it with an electromagnetic pulse from a xenon flash tube for 30 seconds.

These steps are then repeated 60 times, with the anode layers being formed on top of the interconnects. The result is a fuel cell stack with 61 fuel cells.

| Composition of Slurries | | |
|---|---|---|
| Slurry | Solvents | Particles |
| A | 100% isopropyl alcohol | 10 wt % NiO-SYSZ |
| B | 100% isopropyl alcohol | 10 wt % 8YSZ |
| C | 100% isopropyl alcohol | 10 wt % LSCF |
| D | 100% isopropyl alcohol | 10 wt % lanthanum chromite |

Example 2

LSCF in Ethanol

Mix 200 ml of ethanol with 30 grams of LSCF powder in a beaker. Centrifuge the mixture and obtain an upper dispersion and a lower dispersion. Extract and deposit the upper dispersion using a 3D printer on a substrate and form a LSCF layer. Use a xenon lamp (10 kW) to irradiate the LSCF layer at a voltage of 400V and a burst frequency of 10 Hz for a total exposure duration of 1,000 ms.

Example 3

CGO in Ethanol

Mix 200 ml of ethanol with 30 grams of CGO powder in a beaker. Centrifuge the mixture and obtain an upper dispersion and a lower dispersion. Extract and deposit the upper dispersion using a 3D printer on a substrate and form a CGO layer. Use a xenon lamp (10 kW) to irradiate the CGO layer at a voltage of 400V and a burst frequency of 10 Hz for a total exposure duration of 8,000 ms.

Example 4

CGO in Water

Mix 200 ml of deionized water with 30 grams of CGO powder in a beaker. Centrifuge the mixture and obtain an upper dispersion and a lower dispersion. Extract and deposit the upper dispersion using a 3D printer on a substrate and form a CGO layer. Use a xenon lamp (10 kW) to irradiate the CGO layer at a voltage of 400V and a burst frequency of 10 Hz for a total exposure duration of 8,000 ms.

Example 5

NiO in Water

Mix 200 ml of deionized water with 30 grams of NiO powder in a beaker. Centrifuge the mixture and obtain an upper dispersion and a lower dispersion. Extract and deposit the upper dispersion using a 3D printer on a substrate and form a NiO layer. Use a xenon lamp (10 kW) to irradiate the NiO layer at a voltage of 400V and a burst frequency of 10 Hz for a total exposure duration of 15,000 ms.

Example 6

Sintering Results

Figure 17:
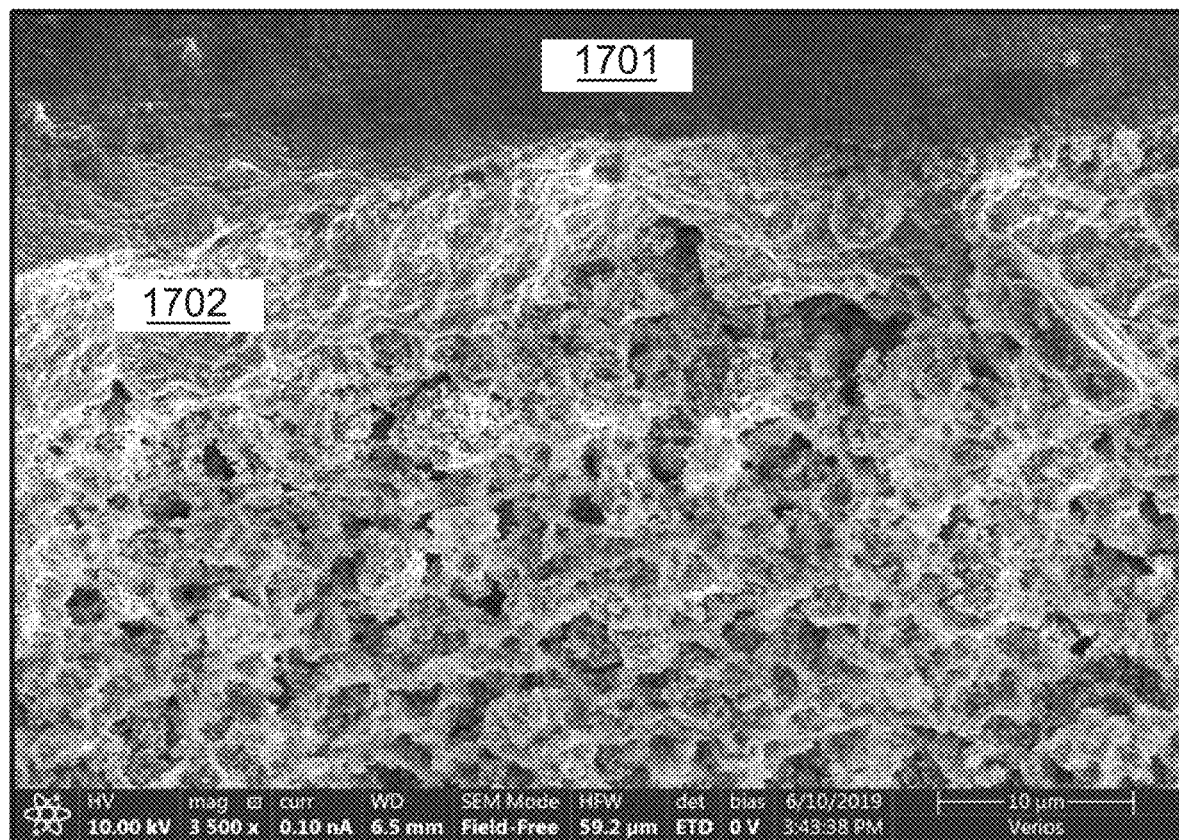
FIG. 17 is a scanning electron microscopy image.

FIG. 17 is a scanning electron microscopy image (side view). FIG. 17 illustrates an electrolyte (YSZ) 1701 printed and sintered on an electrode (NiO-YSZ) 1702. The scanning electron microscopy image shows the side view of the sintered structures, which demonstrates gas-tight contact between the electrolyte and the electrode, full densification of the electrolyte, and sintered and porous electrode microstructures.

Example 7

Fuel Cell Stack Configurations

A 48-Volt fuel cell stack has 69 cells with about 1000 Watts of power output. The fuel cell in this stack has a dimension of about 4 cm×4 cm in length and width and about 7 cm in height. A 48-Volt fuel cell stack has 69 cells with about 5000 Watts of power output. The fuel cell in this stack has a dimension of about 8.5 cm×8.5 cm in length and width and about 7 cm in height.

Example 8

Channeled Electrodes/Fluid Dispersing Components

Figure 18:
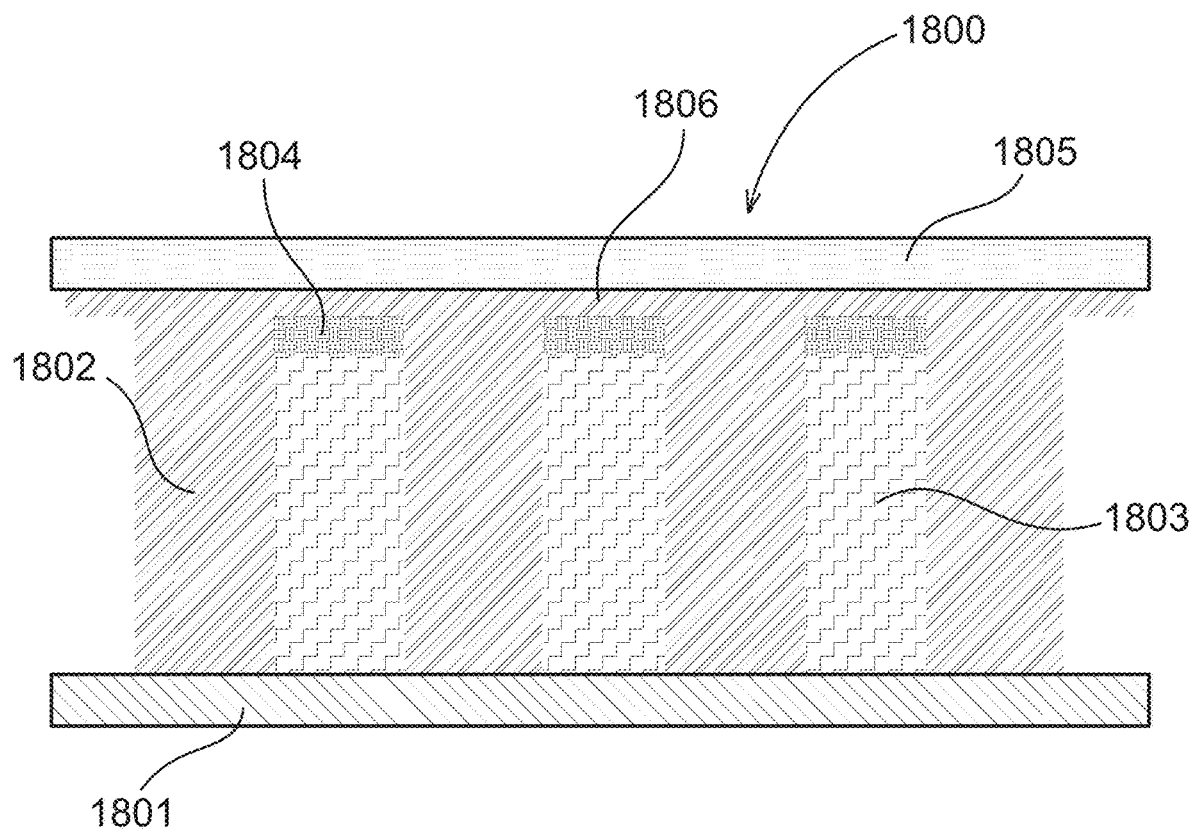
FIG. 18 schematically illustrates an example of a half cell in an EC reactor.

FIG. 18 schematically illustrates an example of a half cell in an EC reactor. As shown in FIG. 18, half cell 1700 comprises interconnect 1801. Interconnect 1801 comprises doped lanthanum chromite. Half cell 1800 comprises anode segments 1802 that are printed on interconnect 1801. The anode segments are composed of NiO-YSZ. Anode segments 1802 are sintered using EMR (see Example 1). Half cell 1800 comprises filler material that is deposited between anode segments 1802. The filler material is polymethyl methacrylate (PMMA). Half cell 1800 includes shields 1804 that are printed on filler materials 1803 that are composed of YSZ. Additional anode material 1806 is printed to cover anode segments 1802 and shields 1804 followed by sintering using EMR. The additional anode material is NiO-YSZ. Electrolyte 1805 is printed on additional anode material 1806 and sintered using EMR. Electrolyte 1805 is YSZ. A barrier layer (not shown) composed of CGO is further printed on the electrolyte and sintered using EMR. A layer of cathode (not shown) composed of LSCF is printed on the CGO barrier and sintered. Cathode segments (not shown) composed of LSCF are printed on this layer and sintered. These segments form valleys and filler PMMA is deposited to fill these valleys (not shown). Shields composed of YSZ are printed on the fillers (not shown). Doped lanthanum chromite is printed to cover the shields and cathode segments and then sintered to form another interconnect (not shown). The fillers are removed by furnace heating and channeled electrodes are produced or fluid dispersing components are formed between electrolyte and interconnect (not shown).

It is to be understood that this disclosure describes exemplary embodiments for implementing different features, structures, or functions of the invention. Exemplary embodiments of components, arrangements, and configurations are described to simplify the present disclosure; however, these exemplary embodiments are provided merely as examples and are not intended to limit the scope of the invention. The embodiments as presented herein may be combined unless otherwise specified. Such combinations do not depart from the scope of the disclosure.

Additionally, certain terms are used throughout the description and claims to refer to particular components or steps. As one skilled in the art appreciates, various entities may refer to the same component or process step by different names, and as such, the naming convention for the elements described herein is not intended to limit the scope of the invention. Further, the terms and naming convention used herein are not intended to distinguish between components, features, and/or steps that differ in name but not in function.

While the disclosure is susceptible to various modifications and alternative forms, specific embodiments thereof are shown by way of example in the drawings and description. It should be understood, however, that the drawings and detailed description are not intended to limit the disclosure to the particular form disclosed, but on the contrary, the intention is to cover all modifications, equivalents and alternatives falling within the spirit and scope of this disclosure.

What is claimed is:

1. A hydrogen production system comprising:
a fuel source;
a water source; and
a hydrogen producer; wherein the hydrogen producer comprises a first electrode, a second electrode, and a mixed-conducting electrolyte consisting essentially of doped ceria between the first and second electrodes; wherein the electrodes are separated by the electrolyte only; wherein the first and second electrodes both comprise metallic-phase nickel and are simultaneously exposed to reducing environments during the entire time of operation; wherein the hydrogen producer comprises no interconnect and does not generate electricity or receive electricity;
wherein the fuel source and the water source are in fluid communication with the hydrogen producer; and wherein fuel enters the hydrogen producer from the fuel source and water enters the hydrogen producer from the water source and the fuel and the water do not come in contact with each other in the hydrogen producer.

2. The system of claim 1, wherein the fuel source is in fluid communication with the first electrode and the water source is in fluid communication with the second electrode.

3. The system of claim 1, wherein the first electrode and the second electrode comprise Ni or NiO and a material selected from the group consisting of YSZ, CGO, SDC, SSZ, LSGM, and combinations thereof.

4. The system of claim 1, wherein the fuel from the fuel source provides heat for the hydrogen producer and the hydrogen producer has no additional heat source.

5. The system of claim 1 further comprising an oxidant source and a boiler, wherein the boiler is in fluid communication with the oxidant source, the water source, and the hydrogen producer.

6. The system of claim 5, wherein the boiler is in thermal communication with the hydrogen producer, the fuel entering into the hydrogen producer, the oxidant, the water, or combinations thereof.

7. The system of claim 5, wherein the boiler is configured to receive exhaust from the first electrode of the hydrogen producer and to feed steam into the second electrode of the hydrogen producer.

8. The system of claim 5, wherein the fuel is partially oxidized in the hydrogen producer and further oxidized in the boiler.

9. The system of claim 5 further comprising a steam turbine disposed between the boiler and the hydrogen producer and in fluid communication with the boiler and the hydrogen producer.

10. The system of claim 1 further comprising a steam reformer or an autothermal reformer disposed between the fuel source and the hydrogen producer and in fluid communication with the fuel source and the hydrogen producer.

11. The system of claim 1 further comprising a condenser configured to receive exhaust from the second electrode of the hydrogen producer and to recycle water to the boiler and to output hydrogen.

12. The system of claim 11, wherein the condenser is in thermal communication with the fuel.

13. The system of claim 1 further comprising a desulfurization unit disposed between the fuel source and the hydrogen producer and in fluid communication with the fuel source and the hydrogen producer.

14. The system of claim 1, wherein the hydrogen producer is configured to have a fuel inlet temperature no greater than 1000° C.

15. The system of claim 1, wherein the hydrogen producer is configured to have a fuel outlet temperature no less than 600° C.

16. The system of claim 1 in fluid communication with a downstream unit configured to use hydrogen produced by the hydrogen producer in one or more of process selected from the group consisting of:
   a. a Fischer-Tropsch (FT) reaction;
   b. a dry reforming reaction;
   c. a Sabatier reaction catalyzed by nickel;
   d. a Bosch reaction;
   e. a reverse water gas shift reaction;
   f. an electrochemical reaction to produce electricity;
   g. production of ammonia;
   h. production of fertilizer;
   h. electrochemical compression of hydrogen for storage or fueling a hydrogen vehicle; and
   i. a hydrogenation reaction.

17. A hydrogen production system comprising:
a fuel source;
a water source; and
a hydrogen producer consisting of a first electrode and a second electrode separated by a mixed-conducting electrolyte consisting essentially of doped ceria; wherein the first and second electrodes both comprise metallic-phase nickel and are simultaneously exposed to reducing environments during the entire time of operation; wherein the hydrogen producer comprises no interconnect and does not generate electricity or receive electricity;
wherein the fuel source and the water source are in fluid communication with the hydrogen producer; and
wherein fuel enters the hydrogen producer from the fuel source and water enters the hydrogen producer from the water source and the fuel and the water do not come in contact with each other in the hydrogen producer.

* * * * *